United States Patent
Shundo et al.

(10) Patent No.: US 7,101,595 B2
(45) Date of Patent: Sep. 5, 2006

(54) PHOTO-CURABLE FLUORENE DERIVATIVE AND COMPOSITION CONTAINING THE SAME

(75) Inventors: Ryushi Shundo, Chiba (JP); Hiromichi Inoue, Chiba (JP); Tomohiro Etou, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 37 days.

(21) Appl. No.: 10/901,122

(22) Filed: Jul. 29, 2004

(65) Prior Publication Data

US 2005/0031801 A1 Feb. 10, 2005

(30) Foreign Application Priority Data

Jul. 30, 2003 (JP) .............................. 2003-203629

(51) Int. Cl.
| | |
|---|---|
| C09K 19/32 | (2006.01) |
| C09K 19/52 | (2006.01) |
| C09K 19/20 | (2006.01) |
| C09K 19/34 | (2006.01) |
| C09K 19/30 | (2006.01) |
| C07C 23/08 | (2006.01) |
| C07D 303/02 | (2006.01) |
| C07D 35/02 | (2006.01) |
| C07D 407/02 | (2006.01) |
| C08G 65/04 | (2006.01) |

(52) U.S. Cl. ................. 428/1.1; 428/413; 252/299.01; 252/299.62; 252/299.67; 252/299.7; 252/299.61; 252/299.63; 549/510; 549/512; 570/187; 528/417; 528/421

(58) Field of Classification Search ................ 428/1.1, 428/413; 252/299.62, 299.01, 299.67, 299.7; 252/299.61, 299.63; 549/510, 512; 528/417, 528/421; 570/187
See application file for complete search history.

(56) References Cited

U.S. PATENT DOCUMENTS

| | | | |
|---|---|---|---|
| 6,660,344 B1 * | 12/2003 | Lub ........................... | 428/1.1 |
| 6,666,989 B1 * | 12/2003 | Toyne et al. ........... | 252/299.01 |
| 6,894,141 B1 * | 5/2005 | Satoh et al. ................ | 528/196 |
| 2004/0209006 A1 * | 10/2004 | Matsumoto et al. ......... | 428/1.1 |
| 2004/0222403 A1 * | 11/2004 | Sasada et al. .......... | 252/299.01 |
| 2004/0228983 A1 * | 11/2004 | Chien et al. ................. | 428/1.1 |
| 2005/0007541 A1 * | 1/2005 | Sasada et al. ............... | 349/183 |
| 2005/0082513 A1 * | 4/2005 | Seki et al. ............. | 252/299.01 |
| 2005/0179005 A1 * | 8/2005 | Kato et al. ............. | 252/299.01 |
| 2005/0213009 A1 * | 9/2005 | Yanai et al. ................ | 349/137 |
| 2005/0224757 A1 * | 10/2005 | Syundo et al. ......... | 252/299.61 |
| 2006/0006364 A1 * | 1/2006 | Shundo et al. ......... | 252/299.62 |

FOREIGN PATENT DOCUMENTS

| | | | |
|---|---|---|---|
| JP | 2001-55573 | | 2/2001 |
| JP | 2001-154019 | | 6/2001 |
| JP | 2003-213265 | * | 7/2003 |

* cited by examiner

*Primary Examiner*—Shean C Wu
(74) *Attorney, Agent, or Firm*—Wenderoth, Lind & Ponack, L.L.P.

(57) ABSTRACT

The present invention provides a compound represented by formula (1) defined in the specification. The invention further provides a liquid crystal composition comprising at least two compounds, which at least one compound out of them is the above compound. The invention still further provides a polymer obtained by polymerizing the above composition, and uses of the polymer such as a molded article having an optical anisotropy, an optical compensation element, a wavelength functional plate, an optical element, and a liquid crystal display element comprising the polymer.

73 Claims, No Drawings

PHOTO-CURABLE FLUORENE DERIVATIVE AND COMPOSITION CONTAINING THE SAME

BACKGROUND OF THE INVENTION

1. Field of the Invention

The present invention relates to a liquid crystalline compound having two epoxy groups or oxetane groups as a polymerizable functional group and having a fluorene ring in a skeletal structure, a composition containing the same, a polymer thereof and uses thereof.

2. Related Art

When a polymerizable liquid crystal compound aligned in a nematic state is polymerized, a molded article which is fixed in an aligning state to have an optical anisotropy is obtained. A molded article having an optical anisotropy is actively used as an optical compensation film for a liquid crystal display element. A compound having an acryl group as a polymerizable group is used as a polymerizable liquid crystal compound.

When producing an optical compensation film, a polymerizable liquid crystal composition containing a suitable photopolymerization initiator is first coated on a substrate such as triacetyl cellulose (hereinafter abbreviated as TAC) subjected to aligning treatment. Next, it is irradiated with an electron beam such as a UV ray and polymerized to obtain an optically anisotropic film in which alignment of the liquid crystal is fixed (refer to patent document 1 and patent document 2).

Patent document 1: JP H13-55573 A/2001
Patent document 2: JP H13-154019 A/2001

The following three conditions are desired in a step of irradiating with a UV ray.

Curing at a room temperature without requiring a specific heating device.

Curing in the air without requiring substitution with an inert gas such as nitrogen.

Curing in a UV ray-irradiating time of several seconds.

When a conventional acryl base polymerizable liquid crystal material is used to produce an optically anisotropic film by the production process described above, the following two problems are involved therein:

When the material is cured in the air with a UV ray, it is inhibited from being cured by oxygen-containing air, and a cured film is not obtained.

The cured optically anisotropic film is peeled off from TAC because of a weak adhesive strength thereof with TAC which is a substrate of the film.

A polymerizable liquid crystal compound which can solve the above various problems and a composition containing the same are desired.

SUMMARY OF THE INVENTION

The present invention comprises the following items A, B, C and D:

A. A compound represented by Formula (1):

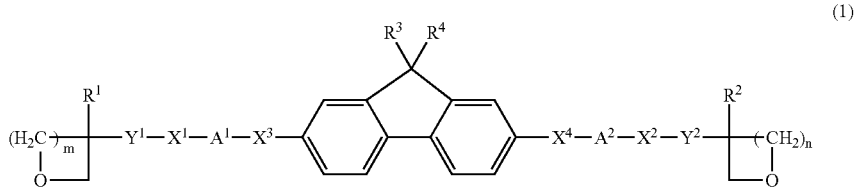

(1)

wherein $R^1$ and $R^2$ are independently hydrogen or alkyl having a carbon number of 1 to 5; $R^3$ and $R^4$ are independently hydrogen, fluorine, chlorine or alkyl having a carbon number of 1 to 20; optional —$CH_2$— in the above alkyl may be substituted with —O—, —S—, —COO—, —OCO—, —CO—, —CH=CH— or —C≡C—, and optional hydrogen in the above alkyl may be substituted with halogen; $Y^1$ and $Y^2$ are independently alkylene having a carbon number of 1 to 15, and optional —$CH_2$— in the above alkylene may be substituted with —O—; $A^1$ and $A^2$ are independently 1,4-cyclohexylene, 1,4-cyclohexylene in which at least one hydrogen is substituted with fluorine, 1,4-cyclohexenylene, 1,4-phenylene, 1,4-phenylene in which at least one hydrogen is substituted with halogen, methyl or trifluoromethyl, pyridine-2,5-diyl, pyridazine-3,6-diyl, pyrimidine-2,5-diyl, naphthalene-2,6-diyl, tetrahydronaphthalene-2,6-diyl or 1,3-dioxane-2,5-diyl; $X^1$ and $X^2$ are independently a single bond, —O—, —S—, —COO— or —OCO—; $X^3$ and $X^4$ are independently —COO—, —OCO—, —$CH_2CH_2$— or —C≡C—; and m and n are independently 1 or 0.

B. A liquid crystal composition comprising at least two compounds, wherein at least one compound out of them is the compound as described in any of item A.

C. A polymer obtained by polymerizing the composition described in any of item B.

D. Uses of the polymer described in item C, such as a molding article having an optical anisotropy, an optical compensation element, a wavelength functional plate, an optical element and a liquid crystal display element comprising the molded article having an optical anisotropy.

DETAILED DESCRIPTIONS

Intensive investigations repeated by the present inventors in order to solve fundamentally the problems described above have resulted in finding that the compound of the present invention or the composition containing the same exhibits an excellent polymerizing property in the air and readily provides a polymer having a high polymerization degree by irradiation with light for short time and that a film prepared by applying thereon the compound of the present invention or the composition containing the same and curing it is excellent in an adhesive property with TAC, and thus they have completed the present invention. The present invention comprises the following items 1 to 34:

1. A compound represented by Formula (1):

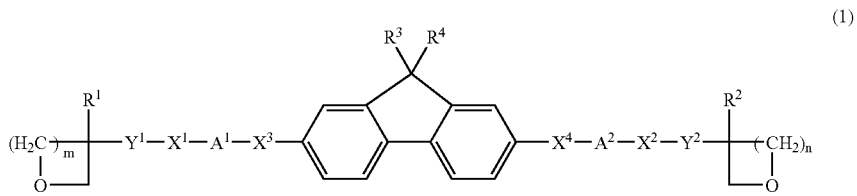

wherein $R^1$ and $R^2$ are independently hydrogen or alkyl having a carbon number of 1 to 5; $R^3$ and $R^4$ are independently hydrogen, fluorine, chlorine or alkyl having a carbon number of 1 to 20; optional —$CH_2$— in the above alkyl may be substituted with —O—, —S—, —COO—, —OCO—, —CO—, —CH═CH— or —C≡C—, and optional hydrogen in the above alkyl may be substituted with halogen; $Y^1$ and $Y^2$ are independently alkylene having a carbon number of 1 to 15, and optional —$CH_2$— in the above alkylene may be substituted with —O—; $A^1$ and $A^2$ are independently 1,4-cyclohexylene, 1,4-cyclohexylene in which at least one hydrogen is substituted with fluorine, 1,4-cyclohexenylene, 1,4-phenylene, 1,4-phenylene in which at least one hydrogen is substituted with halogen, methyl or trifluoromethyl, pyridine-2,5-diyl, pyridazine-3,6-diyl, pyrimidine-2,5-diyl, naphthalene-2,6-diyl, tetrahydronaphthalene-2,6-diyl or 1,3-dioxane-2,5-diyl; $X^1$ and $X^2$ are independently a single bond, —O—, —S—, —COO— or —OCO—; $X^3$ and $X^4$ are independently —COO—, —OCO—, —$CH_2CH_2$— or —C≡C—; and m and n are independently 1 or 0.

2. The compound as described in item 1, wherein $R^1$ and $R^2$ are independently hydrogen, methyl or ethyl; $R^3$ and $R^4$ are independently hydrogen, fluorine, chlorine or alkyl having a carbon number of 1 to 20; optional —$CH_2$— in the above alkyl may be substituted with —O—, —S—, —COO—, —OCO—, —CO—, —CH═CH— or —C≡C—, and hydrogen in the above alkyl may be substituted with halogen; $Y^1$ and $Y^2$ are independently alkylene having a carbon number of 1 to 12, and optional —$CH_2$— in the above alkylene may be substituted with —O—, —COO—, —OCO— or —CO—; $A^1$ and $A^2$ are independently 1,4-cyclohexylene, 1,4-cyclohexylene in which at least one hydrogen is substituted with fluorine, 1,4-cyclohexenylene, 1,4-phenylene, 1,4-phenylene in which one hydrogen is substituted with fluorine, chlorine, methyl or trifluoromethyl, 1,4-phenylene in which two hydrogens are substituted with fluorine or trifluoromethyl, pyridine-2,5-diyl, pyridazine-3,6-diyl, pyrimidine-2,5-diyl, naphthalene-2,6-diyl, tetrahydronaphthalene-2,6-diyl or 1,3-dioxane-2,5-diyl; $X^1$ and $X^2$ are independently a single bond and —O—; $X^3$ and $X^4$ are independently —COO—, —OCO— or —C≡C—; and m and n are independently 1 or 0.

3. The compound as described in item 1, wherein $R^1$ and $R^2$ are independently hydrogen, methyl or ethyl; $R^3$ and $R^4$ are independently hydrogen, fluorine, chlorine or alkyl having a carbon number of 1 to 10; $Y^1$ and $Y^2$ are independently alkylene having a carbon number of 1 to 10, and optional —$CH_2$— in the above alkylene may be substituted with —O—, —COO— or —OCO—; $A^1$ and $A^2$ are independently 1,4-cyclohexylene, 1,4-phenylene, 1,4-phenylene in which one hydrogen is substituted with fluorine, chlorine, methyl or trifluoromethyl or 1,4-phenylene in which two hydrogens are substituted with fluorine or trifluoromethyl; $X^1$ and $X^2$ are independently a single bond and —O—; $X^3$ and $X^4$ are independently —COO—, —OCO— or —C≡C—; and m and n are independently 1 or 0.

4. The compound as described in item 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— in the above alkylene may be substituted with —O—, —COO— or —OCO—; $A^1$ and $A^2$ are independently 1,4-cyclohexylene, 1,4-phenylene or 1,4-phenylene in which one hydrogen is substituted with fluorine or chlorine; $X^1$ and $X^2$ are independently a single bond and —O—; $X^3$ and $X^4$ are independently —COO— or —OCO—; and m and n are independently 1 or 0.

5. The compound as described in item 4, wherein $Y^1$ and $Y^2$ are independently alkylene having a carbon number of 1 to 10, and optional —$CH_2$— other than a —$CH_2$— bonded to $X^1$ or $X^2$ in the above alkylene may be substituted with —O—.

6. The compound as described in any of items 1 to 5, wherein m=n=0.

7. The compound as described in any of items 1 to 5, wherein m=n=1.

8. The compound as described in any of items 1 to 5, wherein m=0, and n=1.

9. The compound as described in any of items 1 to 5, wherein $X^1$ and $X^2$ are —O—; $X^3$ is —COO—, and $X^4$ is —OCO—; and m=n=0.

10. The compound as described in any of items 1 to 5, wherein $X^1$ and $X^2$ are independently —O—; $X^3$ is —COO—, and $X^4$ is —OCO—; and m=n=1.

11. The compound as described in any of items 1 to 5, wherein $X^1$ and $X^2$ are independently —O—; $X^3$ is —COO—, and $X^4$ is —OCO—; and m is 1, and n is 0.

12. A compound selected from the group consisted of the compounds represented by the following chemical formulas:

No. 21
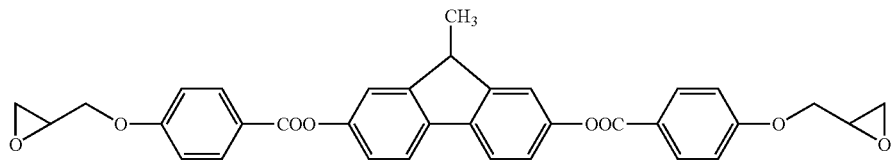
No. 22
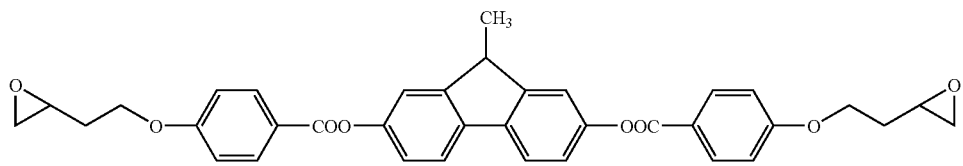
No. 23
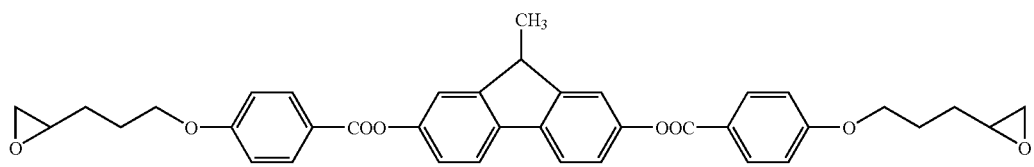
No. 24
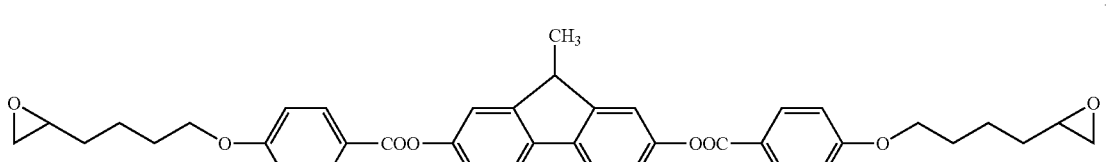
No. 26
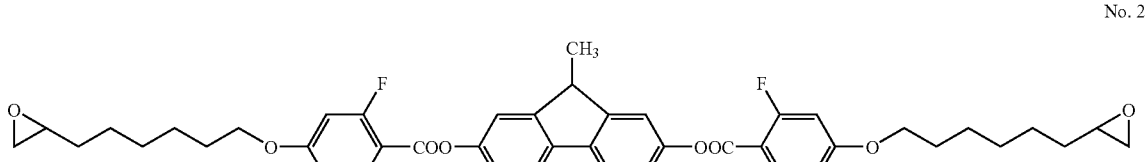
No. 27
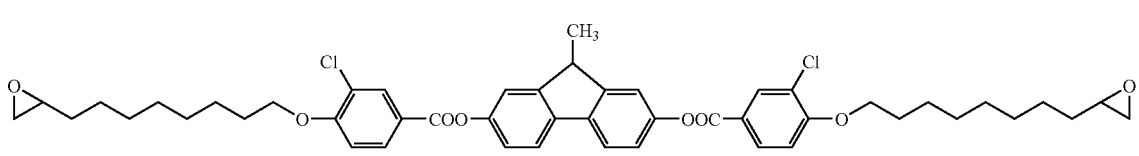
No. 35
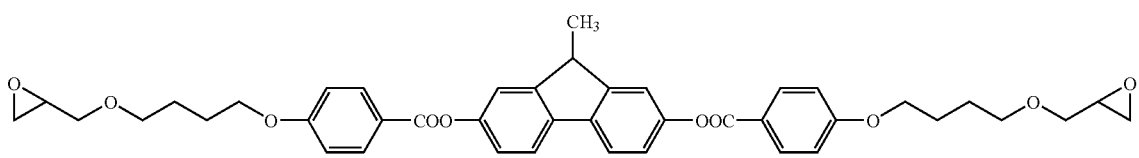
No. 37
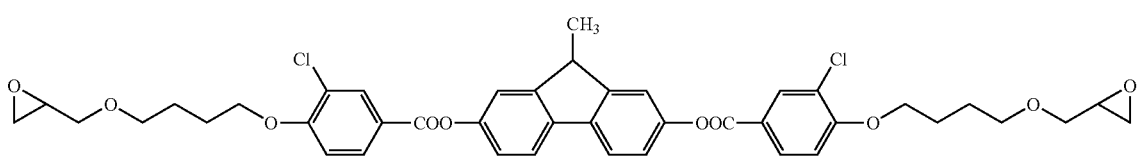
No. 38
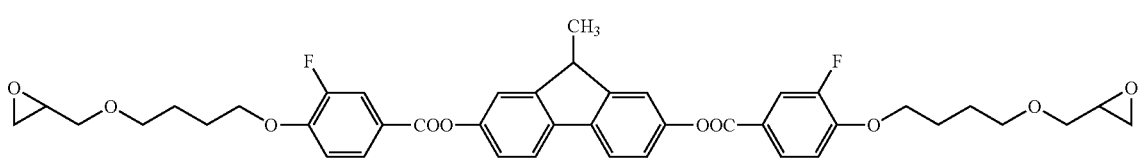

-continued
No. 53
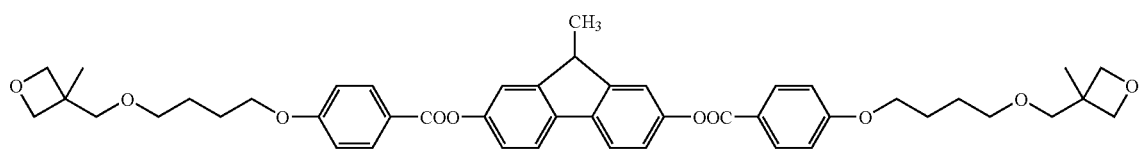
No. 57
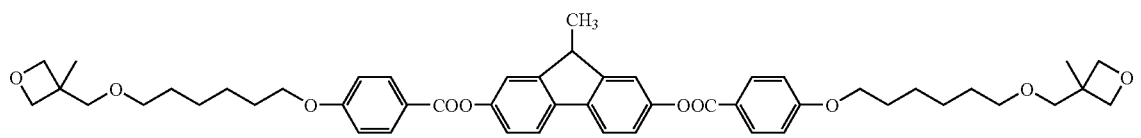
No. 63
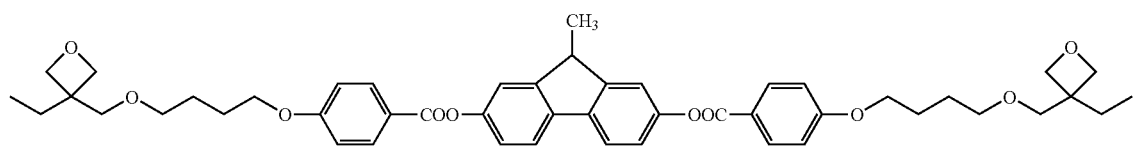
No. 64
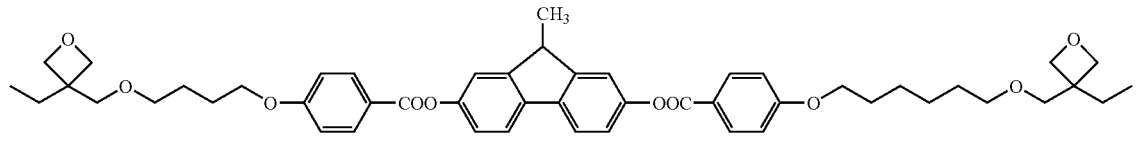
No. 65
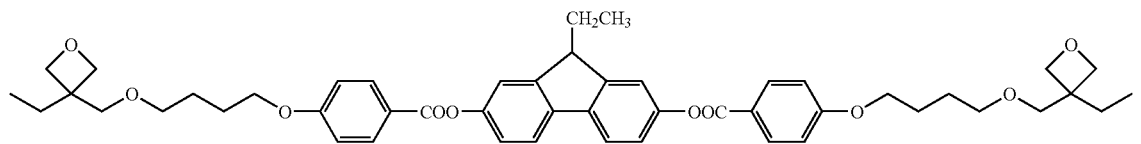
No. 66
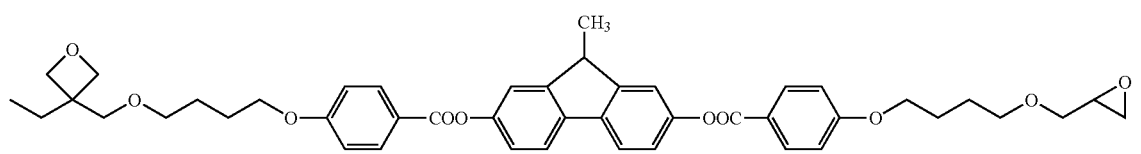
No. 67
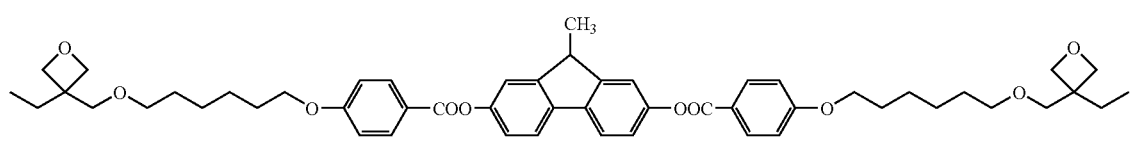
No. 68
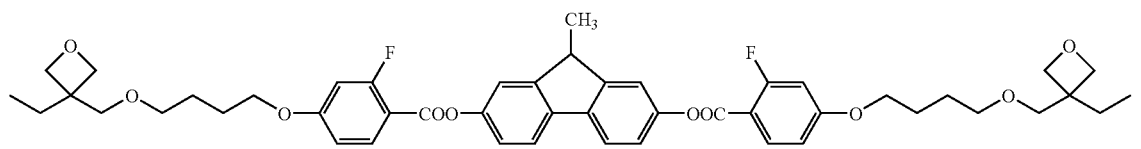

-continued

No. 86

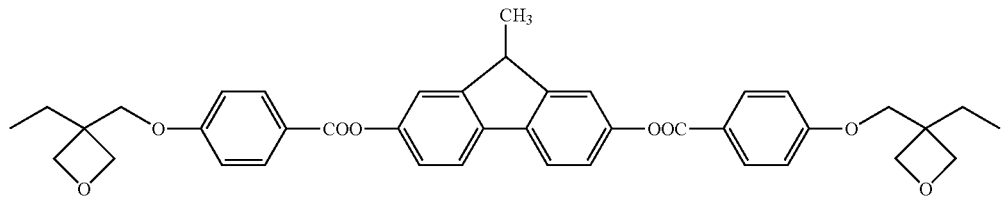

13. A liquid crystal composition comprising at least two compounds, wherein at least one compound out of them is the compound as described in any of items 1 to 12.
14. The liquid crystal composition as described in item 13, wherein all the compounds are polymerizable compounds.
15. The liquid crystal composition as described in item 13, wherein at least one compound is the compound as described in item 1, and at least one other compound is a polymerizable compound which is different from the compound as described in item 1.
16. The liquid crystal composition as described in item 13, wherein all the compounds are the compounds as described in item 1.
17. The liquid crystal composition as described in item 13, which comprises at least one of the compounds as described in any of items 1 to 12 and at least one polymerizable compound selected from compounds represented by Formulas (M1) to (M8):

(M1)

$R^5-A^3-Z^1-A^4-(Z^2-A^5)_q-X^5-(CH_2)_r-X^6$—[epoxide]

(M2)

[epoxide]—$X^6-(CH_2)_o-X^5-A^3-Z^1-B^1-Z^2-A^4-X^5-(CH_2)_p-X^6$—[epoxide]

(M3)

$R^5-A^3-Z^1-A^4-(Z^2-A^5)_q-X^5-(CH_2)_r-X^6$—[oxetane]—$R^6$ (M4)

$R^6$—[oxetane]—$X^6-(CH_2)_o-X^5-A^3-Z^1-B^1-Z^2-A^4-X^5-(CH_2)_p-X^6$—[oxetane]—$R^6$ (M5)

$R^5-A^3-Z^1-A^4-(Z^2-A^5)_q-X^5-(CH_2)_r-O$—[acrylate]

(M6)

[acrylate]—$O-(CH_2)_o-X^5-A^3-Z^1-B^2-Z^2-A^4-X^5-(CH_2)_p-O$—[acrylate]

(M7)

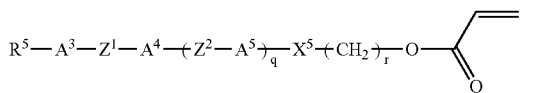

(M8)

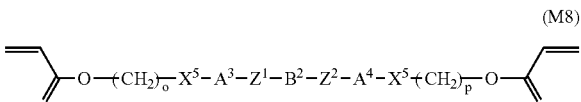

in Formulas (M1) to (M8), $R^5$ is independently hydrogen, fluorine, chlorine, —CN or alkyl having a carbon number of 1 to 20; in the above alkyl, optional —$CH_2$— may be substituted with —O—, —S—, —COO—, —OCO— or —CO—, and optional hydrogen may be substituted with halogen; $R^6$ is hydrogen or alkyl having a carbon number of 1 to 5; $A^3$, $A^4$ and $A^5$ are independently 1,4-cyclohexylene, 1,4-phenylene, 1,4-phenylene in which at least one hydrogen is substituted with halogen, pyridine-2,5-diyl, pyrimidine-2,5-diyl, naphthalene-2,6-diyl or fluorene-2,7-diyl; $B^1$ is independently a single bond, 1,4-phenylene, 1,4-phenylene in which at least one hydrogen is substituted with halogen, methyl or trifluoromethyl, naphthalene-2,6-diyl or biphenyl-4,4'-diyl; $B^2$ is independently a single bond, 1,4-phenylene, 1,4-phenylene in which at least one hydrogen is substituted with halogen, methyl or trifluoromethyl, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl or 9,9-difluorofluorene-2,7-diyl; $Z^1$ and $Z^2$ are independently a single bond, —COO—, —OCO—, —$CH_2CH_2$— or —C≡C—; $X^5$ and $x^6$ are independently a single bond or —O—; q is independently 1 or 0, and o, p and r are independently an integer of 0 to 20.
18. The liquid crystal composition as described in item 17, in which $R^5$ independently represents alkyl having a carbon number of 1 to 10, alkoxy having a carbon number of 1 to 10 or —CN; $A^3$, $A^4$ and $A^5$ each independently represent 1,4-cyclohexylene, 1,4-phenylene, 1,4-phenylene in which one or two of hydrogens are substituted with fluorine; $B^1$ independently represents a single bond, 1,4-phenylene or 1,4-phenylene in which one or two of hydrogens are substituted with fluorine, methyl or trifluoromethyl: $B^2$ independently represents a single bond, 1,4-phenylene, 1,4-phenylene in which one or two of hydrogens are substituted with fluorine, methyl or trifluoromethyl or 9-methylfluorene-2,7-diyl; $Z^1$ and $Z^2$ each independently represent a single bond, —COO— or —OCO—; o, p and r each independently represent an integer of 0 to 10.

19. The liquid crystal composition as described in item 17 or 18, which comprises at least one of the compounds as described in any of items 1 to 12 and at least one polymerizable compound selected from the compounds represented by Formula (M1) and Formula (M2).
20. The liquid crystal composition as described in item 17 or 18, which comprises at least one of the compounds as described in any of items 1 to 12 and at least one polymerizable compound selected from the compounds represented by Formulas (M3) and (M4).
21. The liquid crystal composition as described in item 17 or 18, which comprises at least one of the compounds as described in any of items 1 to 12 and at least one polymerizable compound selected from the compounds represented by Formulas (M2), (M5) and (M6).
22. The liquid crystal composition as described in item 17 or 18, which comprises at least one of the compounds as described in any of items 1 to 12 and at least one polymerizable compound selected from the compounds represented by Formulas (M2), (M7) and (M8).
23. The liquid crystal composition as described in any of items 13 to 22, which comprises at least one compound having an epoxy group as a polymerizable group and at least one compound having an oxetane group as a polymerizable group.
24. A polymer obtained by polymerizing the composition described in any of items 13 to 23.
25. A polymer obtained by polymerizing the composition as described in item 16 or at least one compound as described in item 1.
26. A molded article having an optical anisotropy, which comprises the polymer as described in item 24 or 25.
27. A molded article having an optical anisotropy, which comprises the polymer as described in item 24 or 25, wherein a liquid crystal skeleton in a thin layer of the molded article having an optical anisotropy exhibits a hybrid alignment.
28. A molded article having an optical anisotropy, which comprises the polymer as described in item 24 or 25, wherein a liquid crystal skeleton in a thin layer of the molded article having an optical anisotropy exhibits a homogeneous alignment.
29. A molded article having an optical anisotropy, which comprises the polymer as described in item 24 or 25, wherein a liquid crystal skeleton in a thin layer of the molded article having an optical anisotropy exhibits a tilt alignment.
30. A molded article having an optical anisotropy, which comprises the polymer as described in item 24 or 25, wherein a liquid crystal skeleton in a thin layer of the molded article having an optical anisotropy exhibits a homeotropic alignment.
31. A molded article having an optical anisotropy, which comprises the polymer obtained from the liquid crystal composition having a chiral nematic phase or a cholesteric phase as described in any of items 17 to 23, wherein a liquid crystal skeleton in a thin layer thereof exhibits a helical structure.
32. The molded article having an optical anisotropy as described in item 31, which selectively reflects all or a portion of light in a wavelength of 350 to 750 nm.
33. The molded article having an optical anisotropy as described in item 31, which reflects light in an area of a wavelength of 100 to 350 nm.
34. The molded article having an optical anisotropy as described in any of items 31 to 33, wherein a helical structure induced in a chiral nematic phase or a cholesteric phase has a pitch changing continuously in a thickness direction of the molded article having an optical anisotropy.
35. An optical compensation element constituted from the molded article having an optical anisotropy as described in any of items 26 to 34.
36. A quarter-wave plate using the molded article having an optical anisotropy as described in item 31.
37. A half-wave plate using the molded article having an optical anisotropy as described in item 31.
38. An optical element constituted from a combination of the molded article having an optical anisotropy as described in any of items 26 to 34 and a polarizing plate.
39. A liquid crystal display element comprising the molded article having an optical anisotropy as described in any of items 26 to 34.

The term "liquid crystalline" in the present invention is not limited merely to the meaning that a compound exhibits a liquid crystal phase. This term is used as well for a compound which does not exhibit a liquid crystal phase but can be used as a component for a liquid crystal composition when mixed with other liquid crystal compounds. "(Meth) acryloyloxy" means "acryloyloxy" or "methacryloyloxy". "(Meth)acrylate" means "acrylate" or "methacrylate", and "(meth)acrylic acid" means "acrylic acid" or "methacrylic acid".

The liquid crystalline compound, the liquid crystal composition and the liquid crystal display element shall be denoted as the compound, the composition and the element respectively. The compounds represented by Formula (M1), Formula (M2), Formula (M3), Formula (M4), Formula (M5), Formula (M6), Formula (M7) and Formula (M8) shall be denoted as the compound (M1), the compound (M2), the compound (M3), the compound (M4), the compound (M5), the compound (M6), the compound (M7) and the compound (M8).

The meaning of the phrase "optional —$CH_2$— in the alkyl may be substituted with —O—, —CH=CH— and the like" shall be shown by one example. A part of a group obtained by substituting optional —$CH_2$— in —$C_4H_9$ with —O— or —CH=CH— is $C_3H_7O$—, $CH_3$—O— ($CH_2$)$_2$—, $CH_3$—O—$CH_2$—O—, $H_2C$=CH— ($CH_2$)$_3$—$CH_3$—CH=CH— ($CH_2$)$_2$— and $CH_3$—CH=CH—$CH_2$—O—. Thus, the word of "optional" means "at least one selected without distinction".

Considering the stability of the compound, $CH_3$—O—$CH_2$—O— in which oxygens are not adjacent is preferred to $CH_3$—O—O—$CH_2$— in which oxygens are adjacent.

The compound (1) has the following characteristics.
(1) The compound (1) is a liquid crystal compound having at least one fluorene ring in a liquid crystal skeleton and having an epoxy group or an oxetane group as a polymerizable group.
(2) The compound (1) is physically and chemically very stable on conditions usually used and has a good compatibility with other compounds.
(3) Suitable selection of rings, bonding groups and side chains of the compound (1) makes it possible to provide a compound having a physical property such as a large dielectric anisotropy, a small dielectric anisotropy, a large optical anisotropy, a small optical anisotropy and a small viscosity.

First, the fluorene compound of the present invention shall be explained.

The fluorene compound of the present invention is represented by Formula (1) described above.

$R^1$ and $R^2$ in this formula are independently hydrogen or alkyl having a carbon number of 1 to 5. The preferred specific examples of $R^1$ and $R^2$ are hydrogen, methyl and ethyl.

$R^3$ and $R^4$ in this formula are independently hydrogen, fluorine, chlorine or alkyl having a carbon number of 1 to 20; optional —CH$_2$— in the above alkyl may be substituted with —O—, —S—, —COO—, —OCO—, —CO—, —CH=CH— or —C≡C—, and optional hydrogen in the above alkyl may be substituted with halogen.

The preferred examples of $R^3$ and $R^4$ are hydrogen, fluorine, chlorine or alkyl having a carbon number of 1 to 20. In the above alkyl, optional —CH$_2$— may be substituted with —O—, —S—, —COO—, —OCO—, —CO—, —CH=CH— or —C≡C—, and plural —CH$_2$— in the above alkyl may be substituted respectively with different groups out of —O—, —S—, —COO—, —OCO— and —CO—. One example thereof is —O—CH$_2$CH$_2$—COO—. However, continuous two —CH$_2$— shall not be substituted in such a manner as —O-0-, —O—S— or —S—S—, and optional hydrogen in the above alkyl may be substituted with halogen. Halogen is preferably chlorine or fluorine.

The more preferred examples of $R^3$ and $R^4$ are hydrogen or alkyl having a carbon number of 1 to 10. To be specific, they are methyl, ethyl, propyl, butyl, pentyl, hexyl, heptyl, octyl, nonyl and decyl, and a temperature range of the liquid crystal phase can be controlled by a difference in a length of the alkyl. Further, in the case where they are fluorine or chlorine, the effect of lowering a melting point of the compound (1) can be expected.

$Y^1$ and $Y^2$ in Formula (1) are bonding groups. They are alkylene having a carbon number of 1 to 15, and optional —CH$_2$— in the above alkylene may be substituted with —O—, —COO—, —OCO— or —CO—.

The preferred examples of $Y^1$ and $Y^2$ are alkylene having a carbon number of 1 to 12, and optional —CH$_2$— in the above alkylene may be substituted with —O—, —COO—, —OCO— or —CO—.

More preferred examples of $Y^1$ and $Y^2$ are alkylene having a carbon number of 1 to 10, and optional —CH$_2$— in the above alkylene may be substituted with —O—, —COO— or —OCO—.

$A^1$ and $A^2$ are divalent groups having a ring structure. They are independently 1,4-cyclohexylene, 1,4-cyclohexylene in which at least one hydrogen is substituted with fluorine, 1,4-cyclohexenylene, 1,4-phenylene, 1,4-phenylene in which at least one hydrogen is substituted with halogen, methyl or trifluoromethyl, pyridine-2,5-diyl, pyridazine-3,6-diyl, pyrimidine-2,5-diyl, naphthalene-2,6-diyl, 1,2,3,4-tetrahydronaphthalene-2,6-diyl, 5,6,7,8-tetrahydronaphthalene-2,6-diyl or 1,3-dioxane-2,5-diyl. The preferred examples of $A^1$ and $A^2$ shall be shown below.

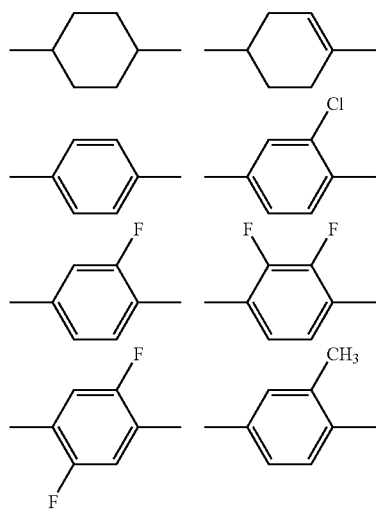

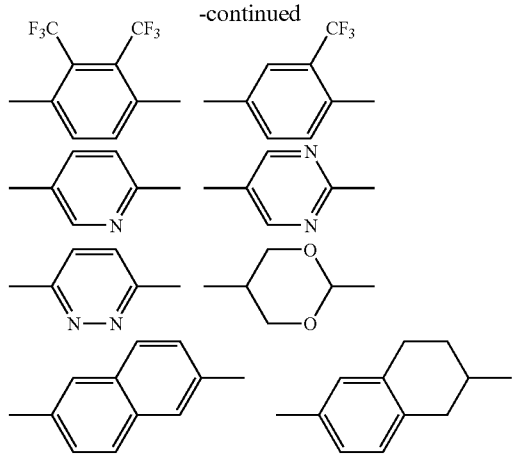

More preferred examples of $A^1$ and $A^2$ are 1,4-cyclohexylene, 1,4-phenylene, 1,4-phenylene in which one hydrogen is substituted with fluorine, chlorine, methyl or trifluoromethyl or 1,4-phenylene in which two hydrogens are substituted with fluorine or trifluoromethyl.

In the above ring structures, left and right sites may be bonded in a reverse position in Formula (1). When the compound (1) has 1,4-phenylene or 1,3-dioxane-2,5-diyl, the configuration thereof is preferably a trans type rather than a cis type. The compound (1) may contain isotopes such as $^2$H (heavy hydrogen) and $^{13}$C in a larger proportion than a proportion in which they are present in the nature, and in such case, the compound is not different in physical properties to a large extent.

$X^1$, $X^2$, $X^3$ and $X^4$ in Formula (1) are bonding groups. $X^1$ and $X^2$ are independently a single bond, —O—, —S—, —COO— or —OCO—. Among them, more preferred examples are a single bond and —O—. $X^3$ and $X^4$ are independently —COO—, —OCO—, —CH$_2$CH$_2$— or —C≡C—. When at least one of $X^3$ and $X^4$ is —COO— or —OCO—, the liquid crystallinity tends to be improved, and when it is —C≡C—, the compound having a large optical anisotropy tends to be obtained.

The term n is 0 or 1. The compound of m=n=0 is a diepoxy compound, and it has a fast curing speed and exhibits a quick curing performance. The compound of m=n=1 is a dioxetane compound, and the resulting optically anisotropic film has small shrinkage in curing, so that the film having an excellent dimensional stability is obtained.

Suitable selection of the rings, the side chains, the bonding groups and the polymerizable groups makes it possible to provide the compound (1) having the targeted physical properties.

Next, a production process for the compound (1) shall be explained. Shown is a production process for the compound in which in Formula (1), $R^1$ and $R^2$ are hydrogens; $A^1$=$A^2$; $Y^1$=$Y^2$; $X^1$ and $X^2$ are —O—; $X^3$ is —COO—, and $X^4$ is —OCO—; and m=n=0. A compound [a]having a double bond at an end and a hydroxybenzoic acid ester derivative are etherified in the presence of a suitable base to thereby obtain a compound [b]. The examples of the base are potassium hydroxide, sodium hydroxide, potassium carbonate and sodium hydride. The compound [b] is hydrolyzed to thereby obtain a compound [c]. A diester [e] is obtained by esterification of a 2,7-dihydroxyfluorene derivative [d] and the compound [c]. The diester [e] is oxidized by peroxide to thereby produce the compound (1). The peroxide includes aqueous hydrogen peroxide, performic acid, peracetic acid, perbenzoic acid and m-chloroperbenzoic acid.

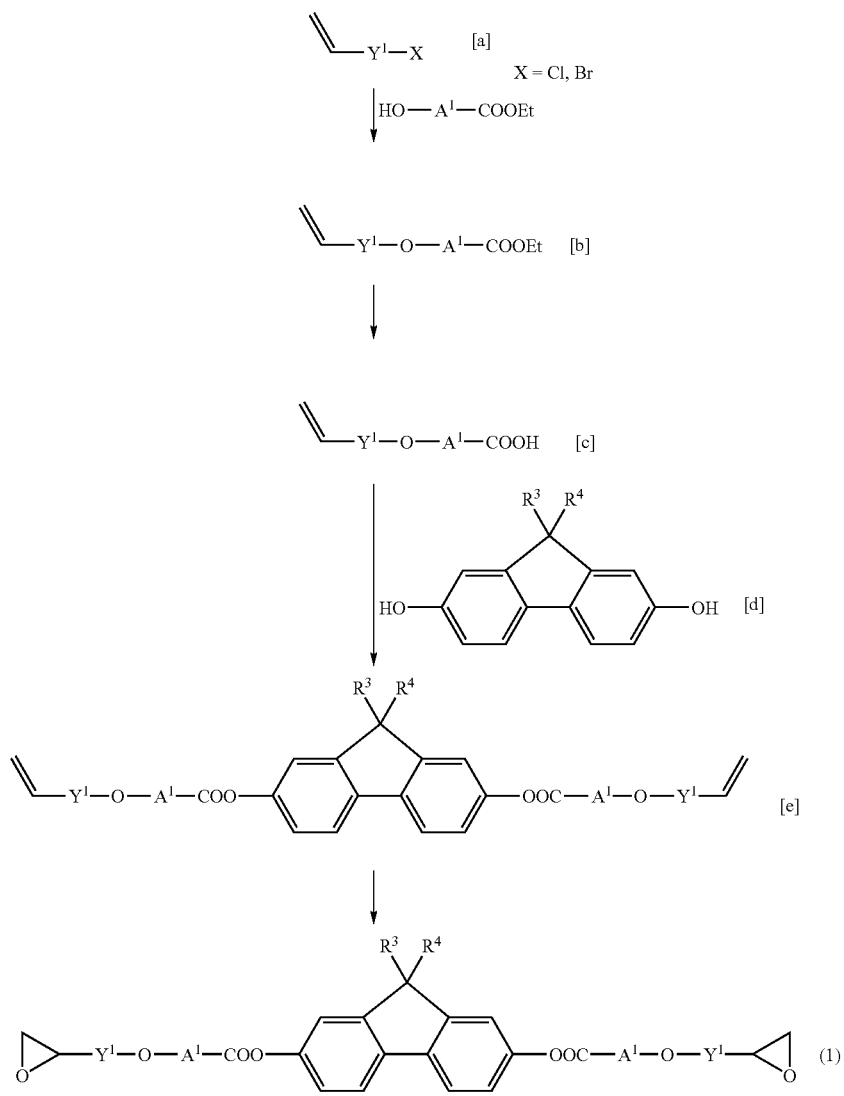

Shown is a production process for the compound in which in Formula (1), $R^1$ and $R^2$ are alkyls having a carbon number of 1 to 5, $A^1=A^2$, $Y^1=Y^2$, $X^1$ and $X^2$ are —O—, $X^3$ is —COO—, $X^4$ is —OCO— and m=n=1. Compound [f] and a hydroxybenzoic acid ester derivative are etherified in the presence of a suitable base to thereby obtain compound [g].

The examples of the base are potassium hydroxide, sodium hydroxide, potassium carbonate and sodium hydride. Compound [g] is hydrolyzed to thereby obtain a compound [h].

The compound (1) is produced by esterification of a 2,7-dihydroxyfluorene derivative [d] and compound [h].

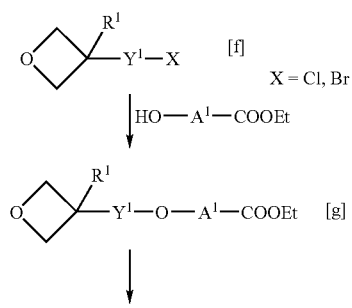

-continued

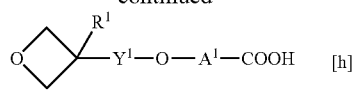

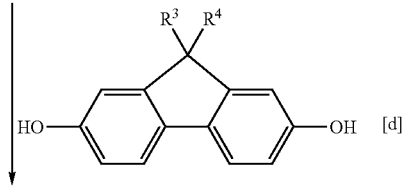

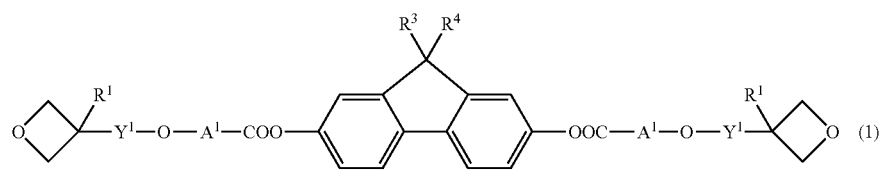

Shown is a production process for the compound in which in Formula (1), $R^1$ is alkyl having a carbon number of 1 to 5, and $R^2$ is hydrogen, $X^1$ and $X^2$ are —O—, $X^3$ is —COO—, $X^4$ is —OCO—, m=1, and n=0. Fluorene derivative [i] in which the other hydroxyl group is blocked with a terahydropyranyl group and benzoic acid derivative [h] are subjected to esterification reaction to thereby produce a monoester, and then it is deblocked. Further, it is subjected to esterification reaction with benzoic acid derivative [c] other than the compound selected in the first esterification to thereby obtain diester [j]. Diester [j] is oxidized by peroxide to thereby produce the compound (1).

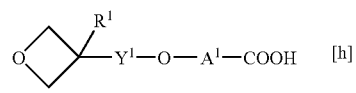

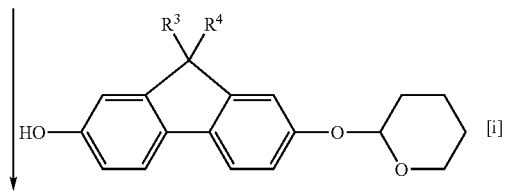

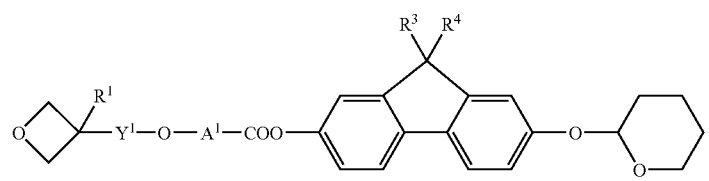

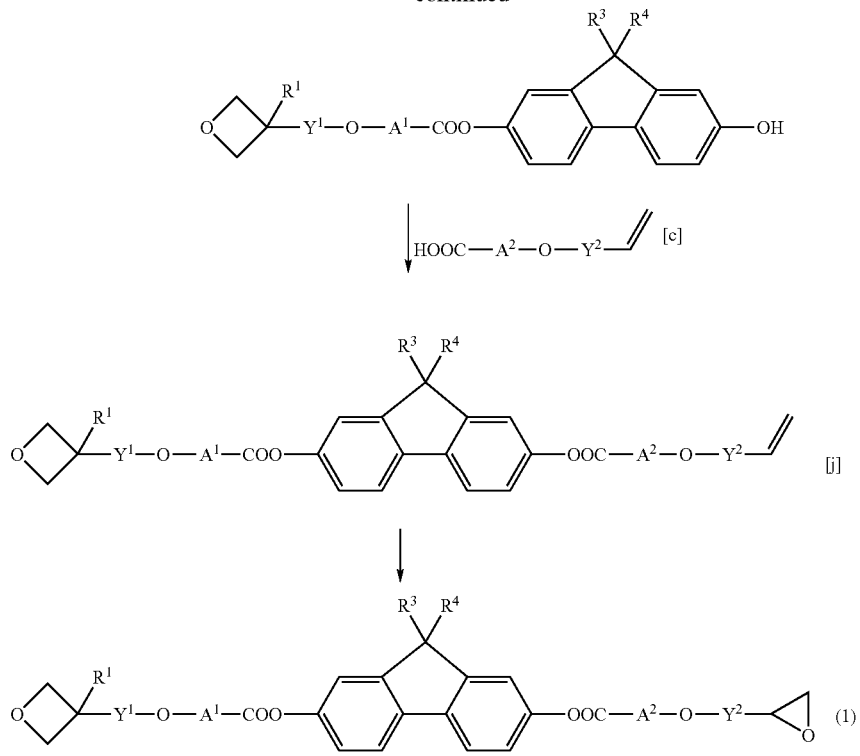
Compounds No. 1 to No. 97 which can be synthesized shall be shown below.
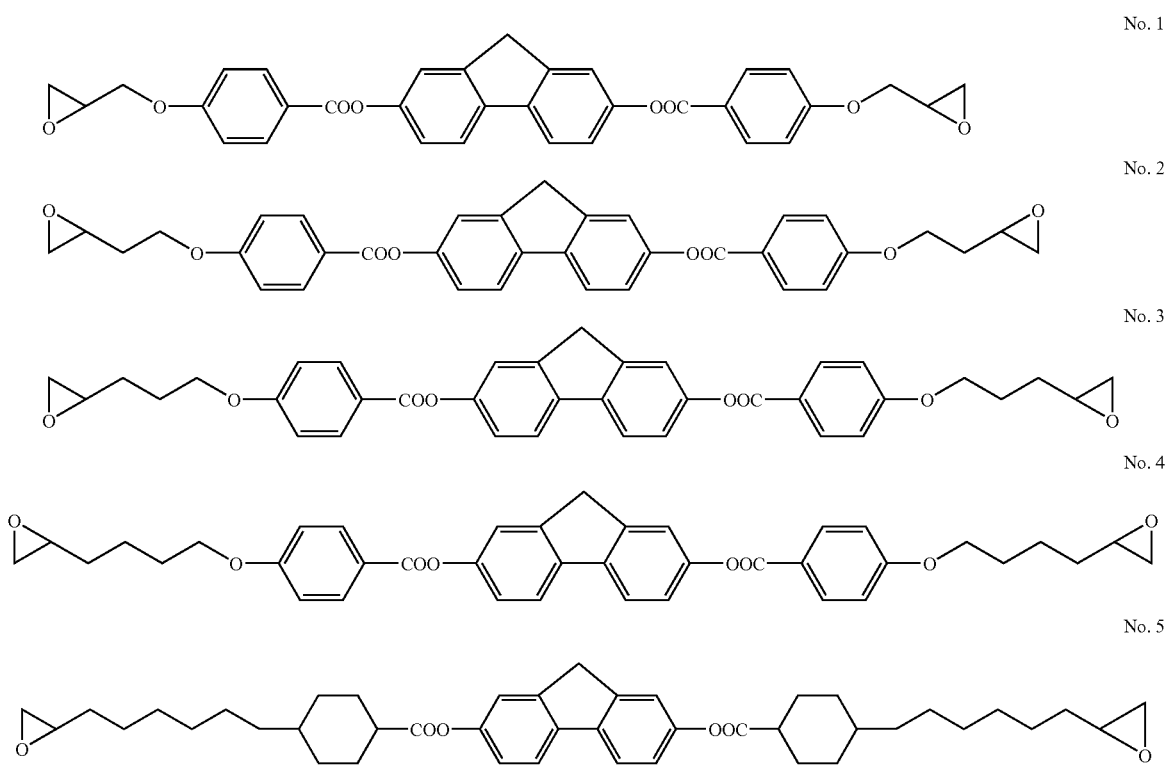

-continued
No. 6
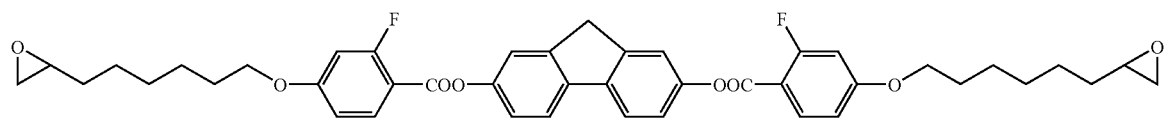
No. 7
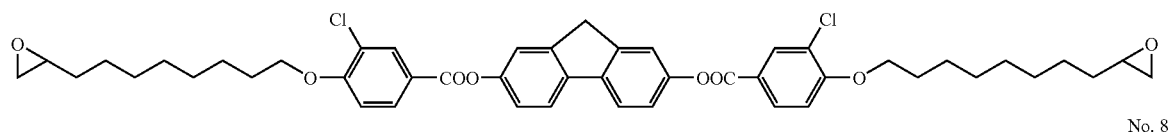
No. 8
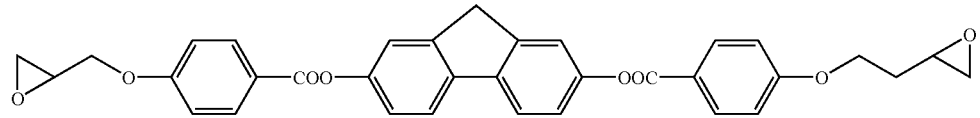
No. 9
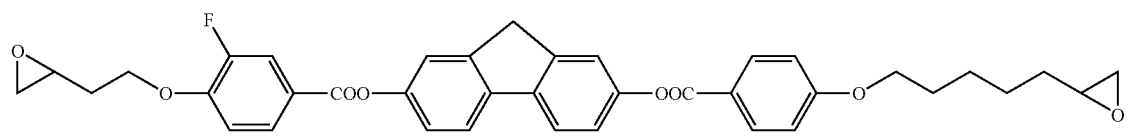
No. 10
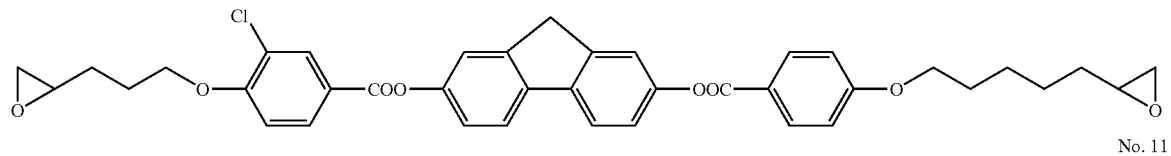
No. 11
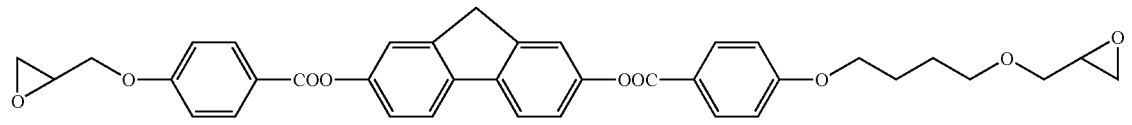
No. 12
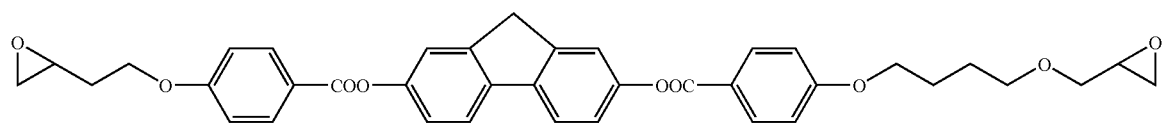
No. 13
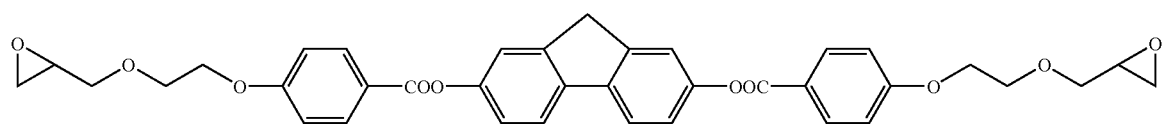
No. 14
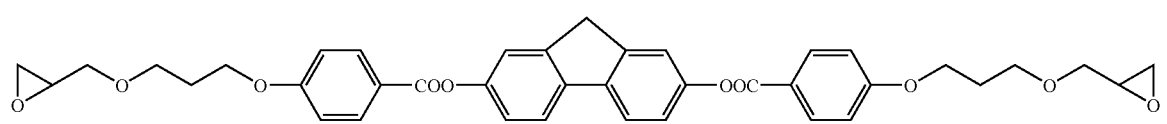
No. 15
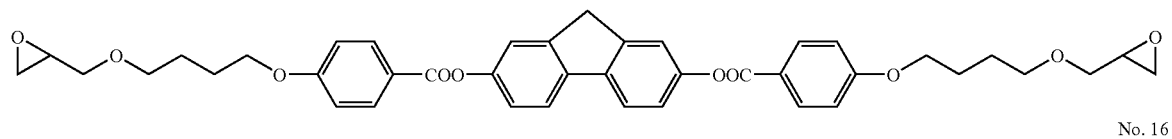
No. 16
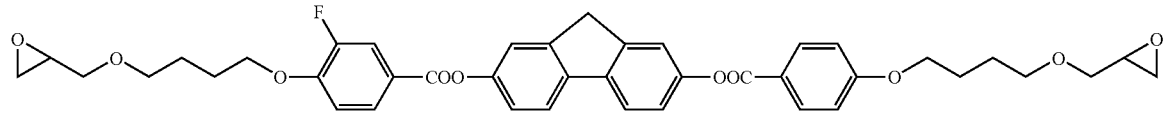

-continued
No. 17
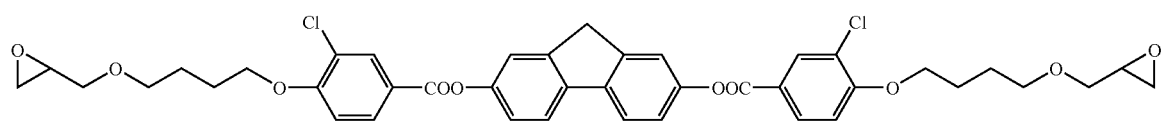
No.18
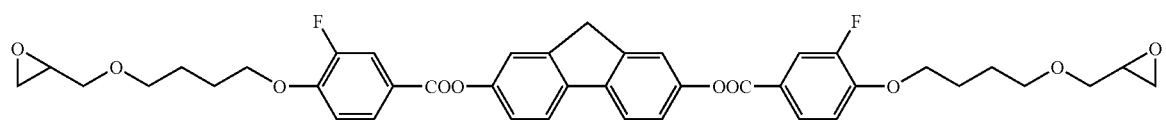
No.19
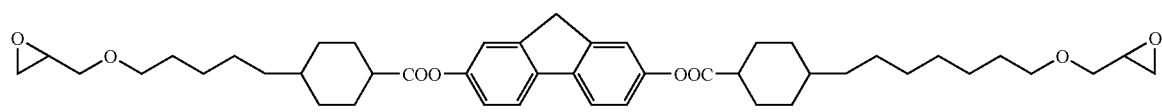
No.20
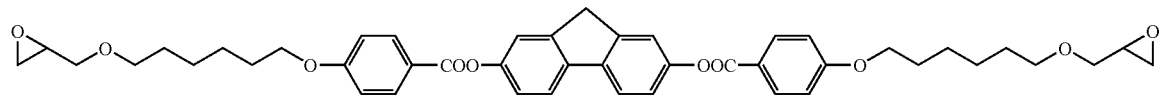
No.21
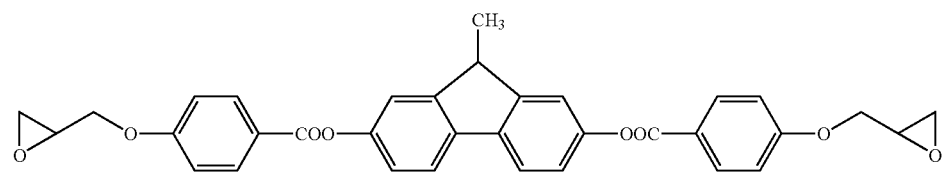
No.22
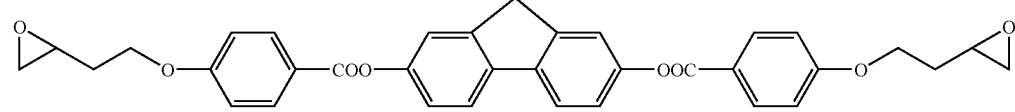
No.23
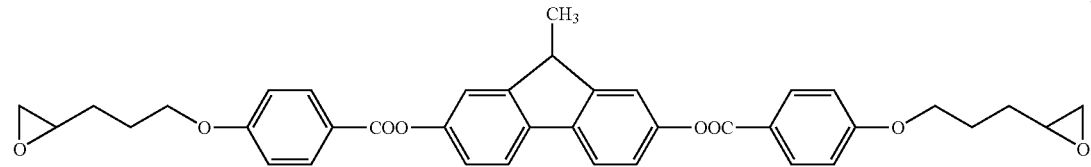
No.24
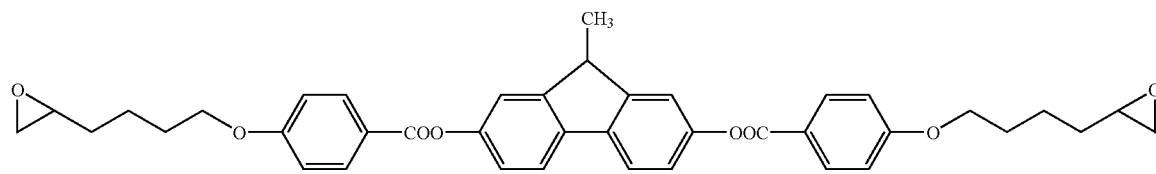
No.25
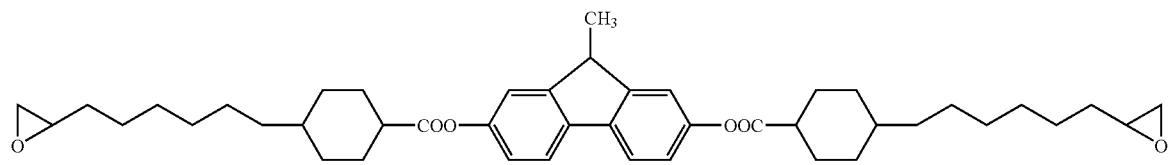

-continued
No. 26
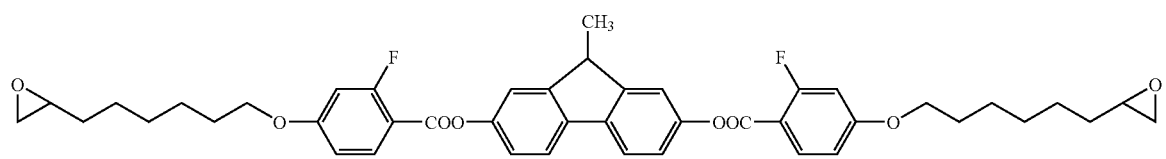
No. 27
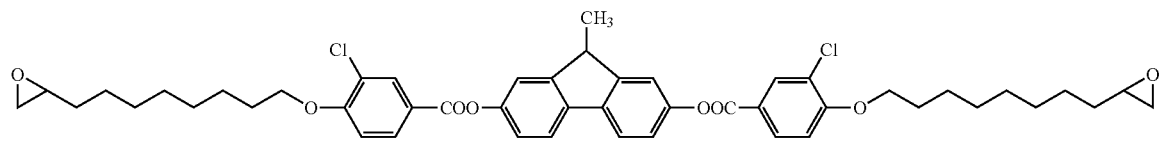
No. 28
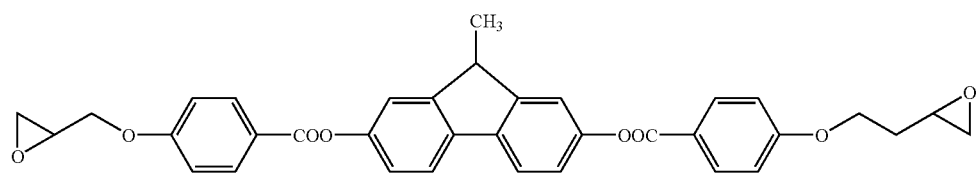
No. 29
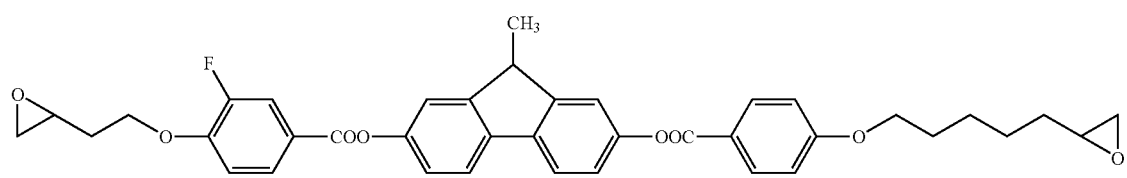
No. 30
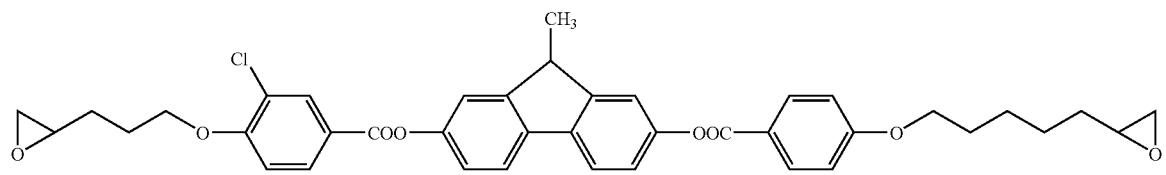
No. 31
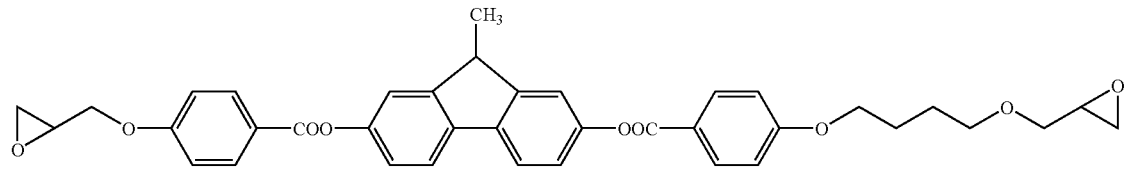
No. 32
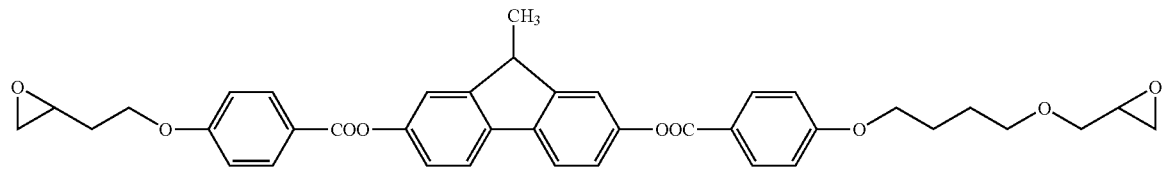
No. 33
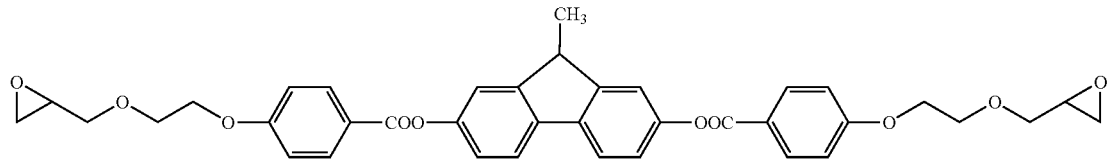

-continued
No. 34
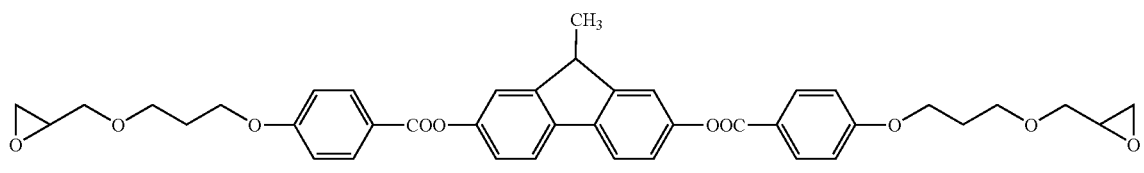
No. 35
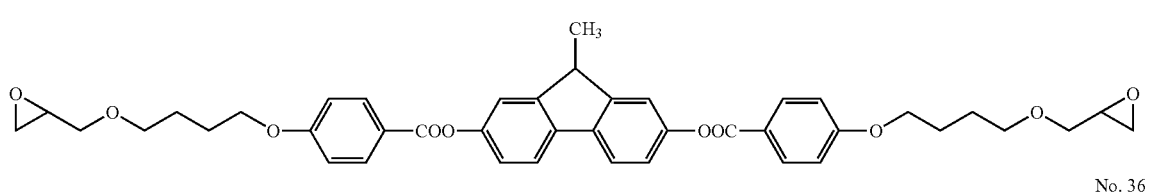
No. 36
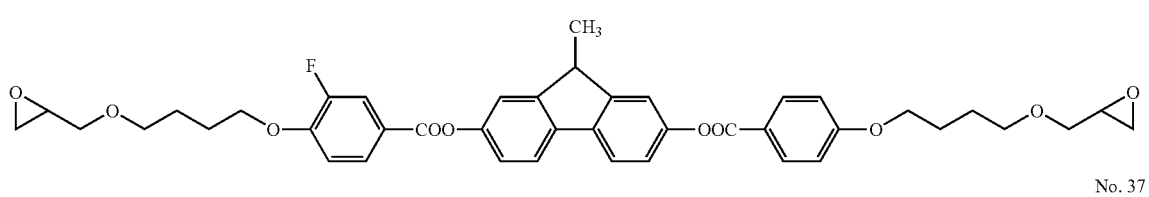
No. 37
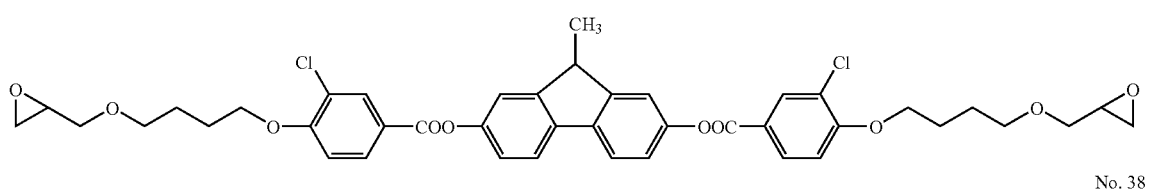
No. 38
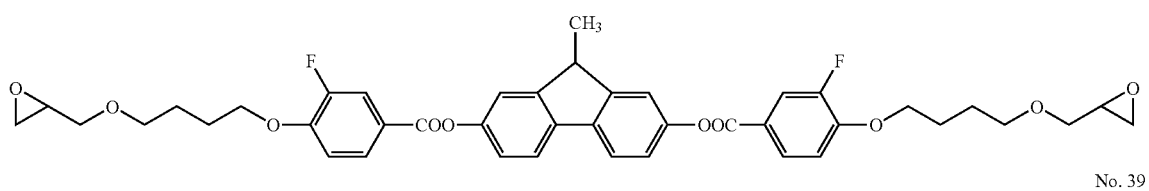
No. 39
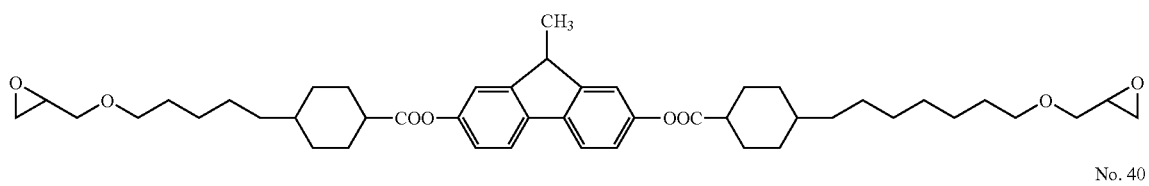
No. 40
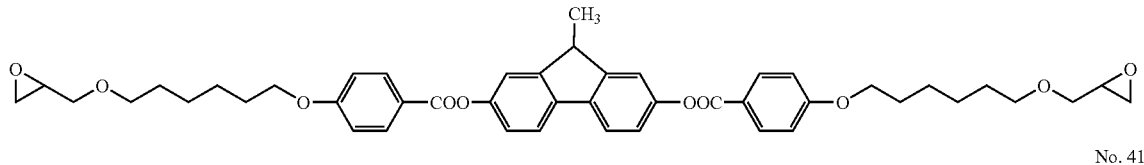
No. 41
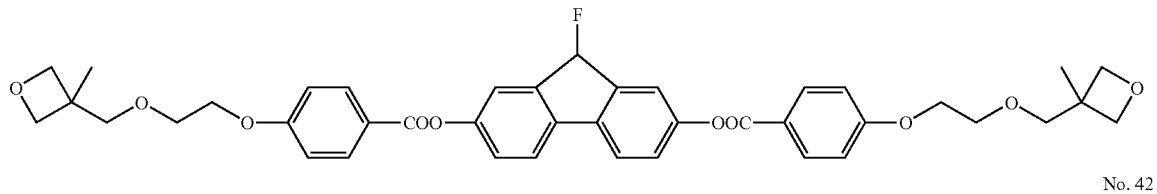
No. 42

-continued
No. 43
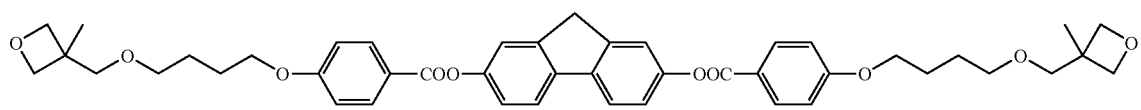
No. 44
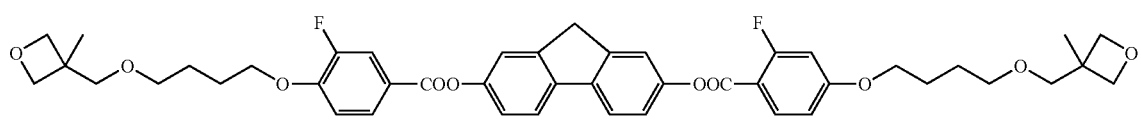
No. 45
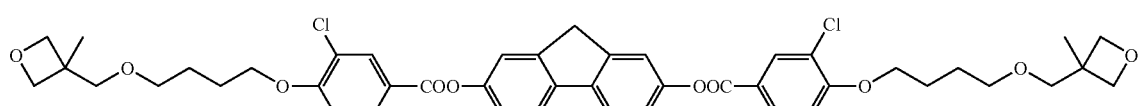
No. 46
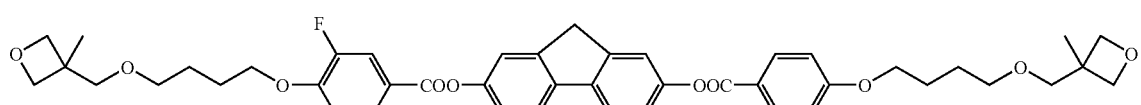
No. 47
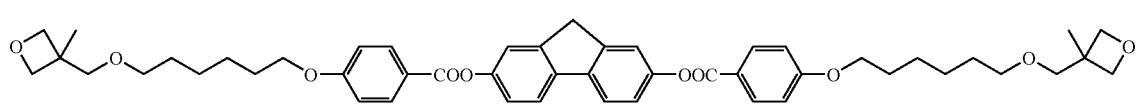
No. 48
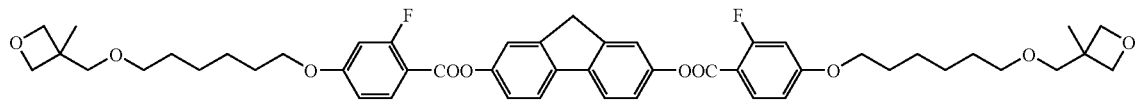
No. 49
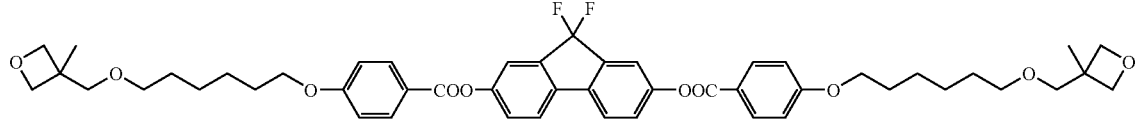
No. 50
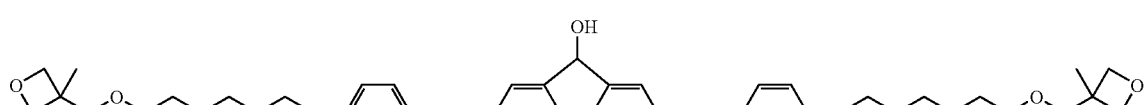
No. 51
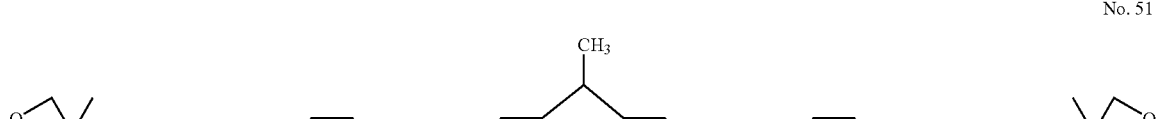
No. 52
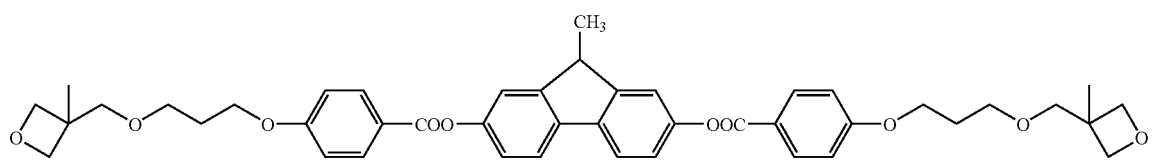

-continued
No. 53
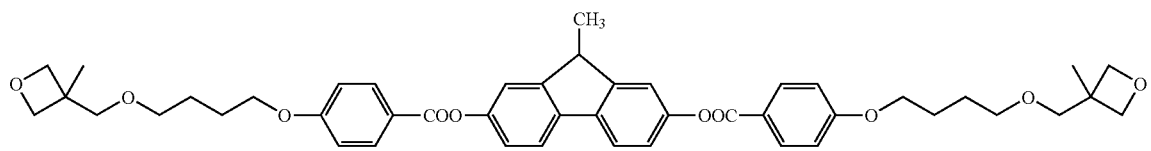
No. 54
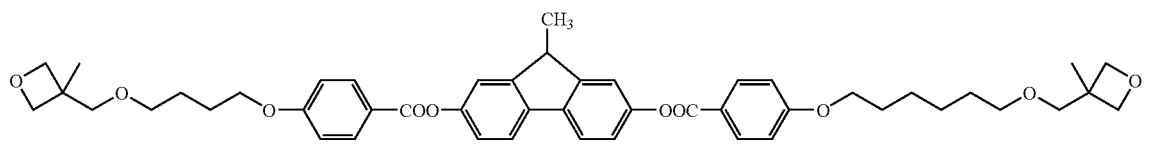
No. 55
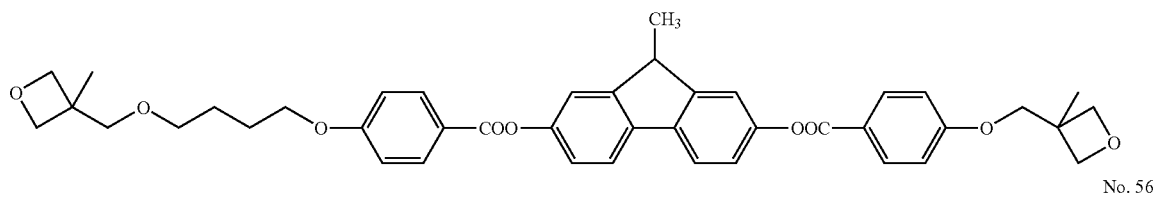
No. 56
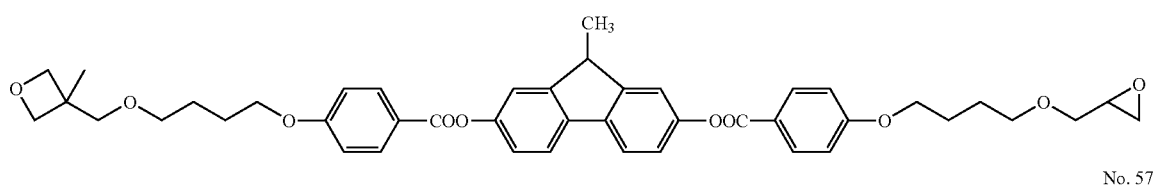
No. 57
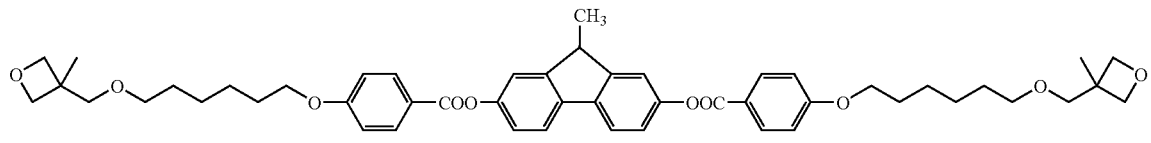
No. 58
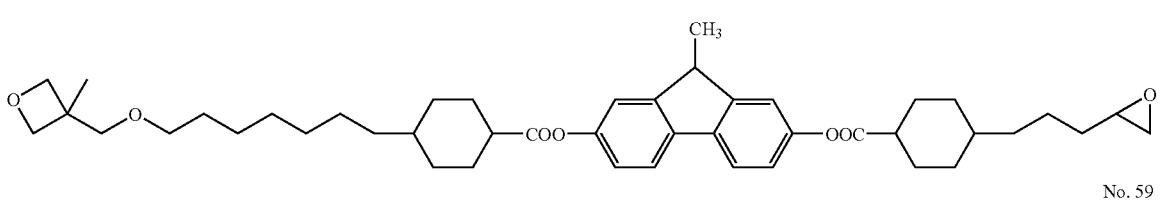
No. 59
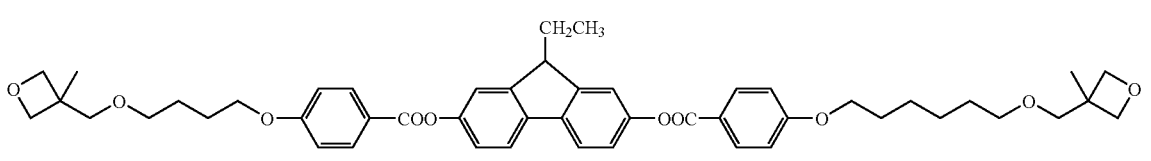
No. 60
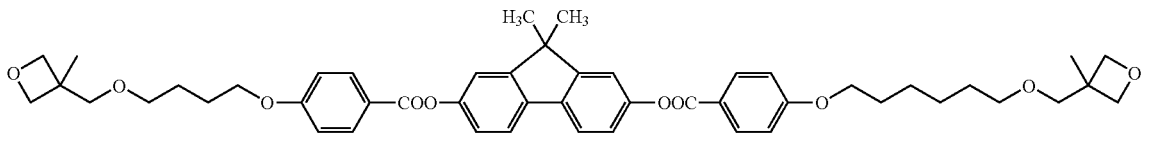
No. 61
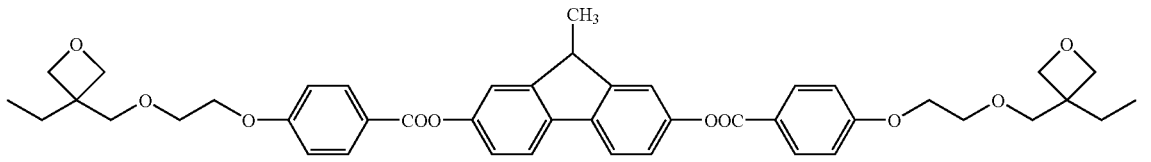

-continued
No. 62
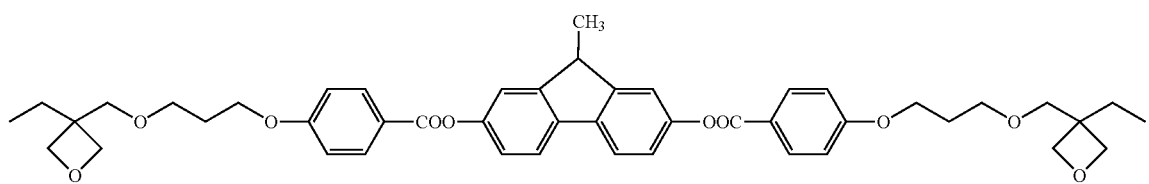
No. 63
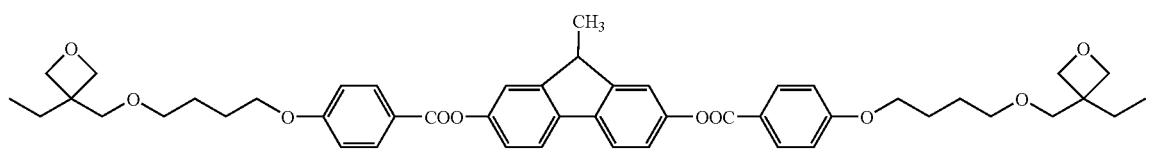
No. 64
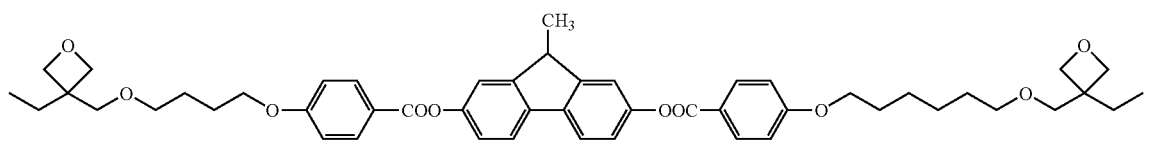
No. 65
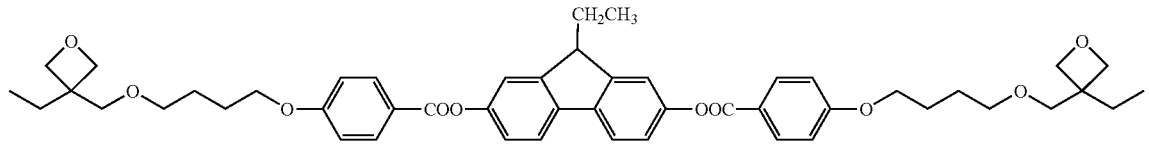
No. 66
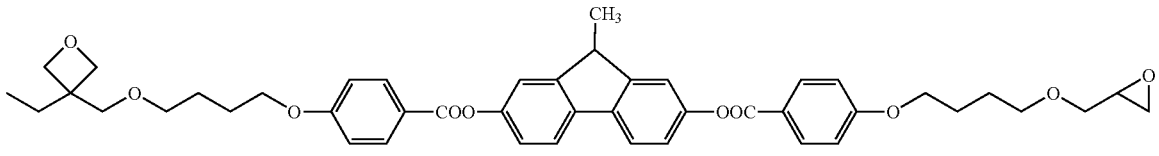
No. 67
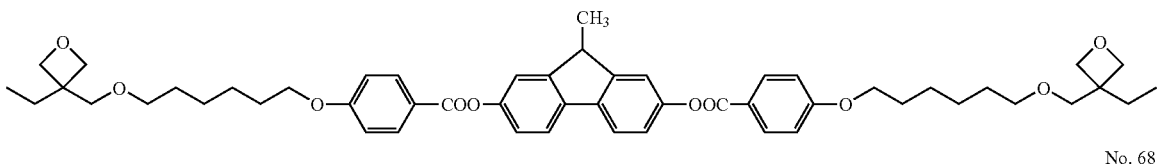
No. 68
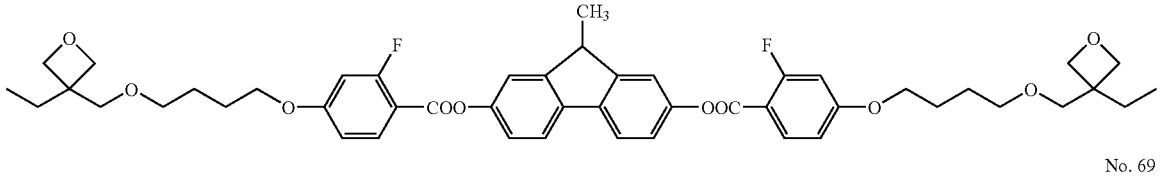
No. 69
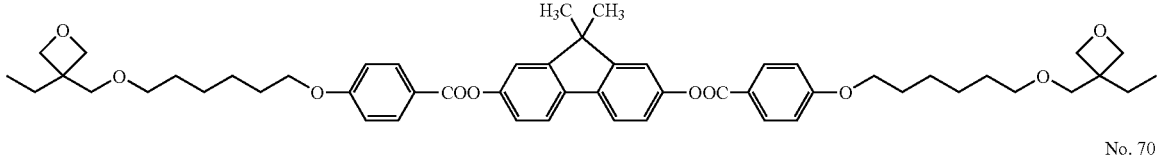
No. 70
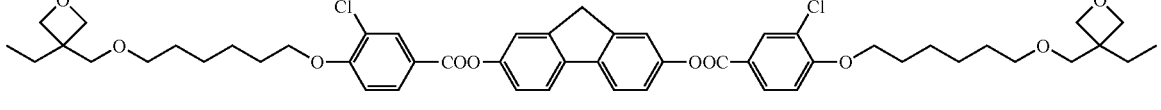

-continued
No. 71
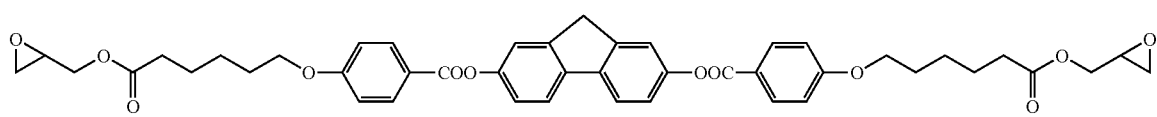
No. 72
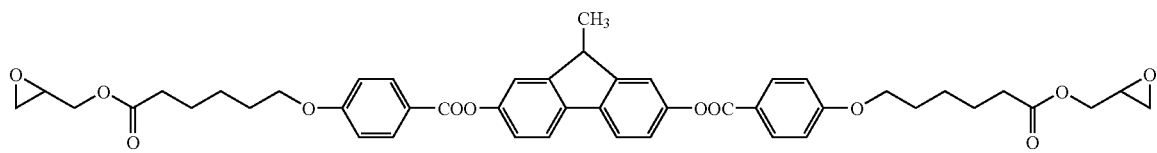
No. 73
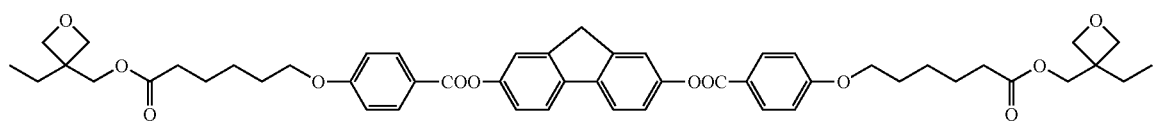
No. 74
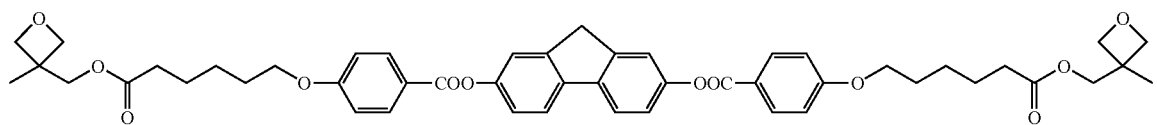
No. 75
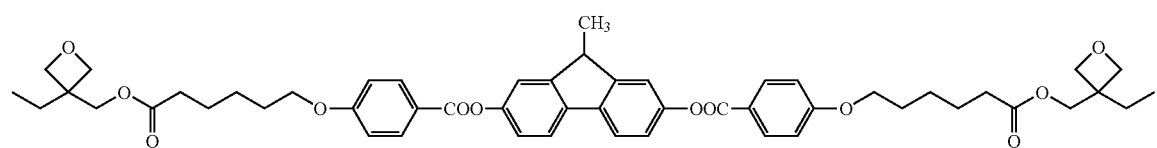
No. 76
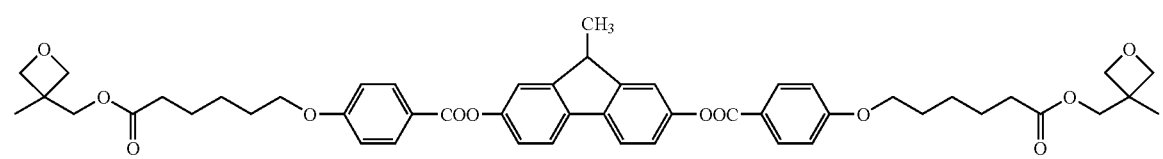
No. 77
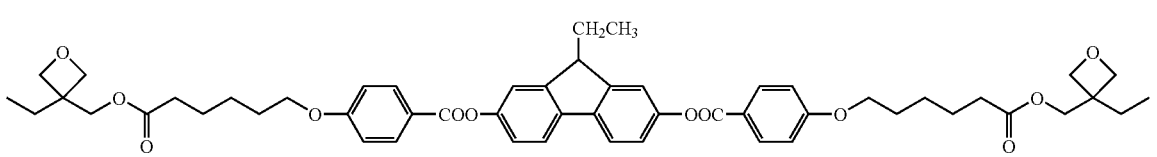
No. 78
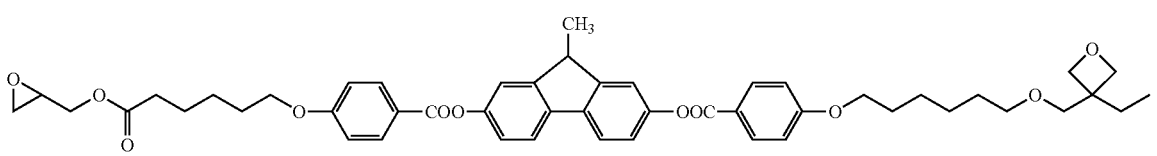
No. 79
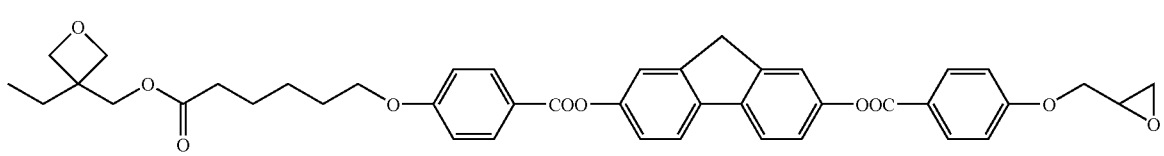

-continued
No.80
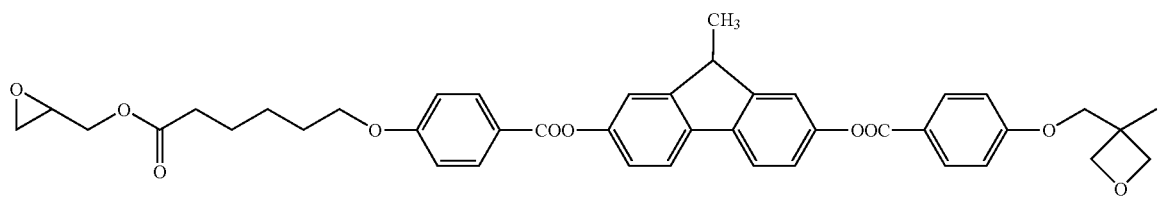
No. 81
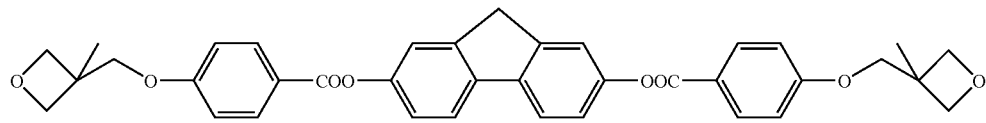
No. 82
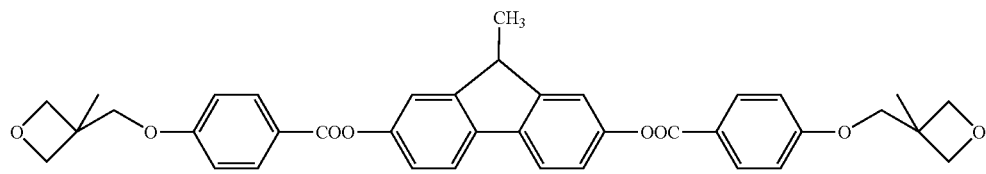
No. 83
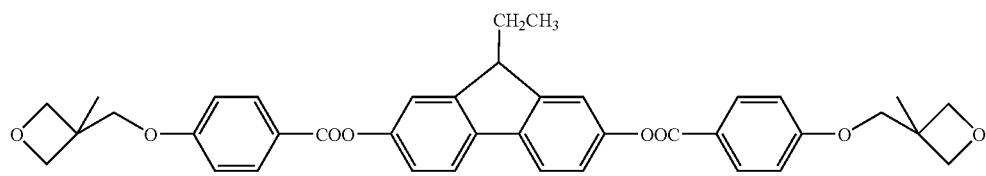
No. 84
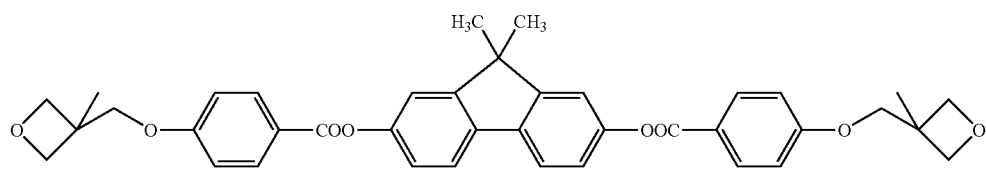
No. 85
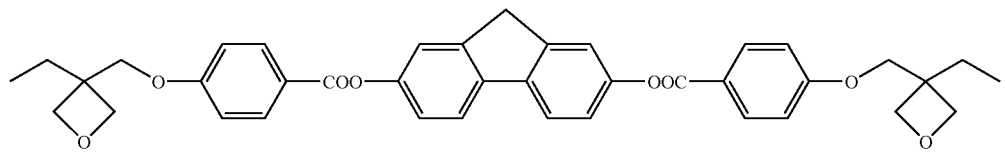
No. 86
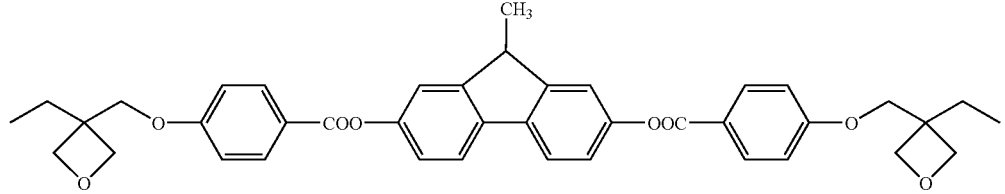
No. 87
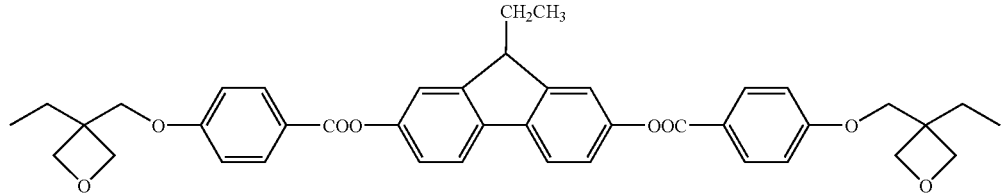

-continued
No. 88
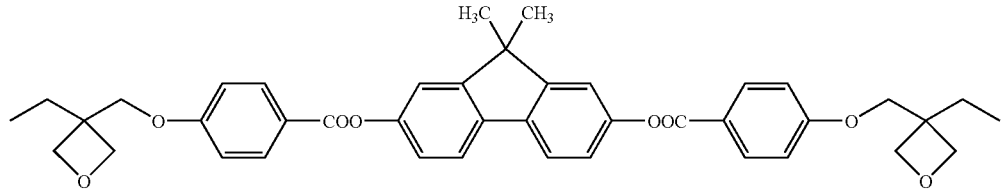
No. 89
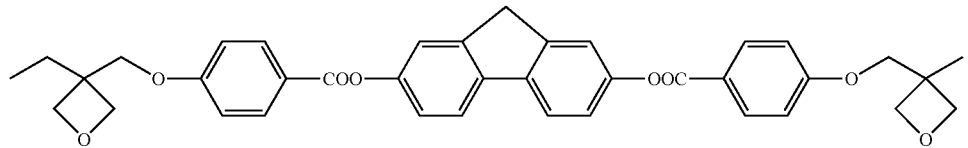
No. 90
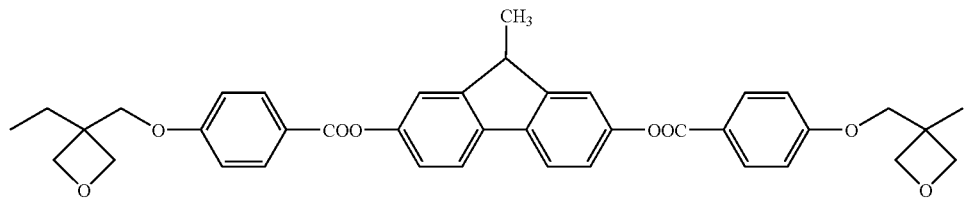
No. 91
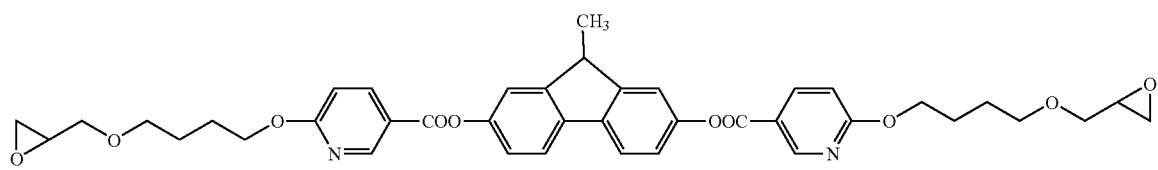
No. 92
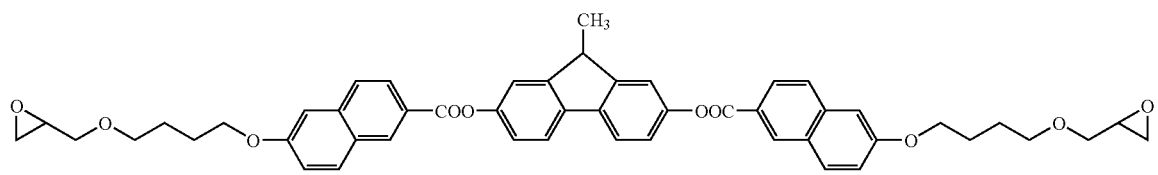
No. 93
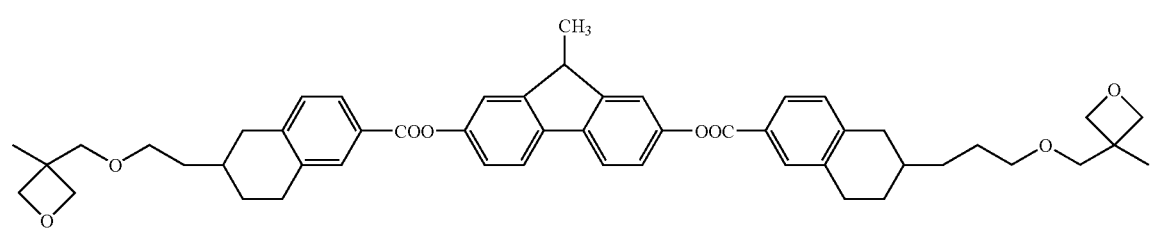
No. 94
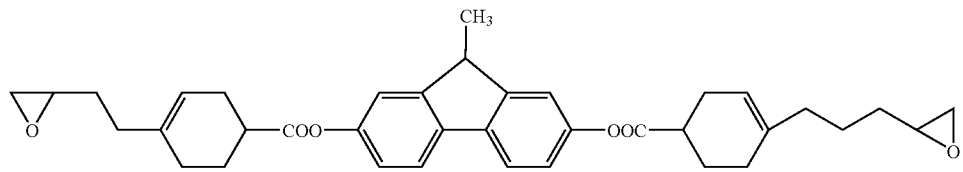
No. 95
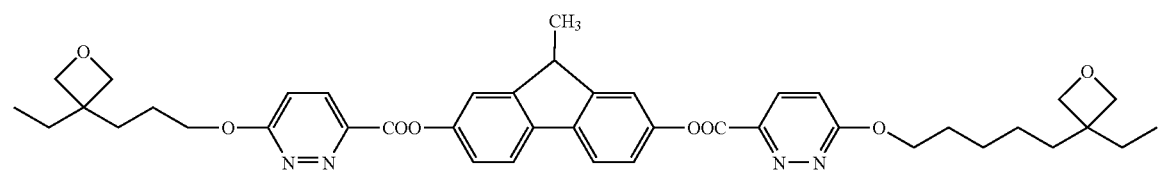

-continued

No. 96
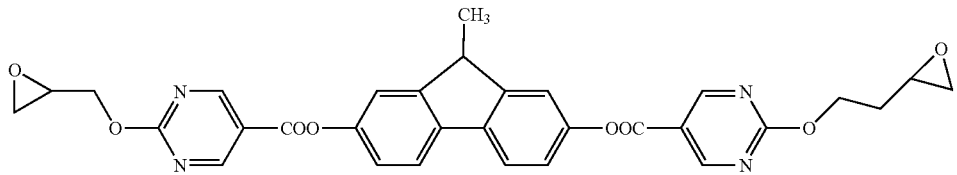

No. 97
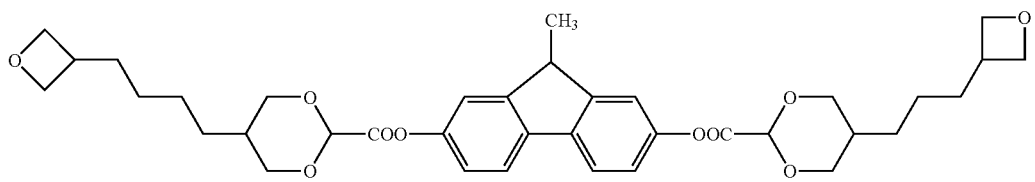

The composition has the following characteristics.

It is constituted by a liquid crystalline compound which is provided with a large polymerization reactivity by an epoxy group and an oxetane group, and therefore it can quickly be cured by adding a suitable polymerization initiator and irradiating with an electron beam such as a UV ray.

It is excellent in an aligning property.

It is excellent in a compatibility with other polymerizable liquid crystal compounds.

The second present invention is a liquid crystal composition comprising at least two compounds, wherein at least one compound is the compound represented by Formula (1). To be more specific, it is a liquid crystal composition comprising at least one of the compounds represented by Formula (1) and at least one polymerizable compound selected from compounds represented by Formulas (M1) to (M8):

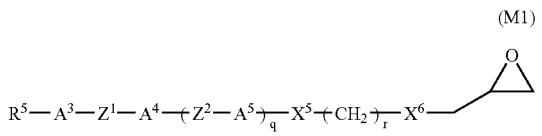 (M1)

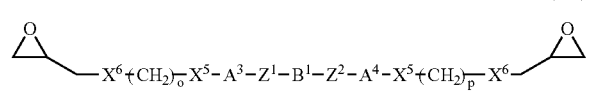 (M2)

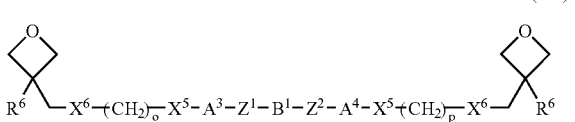 (M3)

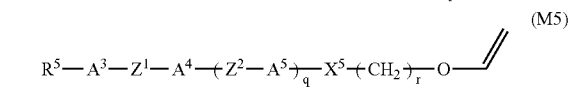 (M4)

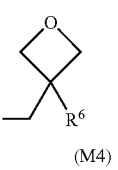 (M5)

 (M6)

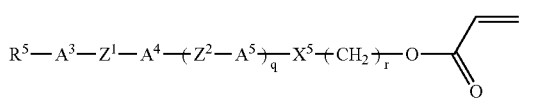 (M7)

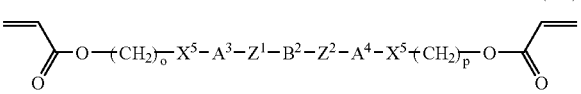 (M8)

In Formulas (M1) to (M8), $R^5$ is independently hydrogen, fluorine, chlorine, —CN or alkyl having a carbon number of 1 to 20; in the above alkyl, optional —$CH_2$— may be substituted with —O—, —S—, —COO—, —OCO— or —CO—, and optional hydrogen may be substituted with halogen; $R^6$ is hydrogen or alkyl having a carbon number of 1 to 5; $A^3$, $A^4$ and $A^5$ are independently 1,4-cyclohexylene, 1,4-phenylene, 1,4-phenylene in which at least one hydrogen is substituted with halogen, pyridine-2,5-diyl, pyrimidine-2,5-diyl, naphthalene-2,6-diyl or fluorene-2,7-diyl; $B^1$ is independently a single bond, 1,4-phenylene, 1,4-phenylene in which at least one hydrogen is substituted with halogen, methyl or trifluoromethyl, naphthalene-2,6-diyl or biphenyl-4,4'-diyl; $B^2$ is independently a single bond, 1,4-phenylene, 1,4-phenylene in which at least one hydrogen is substituted with halogen, methyl or trifluoromethyl, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl or 9,9-difluorofluorene-2,7-diyl; $Z^1$ and $Z^2$ are independently a single bond, —COO—, —OCO—, —$CH_2CH_2$— or —C≡C—; $X^5$ or $X^6$ is independently a single bond or —O—; q is independently 1 or 0, and o, p and r are independently an integer of 0 to 20.

The particularly preferred compounds out of the compounds (M1) are monofunctional liquid crystalline epoxides represented by Formulas (M1a) to (M1h).

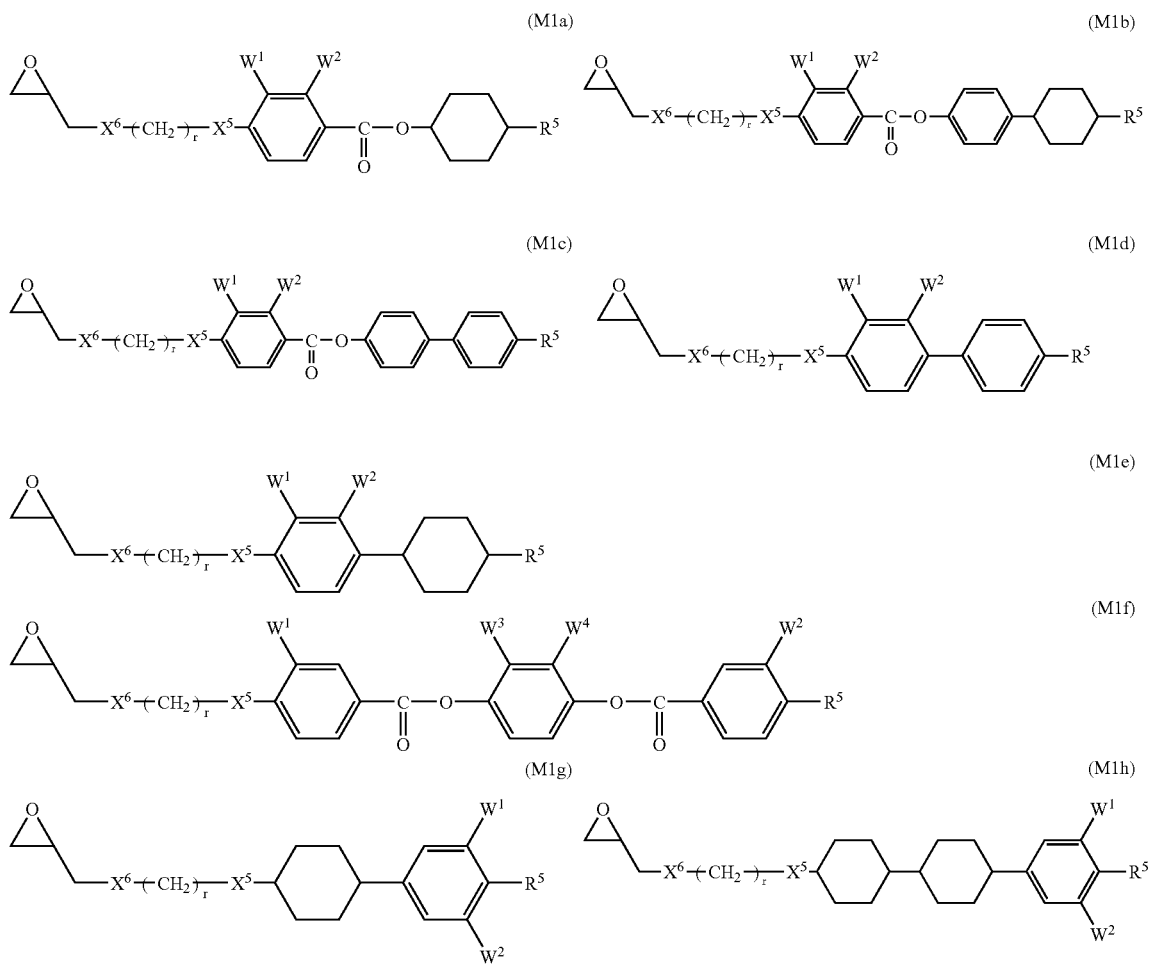
The particularly preferred compounds out of the compounds (M2) are difunctional liquid crystalline epoxides represented by Formulas (M2a) to (M2d).
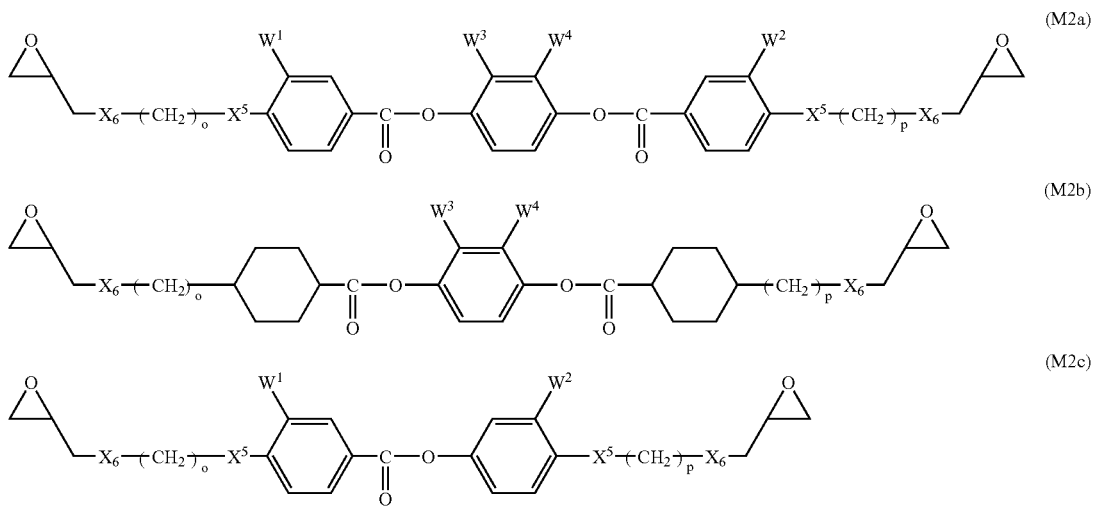

-continued
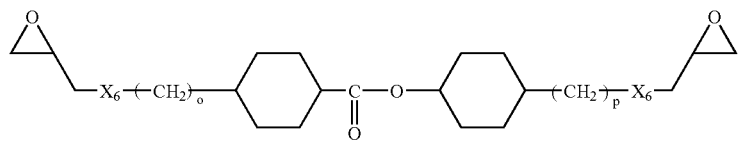
(M2d)
The particularly preferred compounds out of the compounds (M3) are monofunctional liquid crystalline oxetanes represented by Formulas (M3a) to (M3h).
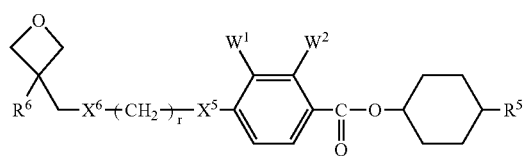
(M3a)
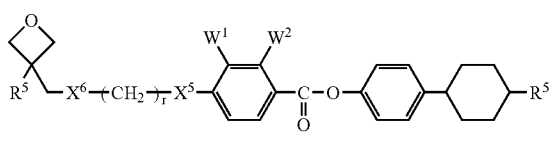
(M3b)
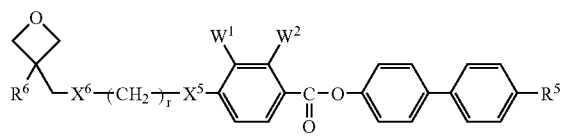
(M3c)
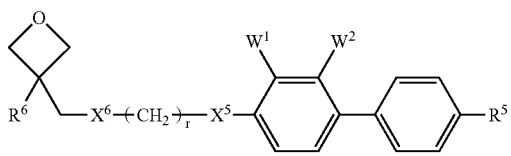
(M3d)
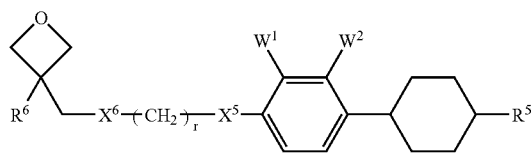
(M3e)
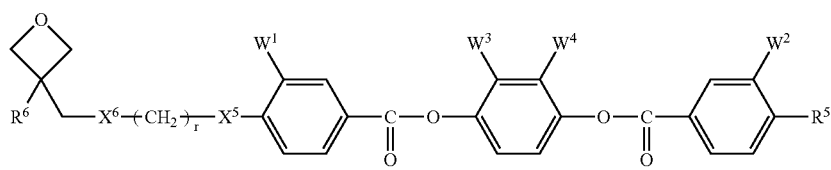
(M3f)
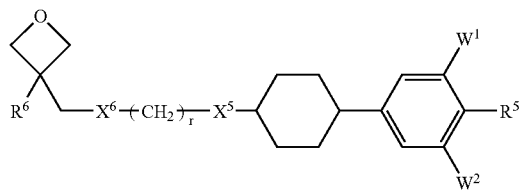
(M3g)
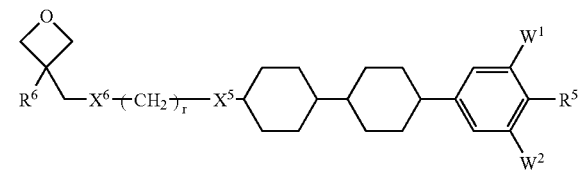
(M3h)

The particularly preferred compounds out of the compounds (M4) are difunctional liquid crystalline oxetanes represented by Formulas (M4a) to (M4d).
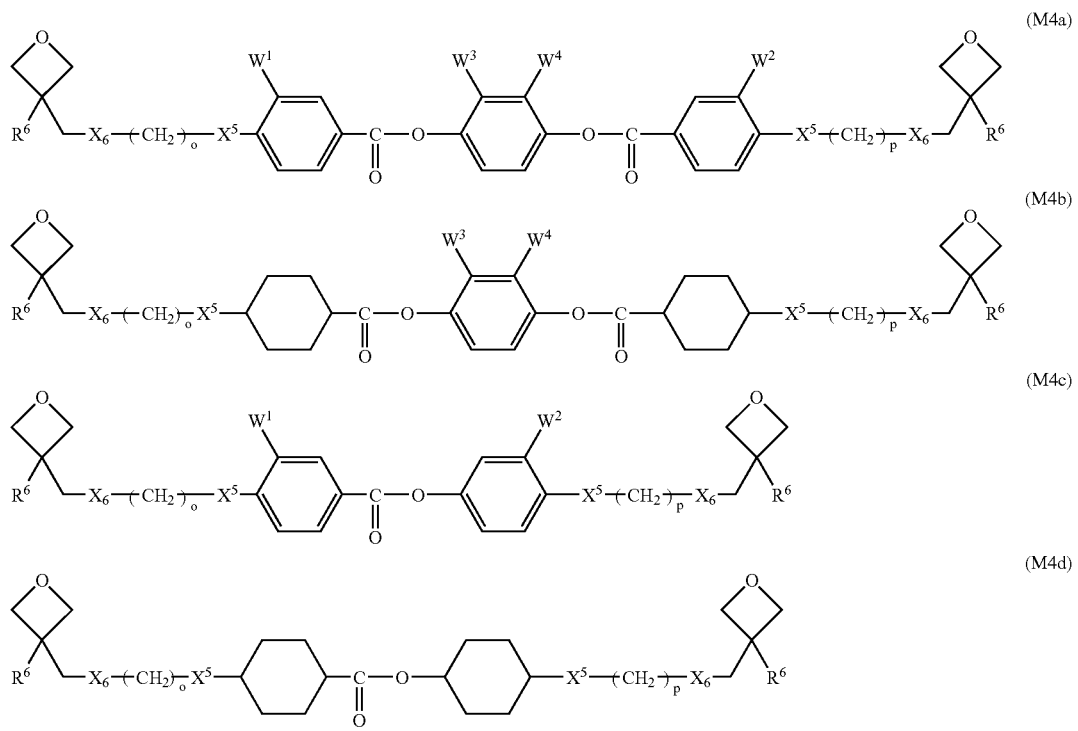
The particularly preferred compounds out of the compounds (M5) are monofunctional liquid crystalline vinyl ethers represented by Formulas (M5a) to (M5h).
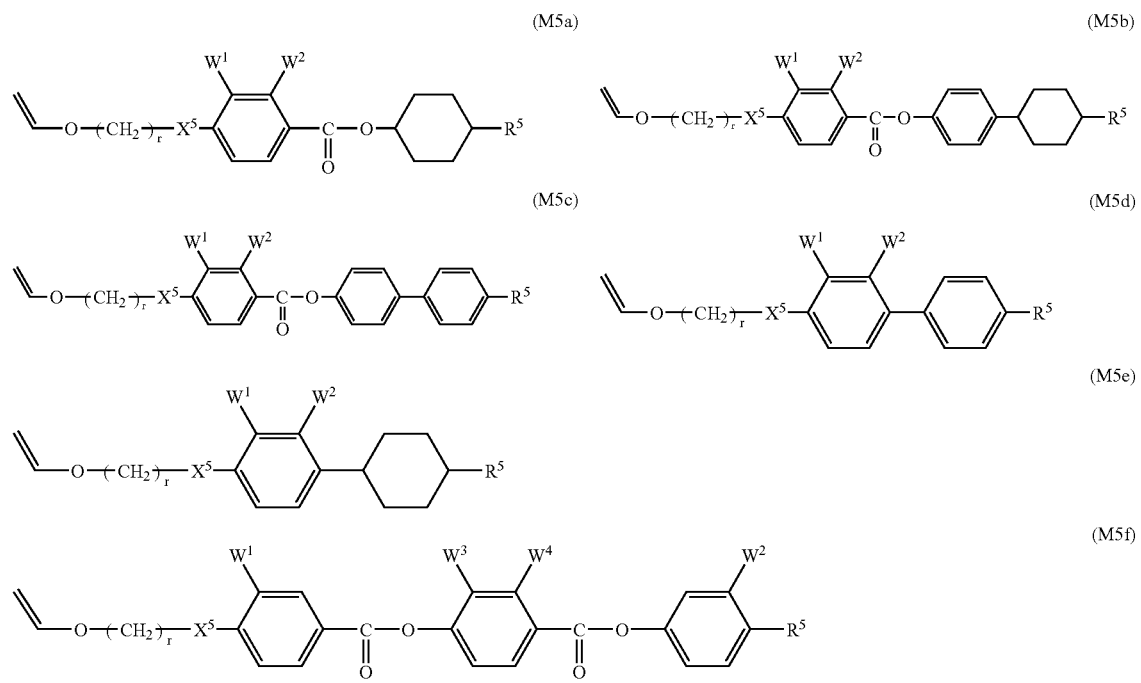

(M5g) 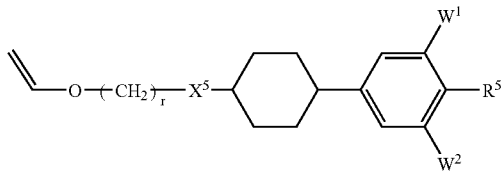
(M5h) 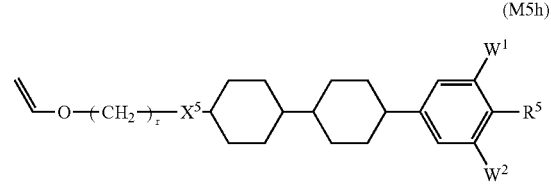
The particularly preferred compounds out of the compounds (M6) are difunctional liquid crystalline vinyl ethers represented by Formulas (M6a) to (M6f).
(M6a) 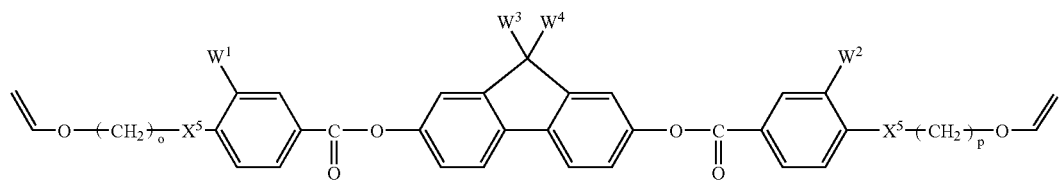
(M6b) 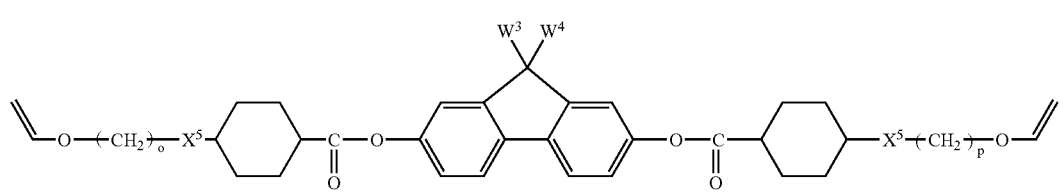
(M6c) 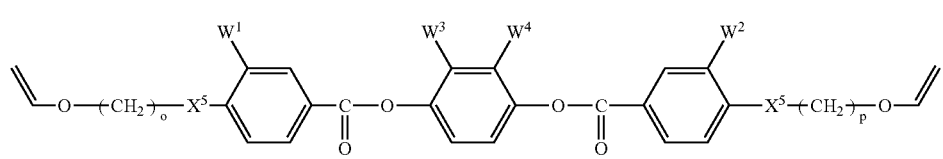
(M6d) 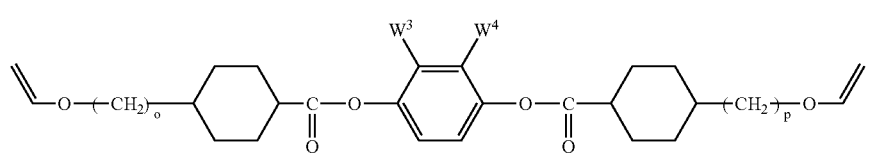
(M6e) 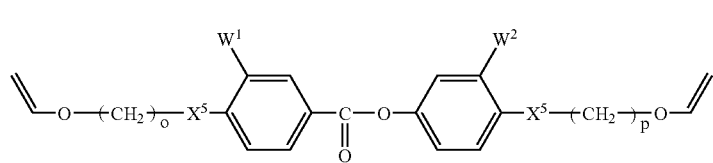
(M6f) 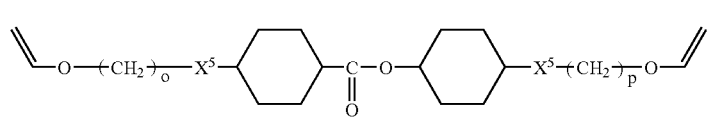

The particularly preferred compounds out of the compounds (M7) are monofunctional liquid crystalline acrylates represented by Formulas (M7a) to (M7h).
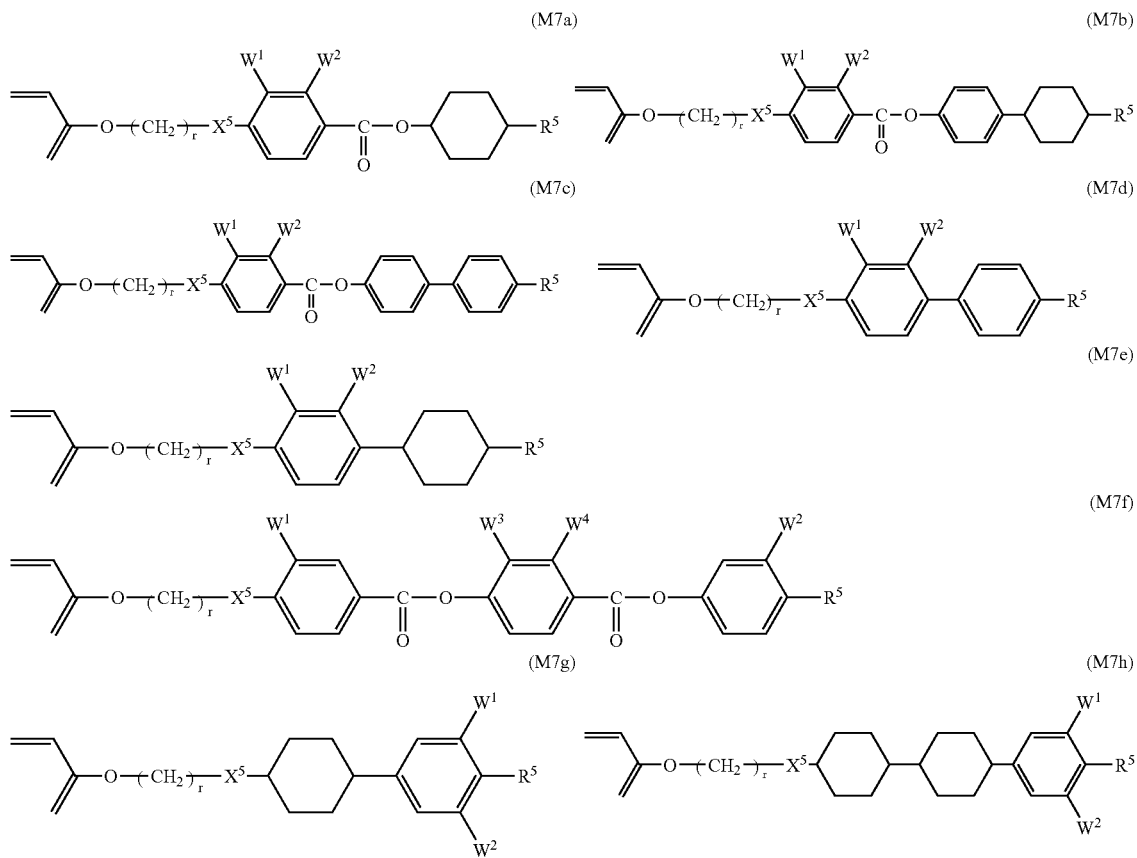
The particularly preferred compounds out of the compounds (M8) are difunctional liquid crystalline acrylates represented by Formulas (M8a) to (M8f)
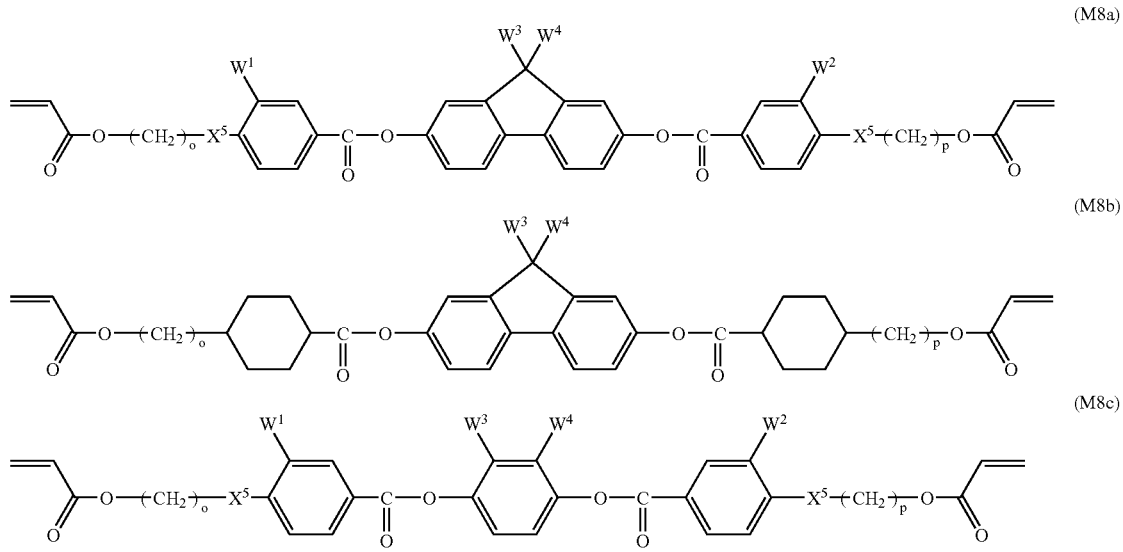

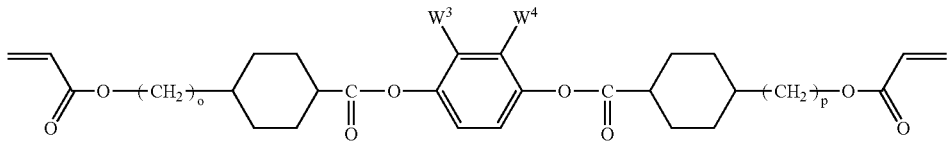

(M8d)

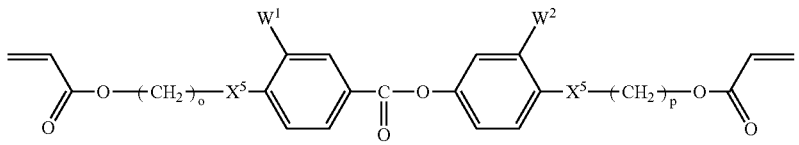

(M8e)

(M8f)

In the above Formula (M1a) to Formula (M8f), $R^5$ is independently hydrogen, fluorine, chlorine, —CN, or alkyl or alkoxy having a carbon number of 1 to 20; $R^6$ is hydrogen or alkyl having a carbon number of 1 to 5; $W^1$ and $W^2$ are independently hydrogen, chlorine, fluorine or cyano; $W^3$ and $W^4$ are independently hydrogen, chlorine, fluorine, cyano, methyl, ethyl, propyl or trifluoromethyl; $X^5$ and $X^6$ are independently a single bond or —O—; and o, p and r each independently represent an integer of 0 to 20.

The fundamental structure of the composition of the present invention is a composition constituted from the compound selected from the compounds represented by Formula (1) and at least one compound selected from the compounds represented by Formula (M1) to Formula (M8), and it is represented by compositions (MIX1) to (MIX18).

A content of the compound selected from the compounds represented by Formulas (M1) to Formula (M8) is preferably 1 to 99% by weight. More preferred composition comprises the compositions (MIX1), (MIX2) and (MIX3) obtained by mixing the compound selected from the compounds represented by Formula (1) with the compounds selected from the compounds represented by Formula (M1) and Formula (M2). The respective compound (1), compound (M1) and compound (M2) may be used alone or in combination of two or more kinds thereof.

(MIX1): compound (1)+compound (M1)
(MIX2): compound (1)+compound (M2)
(MIX3): compound (1)+compound (M1)+compound (M2)

The compositions (MIX1), (MIX2) and (MIX3) have a fast polymerizing speed and provide particularly a film which is tough and has a high heat resistance by irradiating a UV ray for several seconds.

It comprises the compositions (MIX4), (MIX5) and (MIX6) obtained by mixing the compound selected from the compounds represented by Formula (1) with the compounds selected from the compounds represented by Formula (M3) and Formula (M4). The respective compound (1), compound (M3) and compound (M4) may be used alone or in combination of two or more kinds thereof.

(MIX4): compound (1)+compound (M3)
(MIX5): compound (1)+compound (M4)
(MIX6): compound (1)+compound (M3)+compound (M4)

Films obtained from the above compositions (MIX4) to (MIX6) have small shrinkage in curing and are excellent in a dimensional stability.

It comprises the compositions (MIX7) to (MIX12) obtained by mixing the compound selected from the compounds represented by Formula (1) with the compounds selected from the compounds represented by Formulas (M2), (M5) and (M6). The respective compounds (1), (M2), (M5) and (M6) may be used alone or in combination of two or more kinds thereof.

(MIX7): compound (1)+compound (M5)
(MIX8): compound (1)+compound (M6)
(MIX9): compound (1)+compound (M5)+compound (M6)
(MIX10): compound (1)+compound (M2)+compound (M5)
(MIX11): compound (1)+compound (M2)+compound (M6)
(MIX12): compound (1)+compound (M2)+compound (M5)+compound (M6)

Films obtained by curing the above compositions (MIX7) to (MIX12) have a flexibility.

It comprises the compositions (MIX13) to (MIX18) obtained by mixing the compound selected from the compounds represented by Formula (1) with the compounds selected from the compounds represented by Formulas (M2), (M7) and (M8). The respective compounds (1), (M2), (M7) and (M8) may be used alone or in combination of two or more kinds thereof.

(MIX13): compound (1)+compound (M7)
(MIX14): compound (1)+compound (M8)
(MIX15): compound (1)+compound (M7)+compound (M8)
(MIX16): compound (1)+compound (M2)+compound (M7)
(MIX17): compound (1)+compound (M2)+compound (M8)
(MIX18): compound (1)+compound (M2)+compound (M7)+compound (M8)

The above compositions (MIX13) to (MIX18) are quickly cured by adding a radical photoinitiator and a cationic photoinitiator and irradiating with an electron beam such as a UV ray, and a liquid crystal phase can be fixed. Further, they do not suffer polymerization inhibition even in the air and provide polymers at a good curing speed.

In order to enhance a curability (mainly polymerizing speed) of the above compositions, preferred is a liquid crystal composition comprising at least one compound having an epoxy group as a polymerizable group and at least one compound having an oxetane group as a polymerizable group. To described the above point in details, the preferred composition includes the following combinations. In respect to the components to be combined, the components shown below may be combined alone or in a plurality.

1) When one component is the compound in which m and n are 0 in Formula (1) (having an epoxy group as a polymerizable group), the components to be combined are:
1-1) the compound in which m and n are 1 in Formula (1),
1-2) the compound represented by Formula (M3) or (M4) and
1-3) the compound which is other than the compound represented by Formulas (1), (M3) and (M4), and which has an oxetane group as a polymerizable group.
2) When one component is the compound in which m and n are 1 in Formula (1) (having an oxetane group as a polymerizable group), the components to be combined are:
2-1) the compound in which m and n are 0 in Formula (1),
2-2) the compound represented by Formula (M1) or (M2) and
2-3) the compound which is other than the compound represented by Formulas (1), (M1) and (M2), and which has an epoxy group as a polymerizable group.

Compounds such as a non-polymerizable liquid crystal compound, a polymerizable or non-polymerizable optically active compound, a non-liquid crystalline polymerizable compound, a polymerization initiator, a solvent, a surfactant, an antioxidant, a filler and a UV absorber in addition to the compounds represented by Formula (1) and Formulas (M1) to (M8) may be added as other components to the respective compositions (MIX1) to (MIX18) for the purpose of improving the physical properties. Compounds having any structures may be added as long as the purpose can be achieved. Publicly known compounds can suitably be used for the above compounds. A content of the respective components stays preferably in such a degree that a liquid crystallinity of the composition is not damaged. Even if atoms constituting the components in the composition are contained in a larger proportion than that present in nature, the same characteristics are provided, and therefore it is preferred.

Among the non-polymerizable liquid crystal compound and the polymerizable or non-polymerizable optically active compound, the examples of the non-polymerizable liquid crystal component are liquid crystalline compounds described in liquid crystal compound data base LiqCryst (registered trademark) marked by Fujitsu Kyushu Engineering Co., Ltd. The suited examples of the non-polymerizable optically active compound are Compounds (OP-1) to (OP-13). The suited examples of the polymerizable optically active compound are Compounds (OP-14) to (OP-21).

Any optically active compounds may be used as long as they can be compatible with the polymerizable liquid crystal composition inducing a helical structure and being a basic component. For example, the following optically active compounds (OP-1) to (OP-13) are suited:

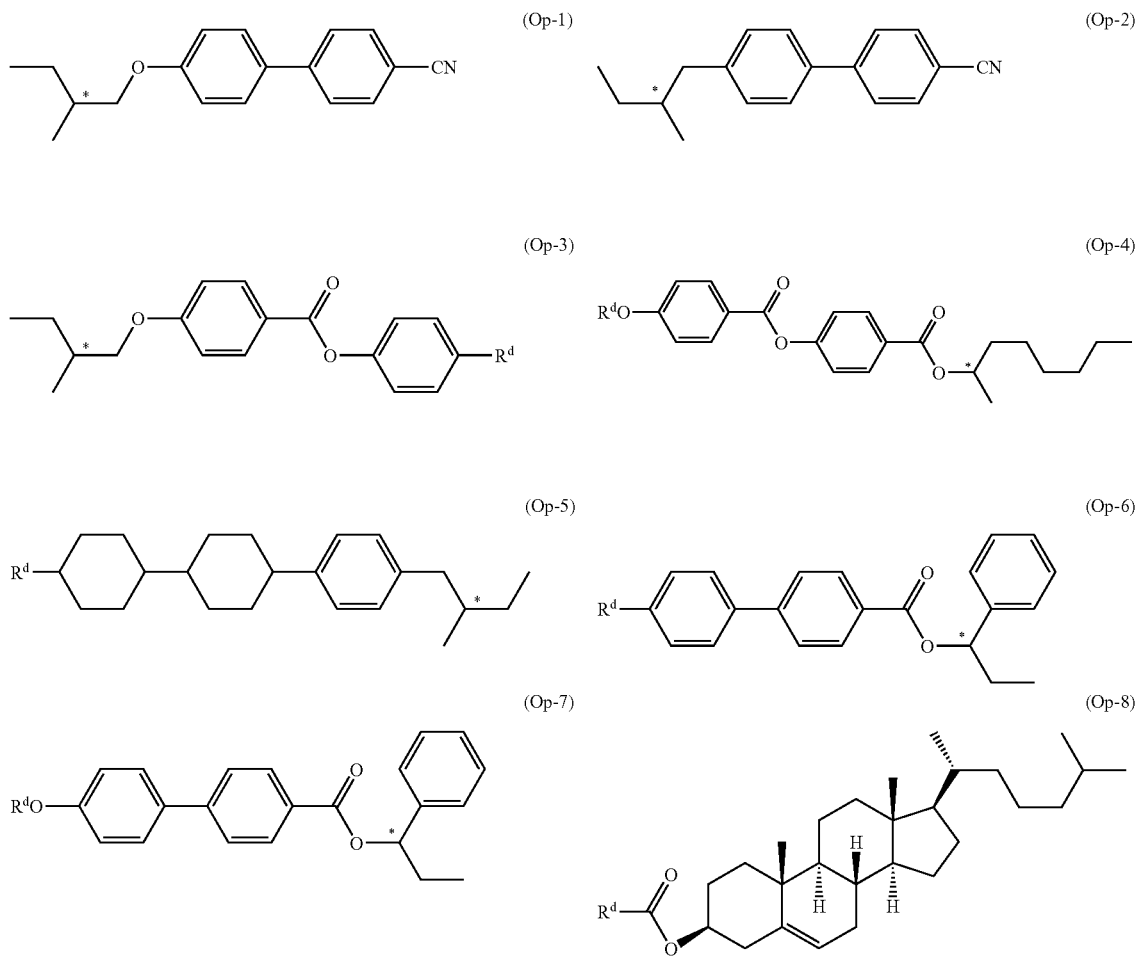

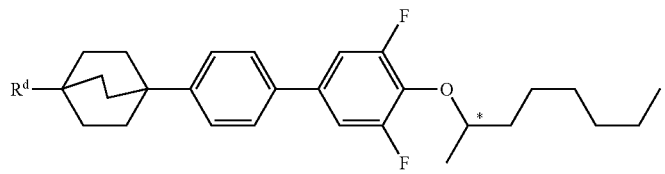 (Op-9)

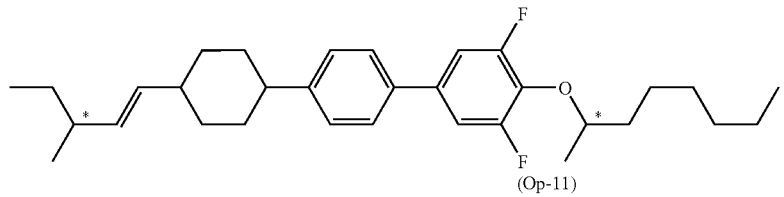 (Op-10)

(Op-11)

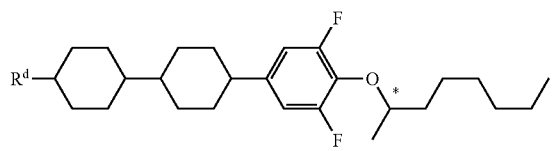

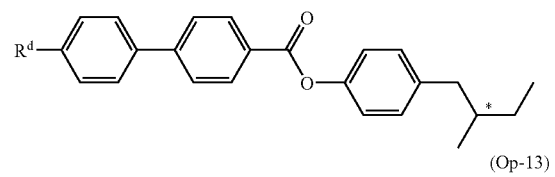 (Op-12)

(Op-13)

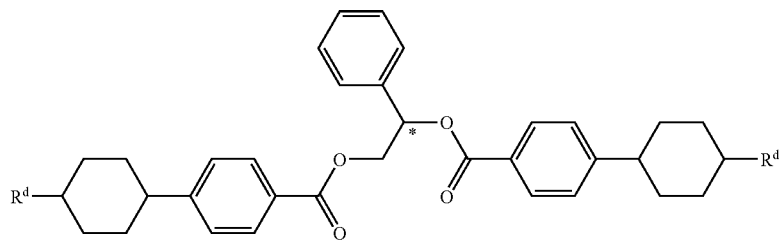

In the formulas, $R^d$ represents alkyl having a carbon number of 1 to 10, and carbon marked with * is asymmetric carbon.

The optically active compound added may be either the polymerizable compound or the non-polymerizable compound. It can be optimized according to purposes. Considering the heat resistance and the solvent resistance, the polymerizable compound is suited. The typical examples of the polymerizable compound are disclosed in a DE10221751 official gazette. The particularly suited compounds are the following compounds (OP-14) to (OP-19) are suited:

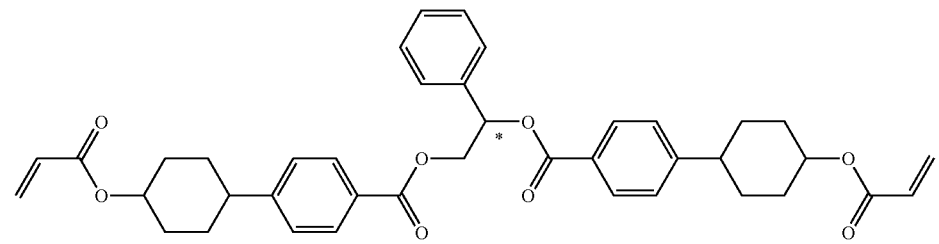 (Op-14)

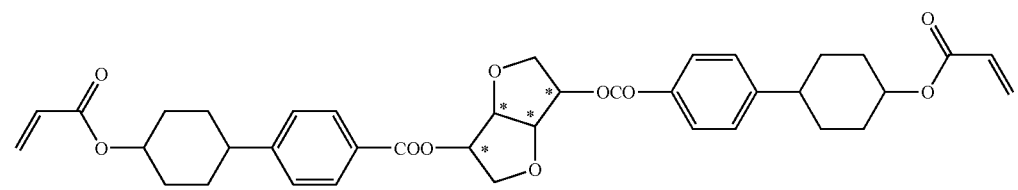 (Op-15)

-continued (Op-16)
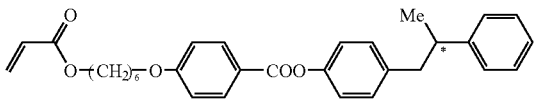

(Op-17)
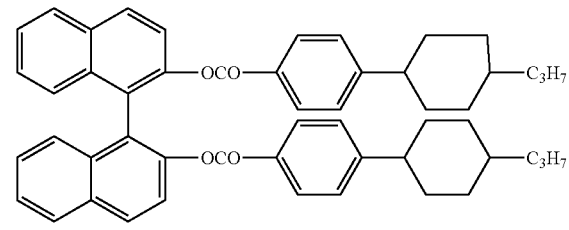

(Op-18)
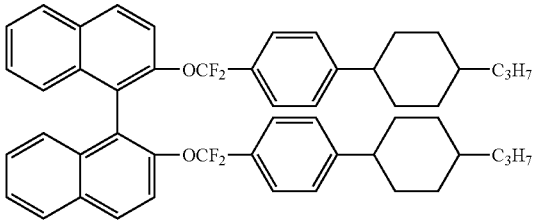

(Op-19)
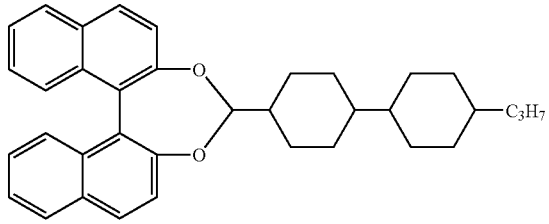

Next, the polymer shall be explained.

The compound (1) has a polymerizable cyclic ether. A polymer can be produced by polymerizing the compound (1). The polymer can be obtained by cationic polymerization. If only one kind of the compound (1) is polymerized, a homopolymer is obtained. This polymer comprises one constitutional unit. If the composition containing at least two compounds (1) is polymerized, a copolymer is obtained. This copolymer has at least two constitutional units. Polymerization in an aligned liquid crystal state is preferred for producing an optically anisotropic film which is targeted in the present invention, and therefore a cationic photo polymerization method is a particularly preferred polymerization method.

The application uses of the polymer in the present invention include the following ones:

A thermoplastic resin can be used for an adhesive, a synthetic polymer having a mechanical anisotropy, a cosmetic, an ornament, a non-linear optical material and an information storage material. This thermoplastic resin is a linear polymer in which branching is not advanced, and it is obtained by polymerizing the liquid crystal composition of the present invention comprising mainly the monofunctional compound. A weight average molecular weight thereof is 500 to 1,000,000, preferably 1,000 to 500,000 and more preferably 5,000 to 100,000.

A thermosetting resin can be used for a phase retarder, a polarizer, an alignment film, a anti-reflection layer, a selective reflection layer and optical compensator film which are structural elements for a liquid crystal element. This thermosetting resin is a polymer having a three-dimensional network structure, and it is obtained in the form of a polymer having a high polymerization degree by polymerizing the liquid crystal composition of the present invention comprising mainly the difunctional compound. The above polymer is less liable to be dissolved in solvents and is increased in a hardness when branching is advanced. A molecular weight of the above polymer is difficult to measure and difficult to prescribe, and it is preferably close to infinity.

A non-liquid crystalline polymerizable compound can be added as well for the purpose of controlling the film-forming property and the mechanical strength. The examples of the preferred non-liquid crystalline polymerizable compound are (meth)acrylate compounds, vinyl compounds, styrene compounds, vinyl ether compounds, epoxy compounds and oxetane compounds.

The preferred non-liquid crystalline polymerizable compound which can be added to the liquid crystal compositions (MIX13) to (MIX18) of the present invention includes methyl (meth)acrylate, ethyl (meth)acrylate, butyl (meth) acrylate, 2-ethylhexyl (meth)acrylate, phenyl (meth)acrylate, vinyl chloride, fluorinated vinyl, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetamide, vinyl p-t-butylbenzoate, vinyl N,N-dimethylaminobenzoate, vinyl benzoate, styrene, o-, m- or p-chloromethylstyrene, α-methylstyrene, tetrafluoroethylene and hexafluoropropene.

Multifunctional acrylate can be added to the composition in order to raise a film-forming property of the polymer. The preferred multifunctional acrylate includes 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylolpropane triacrylate, trimethylol EO-added triacrylate, pentaerythritol triacrylate, trisacryloxyethyl phosphate, bisphenol A EO-added diacrylate, bisphenol A glycidyl diacrylate (brand name: Biscoat 700, manufactured by Osaka Organic Chemical Co., Ltd.) and polyethylene glycol diacrylate.

The preferred non-liquid crystalline polymerizable compound which can be added to the compositions (MIX1) to (MIX12) of the present invention includes ethyl vinyl ether, hydroxybutyl monovinyl ether, t-amyl vinyl ether and cyclohexanedimethanolmethyl vinyl ether, and for the purposes of controlling a viscosity of the composition and reducing shrinkage in curing, 3-ethyl-3-hydroxymethyloxetane, 3-methyl-3-hydroxymethyloxetane, di(3-ethyl-oxeta-3-ylmethyl) and 3-ethyl-3-(2-ethylhexyloxymethyl)oxetane can be added.

A surfactant may be added in order to facilitate coating or controlling alignment of the liquid crystal phase as long as the effects of the present invention are not damaged. The surfactant includes, for example, imidazolines, quaternary ammonium salts, alkylamine oxides, polyamine derivatives, polyoxyethylene-polyoxypropylene condensates, polyethylene glycol and esters thereof, sodium laurylsulfate, ammonium laurylsulfate, laurylsulfate amines, alkyl-substituted aromatic sulfonic acid salts, alkylphosphoric acid salts, aliphatic or aromatic sulfonic acid formalin condensates, laurylamidepropyl betaine, laurylaminoacetic acid betaine, polyethylene glycol fatty acid esters, polyoxyethylene alkylamines, perfluoroalkylsulfonic acid salts, perfluoroalkylcarboxylic acid salts, perfluoroalkylethylene oxide adducts, perfluoroalkyltrimethylammonium salts, perfluoroalkyl group and hydrophilic group-containing oligomers, perfluoroalkyl group and lipophilic group-containing oligomers and perfluoroalkyl group-containing urethanes. An addition amount of the surfactants described above is varied depending on the kind of the surfactants and a composition ratio of the photo polymerizable liquid crystal composition, and it falls in a range of 100 ppm to 5%, preferably 0.1% to 1% based on the weight of the photo polymerizable liquid crystal composition.

The compositions (MIX1) to (MIX12) of the present invention are used by adding a conventional cationic photoinitiator. The cationic photoinitiator includes diaryliodonium salts (hereinafter abbreviated as DAS) and triarylsulfonium salts (hereinafter abbreviated as TAS). DAS includes diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methyoxyphenylphenyliodonium tetrafluoroborate, 4-methyoxyphenylphenyliodonium hexafluorophosphonate, 4-methyoxyphenylphenyliodonium hexafluoroarsenate, 4-methyoxyphenylphenyliodonium trifluoromethanesulfonate, 4-methyoxyphenylphenyliodonium trifluoroacetate, 4-methyoxyphenylphenyliodonium p-toluenesulfonate, 4-methyoxyphenylphenyliodonium diphenyliodonium tetra(pentafluorophenyl)borate, bis(4-tert-butylphenyl)iodonium diphenyliodonium tetrafluoroborate, bis (4-tert-butylphenyl)iodonium diphenyliodonium hexafluoroarsenate, bis(4-tert-butylphenyl)iodonium diphenyliodonium trifluoromethanesulfonate, bis(4-tert-butylphenyl)iodonium trifluoroacetate, bis(4-tert-butylphenyl)iodonium p-toluenesulfonate and bis(4-tert-butylphenyl) iodonium diphenyliodonium tetra(pentafluorophenyl) borate.

DAS can be highly sensitized by adding a photosensitizer such as thioxanthone, phenothiazine, chlorothioxanthone, xanthone, anthracene, diphenylanthracene and rubrene.

TAS includes triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetra(pentafluorophenyl)borate, 4-methyoxyphenyldiphenylsulfonium tetrafluoroborate, 4-methyoxyphenyldiphenylsulfonium hexafluorophosphonate, 4-methyoxyphenyldiphenylsulfonium hexafluoroarsenate, 4-methyoxyphenyldiphenylsulfonium trifluoromethanesulfonate, 4-methyoxyphenyldiphenylsulfonium trifluoroacetate, 4-methyoxyphenyldiphenylsulfonium p-toluenesulfonate, 4-methyoxyphenyldiphenylsulfonium triphenylsulfonium tetra(pentafluorophenyl)borate, 4-phenylthiophenyldiphenylsulfonium tetrafluoroborate, 4-phenylthiophenyldiphenylsulfonium hexafluorophosphonate, 4-phenylthiophenyldiphenylsulfonium hexafluoroarsenate, 4-phenylthiophenyldiphenylsulfonium trifluoromethanesulfonate, 4-phenylthiophenyldiphenylsulfonium p-toluenesulfonate and 4-phenylthiophenyldiphenylsulfonium tetra (pentafluorophenyl)borate.

The examples of the specific trade names of the cationic photoinitiator are Cyracure UVI-6990, Cyracure UVI-6974 and Cyracure UVI-6992 out of the products of UCC, Adeka Optomer SP-150, SP-152, SP-170 and SP-172 out of the products of Asahi Denka Co., Ltd., PHOTOINITIATOR 2074 out of the products of Rhodia Co., Ltd., Irgacure 250 out of the products of Ciba Specialty Chemicals Co., Ltd. and UV-9380C out of the products of GE Silicones Co., Ltd.

The compositions (MIX13) to (MIX18) of the present invention can be subjected to hybrid curing by using in combination with the cationic photoinitiator and adding a conventional radical photoinitiator. The examples of the radical photoinitiator are Darocur 1173 (2-hydroxy-2-methyl-1-phenylpropane-1-one), Irgacure 184 (1-hydroxycyclohexyl phenyl ketone), Irgacure 651 (2,2-dimethoxy-1,2-diphenylethane-1-one), Irgacure 500, Irgacure 2959, Irgacure 907, Irgacure 369, Irgacure 1300, Irgacure 819, Irgacure 1700, Irgacure 1800, Irgacure 1850, Darocur 4265 and Irgacure 784 out of the products of Ciba Specialty Chemicals Co., Ltd.

The other examples of the radical photoinitiator are p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, benzophenone/Michler's ketone mixture, hexaarylbiimidazole/mercaptobenzimidazole mixture, 1-(4-isopropylphenyl)-2-hydroxy-2-methyl-propane-1-one, benzyl dimethyl ketal, 2-methyl-1-[4-(methylthio)phenyl]-2-morpholinopropane-1-one, 2,4-diethylxanthone/methyl p-dimethylaminobenzoate mixture and benzophenone/methyltriethanolamine mixture.

The compositions (MIX1) to (MIX12) of the present invention can be cured by making use of base amplifier reaction by light (K. Arimitsu, M. Miyamoto, K. Ichimura, Angew. Chem. Int. Ed, 2000, 39, 3425).

The molded article of the present invention is obtained by curing the compound or the composition of the present invention. The molded article of the present invention includes a film and a molded article, and it is preferably a film. The film of the present invention has an optical anisotropy.

The optically anisotropic film of the present invention can be produced by a method in which the photopolymerizable composition of the present invention is coated on a support to form a coating film and in which nematic alignment formed in a liquid crystal state by the composition in the coating film is fixed by irradiating with light. Capable of being used for the support substrate are those on which a coating film of the liquid crystal composition can be formed on a surface thereof, for example, triacetyl cellulose, polyvinyl alcohol, polyimide, polyester, polyarylate, polyetherimide, polyethylene terephthalate and polyethylene naphthalate. The other specific trade names used include "Arton" manufactured by JSR Co., Ltd., "ZEONEX" and "ZEONOA" manufactured by Nippon Zeon Co., Ltd. and "Apel" manufactured by Mitsui Chemical Ind. Co., Ltd. These supports may be monoaxially oriented films and biaxially oriented films.

Triacetyl cellulose is particularly preferably used as the support substrate for producing the optically anisotropic film of the present invention. A triacetyl cellulose film can be used as it is for the support substrate, and this film can be used after subjected, if necessary, to surface treatment such as saponification treatment, corona discharge treatment and UV-ozone treatment.

A coating film can be formed by applying a solution prepared by dissolving the photopolymerizable liquid crystal composition in a suitable solvent. Capable of being used as the solvent in the form of a single solvent or a mixed solvent of a plurality thereof are benzene, toluene, xylene, mesitylene, n-butylbenzene, diethylbenzene, teralin, methoxybenzene, 1,2-dimethoxybenzene, ethylene glycol dimethyl ether, diethylene glycol dimethyl ether, acetone, methyl ethyl ketone, methyl isobutyl ketone, cyclohexanone, ethyl acetate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, tetrachloroethylene, trichloroethylene, tetrachloroethylene, chlorobenzene, t-butyl alcohol, diacetone alcohol, glycerin, monoacetyne, ethylene glycol, triethylene glycol, hexylene glycol, ethylene glycol monomethyl ether, ethyl cellosolve and butyl cellosolve.

A thin film can be formed by coating a solution prepared by dissolving the photopolymerizable liquid crystal composition by a method such as spin coating, roll coating, curtain coating, flow coating, printing, micro gravure coating, gravure coating, wire bar coating, dip coating, spray coating, meniscus coating and a developing film making method and subjecting the film to drying treatment to remove the solvent.

A preferred method for subjecting the surface of the substrate to aligning treatment is, for example, a method in which a thin film comprising polyimide and polyvinyl alcohol usually used is formed and in which it is subjected to rubbing treatment with a rayon cloth, a method in which silicon oxide is obliquely deposited and rubbing-free alignment using a stretched film, a polarized UV ray-aligning film and an ion beam. Further, alignment can be carried out by using a metal substrate of aluminum, iron, copper and the like which is provided on as surface thereof with grooves in a slit form and a glass substrate subjected to etching processing in a slit form, such as alkali glass, borosilicate glass and flint glass.

The liquid crystal layer after finishing aligning treatment is irradiated with an electromagnetic wave such as a UV ray and an electron beam to thereby fix alignment. When using a UV ray, a longer wavelength than 300 nm which is not absorbed in the composition is preferred. When using an electron beam, 1 to 200 Mrad is preferred since if an irradiation quantity is too much, the copolymer may be decayed. An electromagnetic wave is irradiated at such a temperature that the composition stays in a liquid crystal state. In the case of higher than 100° C., polymerization is caused by heat to break the alignment, and therefore a temperature of 100° C. or lower is preferred.

The composition of the present invention exhibits a helical structure when an optically active compound is added thereto, and therefore a phase retarder having a helical structure can be produced by aligning and polymerizing it in a liquid crystal state. If a pitch of the helix is 1/n (n is an average refractive index in an optically anisotropic thin film obtained) of a wavelength of light, circular polarized light of either left or right according to the direction of the pitch out of light having the above wavelength can selectively be reflected according to a Bragg's rule. This can be used as, for example, a circular polarized light-separating functional element. The direction of the helix depends on the steric configuration of the optically active compound. Suited selection of the steric configuration of the optically active compound makes it possible to induce the desired helical direction.

According to, for example, a method disclosed in JP H6-281814 A/1994, obtained is a molded article in which a helical pitch changes continuously in a thickness direction of the molded article having an optical anisotropy, and light in a wide wavelength area can be reflected according to the pitch.

A half-wave plate and a quarter-wave plate which are one of the uses in the present invention shall be explained. The half-wave plate has a function to rotate a vibration direction of linear polarized light. The quarter-wave plate has a function to convert linear polarized light to circular polarized light or circular polarized light to linear polarized light. They can be prepared in the following manner. When a targeted wavelength is set to λ, a thickness (d) of the polymerizable liquid crystal composition having optical anisotropy (Δn) is aligned on a substrate so that the condition of d=λ/2Δn is met, and the composition is photopolymerized as it is, whereby a half-wave plate is obtained. Similarly, the thickness (d) of the polymerizable liquid crystal composition having an optical anisotropy (Δn) is aligned on a substrate so that the condition of d=λ/4Δn is met, and the composition is photopolymerized as it is, whereby a quarter-wave plate is obtained. In this case, the thickness (d) is controlled in the following manner. When the composition is dissolved in a solvent and coated on a substrate to be aligned, the desired thickness can be obtained by suitably selecting a concentration of the composition in the solution, a coating method and a coating condition. When the composition is aligned by injecting in a liquid crystal cell having a uniform thickness, the liquid crystal cell having a desired cell thickness (d) is advisably used.

The thickness of the thin film in which alignment is fixed is varied depending on the desired optical function and the characteristic thereof and an optical anisotropy in the thin film obtained having an optical anisotropy. Accordingly, the range thereof can not strictly be determined, and the preferred thickness falls in a range of 0.05 to 50 μm. The more preferred thickness falls in a range of 0.1 to 20 μm, and the further preferred thickness falls in a range of 0.5 to 10 μm. The optically anisotropic thin film has a haze value of 1.5% or less, preferably 1.0% or less and a transmittance of 80% or more, preferably 85% or more. The transmittance preferably satisfies the above proportions in a visible light area. The haze value falling in a range of 1.5% or less is a preferred condition for preventing from problems being brought about in a polarized light performance. The transmittance falling in a range of 80% or more is a preferred condition for maintaining brightness when using the above optically anisotropic thin film for a liquid crystal display element.

EXAMPLES

The present invention shall be explained below in details with reference to examples. A phase transition temperature described in the examples was measured by putting a sample on a hot plate in a melting point-measuring apparatus equipped with a polarization microscope and heating it at a speed of 1° C./minute. C exhibits crystal; N exhibits a nematic phase; Ch exhibits a cholesteric phase; and I exhibits an isotropic liquid. An NI point shows an upper limit temperature of a nematic phase and is a transition temperature from N to I. C 50 N 63 I shows that the phase transits from C to N at 50° C. and that the phase transits from N to I at 63° C. The pencil hardness was determined according to a method of JIS standard "JIS-K-5400 8.4 pencil scratching test". A Cellotape (registered trademark, hereinafter the same shall apply) peeling test was evaluated by a test method of JIS standard "JIS-5400 8.5 adhesive property (8.5.2 cross cut tape method)", that is, residual cross cuts out of 100 cross cuts. A TAC film having an acetylation degree of 2.9 was used for the substrate. An aligning state of liquid crystal molecules on the substrate was judged from angle dependency of a transmitted light intensity of the liquid crystal interposed between two polarizing plates arranged in a cross nicol state.

Example 1

First Stage

Production of 4-[6-(3-methyloxetane-3-ylmethoxy)hexyloxy]benzoic acid

A solution comprising 20 g of 3-[(6-bromohexyloxy)methyl]-3-methyloxetane, 11.6 g of 4-hydroxybenzoic acid, 13 g of potassium carbonate and 150 ml of dimethylformamide was stirred at 90° C. for 4 hours. Water was added to the reaction liquid to terminate the reaction, and the liquid was extracted with ethyl acetate. The organic layer was washed with water, and the solvent was distilled off. A 5% sodium hydroxide aqueous solution was added to the resulting residue, and the solution was refluxed for 8 hours. Then, the solution was acidified with hydrochloric acid and extracted with ether, followed by drying on anhydrous magnesium sulfate. The solvent was distilled off to obtain 17 g of 4-[6-(3-methyloxetane-3-ylmethoxy)hexyloxy]benzoic acid. Melting point: 61° C.

The following compounds were produced by the same production method. 4-[4-(3-Ethyloxetane-3-ylmethoxy)butyloxy]benzoic acid (melting point: 75.3 to 77.7° C.) 4-[4-(3-Ethyloxetane-3-ylmethoxy)hexyloxy]benzoic acid (melting point: 58.5° C.) 2-Fluoro-4-[4-(3-ethyloxetane-3-ylmethoxy)butyloxy]-benzoic acid (melting point: 75 to 80° C.) 4-(3-Ethyloxetane-3-ylmethoxy)benzoic acid (melting point: 127.5° C.)

Second stage 4-[6-(3-Methyloxetane-3-ylmethoxy)hexyloxy]-benzoic acid 6.2 g and 2,7-dihydroxy-9-methylfluorene 2 g were dissolved in 100 ml of methylene chloride and cooled down to 5° C., and 0.05 g of dimethylaminopyridine and 4.4 g of 1-ethyl-3-(3-dimethylaminopropyl)carbodiimide hydrochloride were added thereto, followed by stirring the solution at a room temperature for 12 hours. Water 100 ml was added to separate the solution, and the organic layer was dried on anhydrous magnesium sulfate. A residue obtained after distilling the solvent off was refined by means of silica gel chromatography and recrystallized from a mixed solvent of ethanol and ethyl acetate to obtain 3 g of Compound No. 57.

Compound Nos. 63, 67, 68 and 86 were produced by the method described in the second stage of Example 1. Further, 2,7-dihydroxy-9-methylfluorene was substituted for 2,7-dihydroxy-9-ethylfluorene in the method of the second stage, whereby Compound No. 65 was produced.

The phase transition temperatures of the compounds produced are shown below.

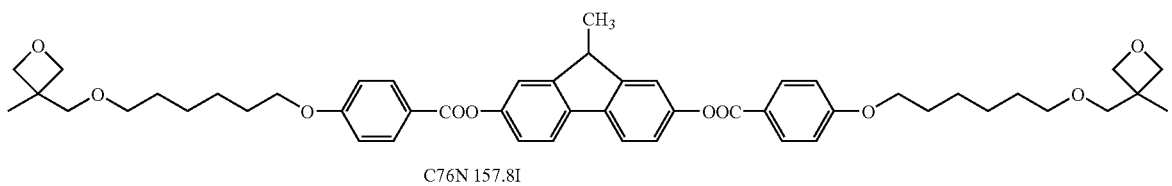

No.57

C76N 157.8I

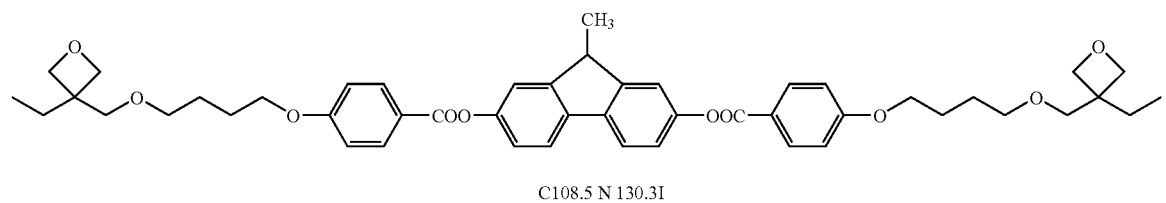

No.63

C108.5 N 130.3I

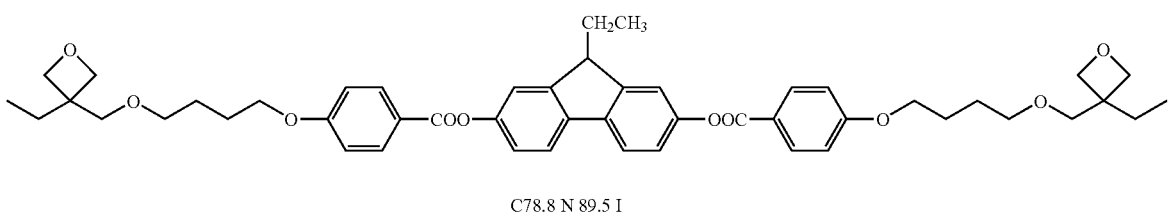

No.65

C78.8 N 89.5 I

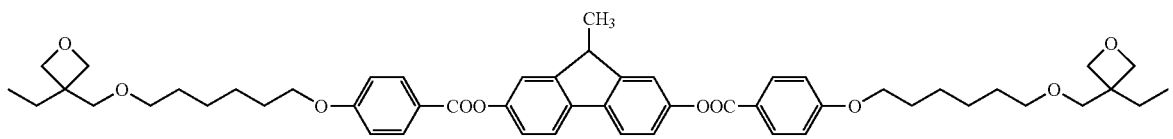

No.67

C 59 N 130.7 I

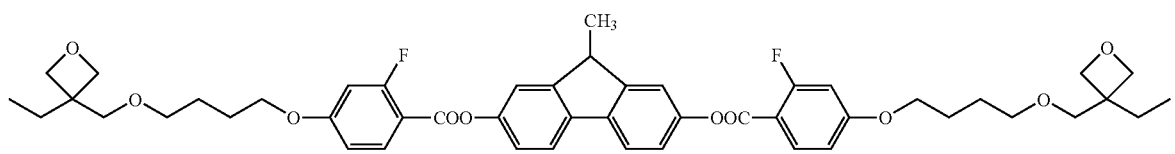

No.68

C 92.5 N 98.1 I

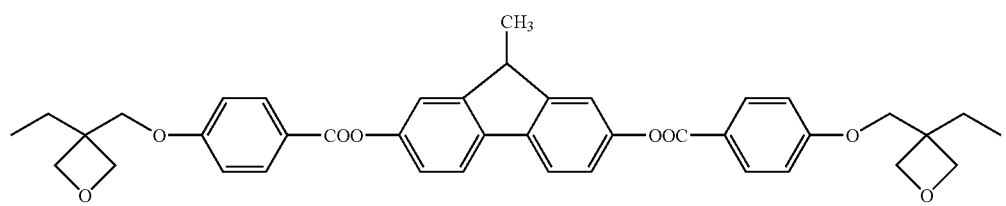

No.86

C 197.3 I

Example 2

Production of Compound No. 35

First Stage

A solution comprising 14 g of allyl (4-chlorobutyl ether, 14 g of 4-hydroxybenzoic acid, 14 g of potassium carbonate and 50 ml of dimethylformamide was stirred at 90° C. for 3 hours. Water was added thereto, and the liquid was extracted with toluene. The toluene layer was washed well with water, and toluene was distilled off. Sodium hydroxide 20 g, water 50 ml and ethanol 200 ml were added to the resulting residue, and the solution was refluxed for 2 hours. Ethanol was distilled off, and hydrochloric acid was added to acidify the solution. It was extracted with diethyl ether and dried on anhydrous magnesium sulfate. The solvent was distilled off, and a residue thus obtained was recrystallized from a mixed solvent of ethanol and water to obtain 29 g of 4-(4-allyloxybutyloxy)benzoic acid. Phase transition temperature: C 94 N 107 I The following benzoic acid derivatives were produced by the method described in the first stage of Example 2.

4-Allyloxybenzoic acid (melting point: 164 to 165° C.)
4-(3-Butenyloxy)benzoic acid (phase transition temperature: C 121 N 141.5 I)

Second Stage 4-(4-Allyloxybutyloxy)benzoic acid 1.34 g and 2,7-dihydroxy-9-methylfluorene 0.46 g were dissolved in 30 ml of methylene chloride and cooled down to 5° C., and 0.01 g of dimethylaminopyridine and 1.15 g of 1-ethyl-3-(3-dimethylaminopropyl)carbodiimide hydrochloride were added thereto, followed by stirring the solution at a room temperature for 12 hours. Water 50 ml was added to separate the solution, and the organic layer was dried on anhydrous magnesium sulfate. A residue obtained after distilling the solvent off was refined by means of silica gel chromatography and recrystallized from a mixed solvent of ethanol and ethyl acetate to obtain 0.6 g of 2,7-di[4-(4-allyloxybutyloxy)benzoyloxy]-9-methylfluorene. Phase transition temperature: C 107 N 222 I The following compounds were produced by the method described in the second stage of Example 2.

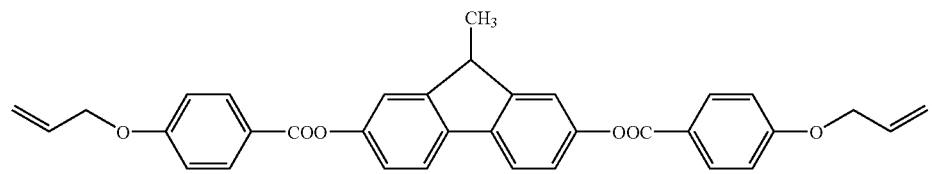

C 162 N 252 I

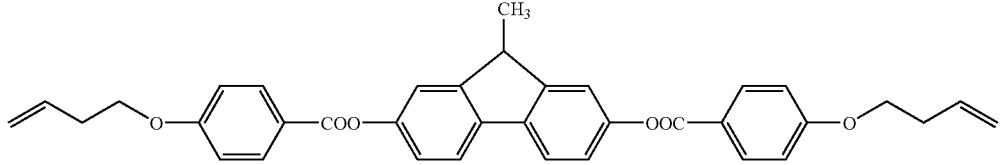

C 139 N 260 I

Third Stage m-Chloroperbenzoic acid 0.5 g was added to a solution prepared by dissolving 0.64 g of 2,7-di[4-(allyloxybutyloxy)benzoyloxy]-9-methylfluorene in 10 ml methylene chloride, and the solution was stirred at a room temperature for 2 days. The reaction solution was washed with a 5% sodium hydroxide solution and then washed in order with a sodium hydrogensulfite solution and a sodium hydrogencarbonate solution, and it was dried on anhydrous magnesium sulfate.

A residue obtained after distilling the solvent off was refined by means of silica gel chromatography and recrystallized from a mixed solvent of ethanol and ethyl acetate to obtain 0.56 g of Compound No. 35.

Compound Nos. 21 and 22 were produced by the method described in the third stage of Example 2.

The phase transition temperatures of the compounds produced are shown below.

No. 35

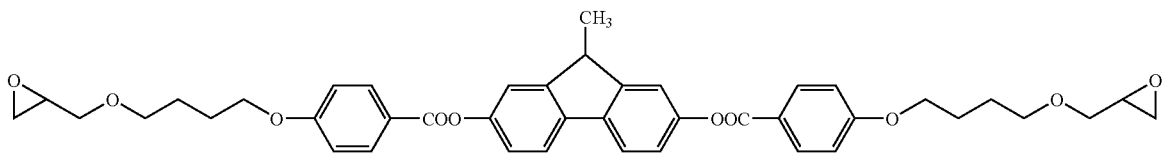

C 94.6 N 218 I

No. 21

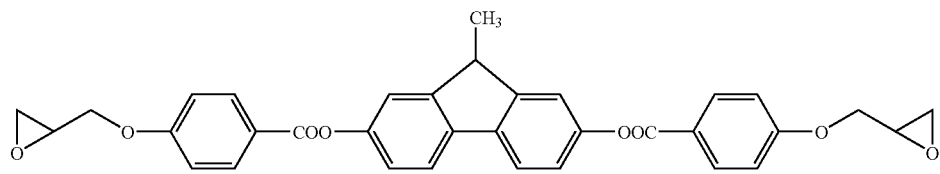

C 180 N 250 I

No. 22

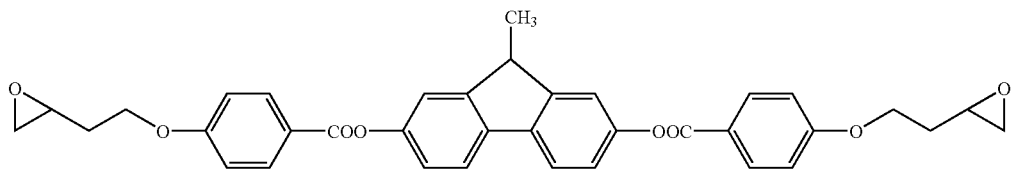

C 163 N 250 I

Example 3

Composition Example of (MIX1) in which m and n are 1 in the Compound (1)

A composition (CL1) comprising 50% by weight of a compound (No. 67) and 50% by weight of monofunctional epoxide (K1) was prepared. The above composition exhibited a nematic liquid crystal phase at a room temperature and had an NI point of 93 C. The compound (No. 67) did not cause phase separation and exhibited a good compatibility. The composition (CL1) was not crystallized at a room temperature and maintained a liquid crystal state. Further, the composition (CL1) which was coated on a rubbed TAC film and aligned exhibited hybrid alignment.

No. 67

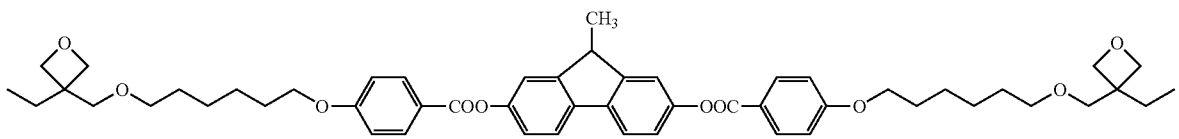

(K1)

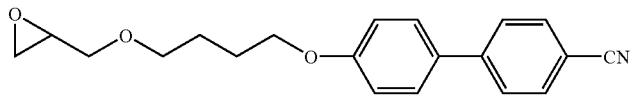

50% by weight

50% by weight

Example 4

Composition Example of (MIX2) in which m and n are 0 in the Compound (1)

A composition (CL2) comprising 50% by weight of a compound (No. 35) and 50% by weight of difunctional epoxide (K2) was prepared. The above composition exhibited a nematic liquid crystal phase at a room temperature and had an NI point of 137° C. The compound (No. 35) did not cause phase separation and exhibited a good compatibility. The composition (CL2) was not crystallized at a room temperature and maintained a liquid crystal state. Further, the composition (CL2) which was coated on a rubbed TAC film and aligned exhibited homogeneous alignment.

No. 35

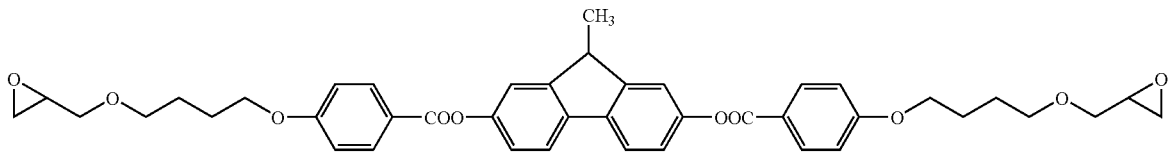

(K2)

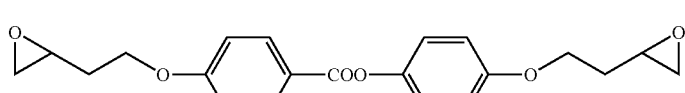

50% by weight

50% by weight

Example 5

Composition Example of (MIX2) in which m and n are 1 in the Compound (1)

A composition (CL3) comprising 50% by weight of a compound (No. 57) and 50% by weight of the difunctional epoxide (K2) was prepared. The above composition exhibited a nematic liquid crystal phase at a room temperature and had an NI point of 104.6° C. The compound (No. 57) did not cause phase separation and exhibited a good compatibility. The composition (CL3) was not crystallized at a room temperature and maintained a liquid crystal state. Further, the composition (CL3) which was coated on a rubbed TAC film and aligned exhibited homogeneous alignment.

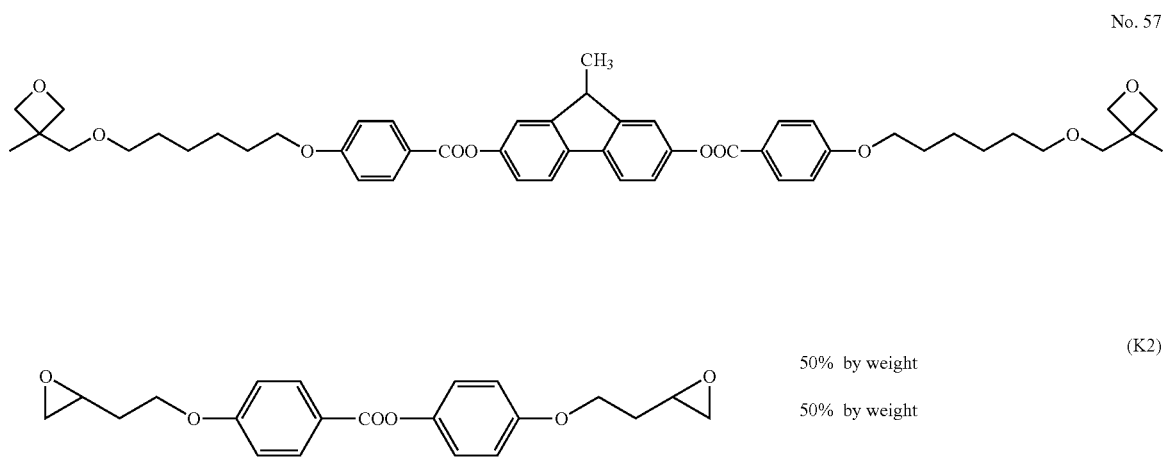

No. 57
50% by weight (K2)
50% by weight

Example 6

Composition Example of (MIX11) in which m and n are 1 in the Compound (1)

A composition (CL4) comprising 40% by weight of the compound (No. 57), 40% by weight of the difunctional epoxide (K2) and 20% by weight of difunctional vinyl ether (K3) was prepared. The above composition exhibited a nematic liquid crystal phase at a room temperature and had an NI point of 113.5° C. The compound (No. 57) did not cause phase separation and exhibited a good compatibility. The composition (CL4) was not crystallized at a room temperature and maintained a liquid crystal state. Further, the composition (CL4) which was coated on a rubbed TAC film and aligned exhibited homogeneous alignment.

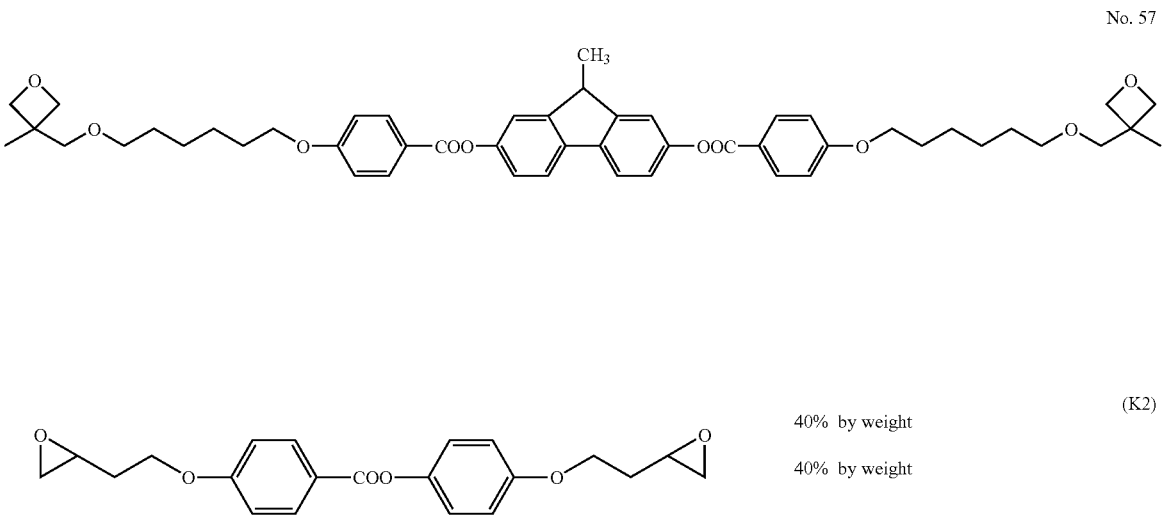

No. 57
40% by weight (K2)
40% by weight

-continued

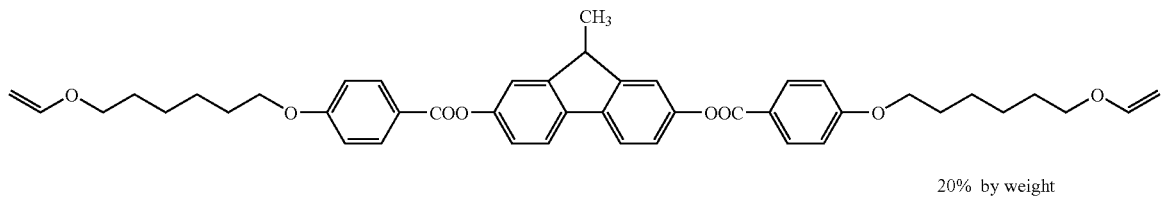

(K3)

20% by weight

Example 7

Composition Example of (MIX17) in which m and n are 0 in the Compound (1)

A composition (CL5) comprising 25% by weight of the compound (No. 35), 25% by weight of the difunctional epoxide (K2) and 50% by weight of difunctional acrylate (K4) was prepared. The above composition exhibited a nematic liquid crystal phase at a room temperature and had an NI point of 169.2° C. The compound (No. 35) did not cause phase separation and exhibited a good compatibility. The composition (CL5) was not crystallized at a room temperature and maintained a liquid crystal state. Further, the composition (CL5) which was coated on a rubbed TAC film and aligned exhibited homogeneous alignment.

was irradiated with a UV ray for 10 seconds by means of a high pressure mercury lamp (120 W/cm). After irradiation, the liquid crystal phase was polymerized while maintaining an aligning state (homogeneous alignment), and the surface hardness thereof was 2H in terms of a pencil hardness. A change in the retardation was not caused by a temperature change (20 to 200° C.), and an alignment film (F2) having a high heat resistance was obtained.

The compositions (CL1), (CL3) and (CL4) and the compound No. 35 were used to prepare the corresponding alignment films (F1), (F3), (F4) and (F35) by the same method as in Example 8. An aligning film (F5) was prepared by the same method as in Example 8, except that 0.3 g of Irgacure 907 (trade name) and 0.3 g of Adeka Optomer SP-150 (trade name) were added for curing the composition

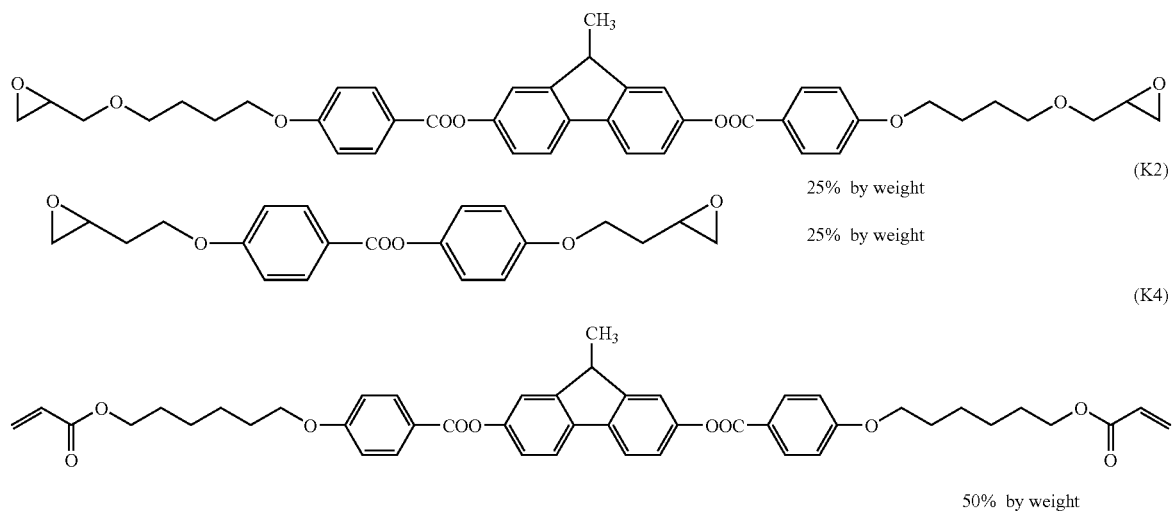

No. 35

25% by weight (K2)

25% by weight (K4)

50% by weight

Example 8

Production of an Aligning Film by Irradiating with a UV Ray

A solution prepared by dissolving 10 g of the composition (CL2) and 0.3 g of Adeka Optomer SP-150 (trade name) in 80 g of cyclopentanone was coated by means of a micro gravure coater on a triacetyl cellulose film having an acetylation degree of 2.9 which was rubbed on a surface thereof with a rayon cloth. After coating, the film was subjected to heat treatment in an oven set to 60° C. for 5 minutes to thereby remove the solvent and align the liquid crystal phase. While maintaining the same temperature, the film (CL5) to carry out hybrid curing. All the compositions had a good aligning property and a good polymerizability by a UV ray. That is, the alignment film (F1) exhibited hybrid alignment, and the alignment films (F2), (F3), (F4), (F5) and (F35) exhibited homogeneous alignment.

Comparative Example 1

A solution prepared by dissolving 10 g of the difunctional acrylate (K4) and 0.3 g of Irgacure 907 (trade name) in 80 g of cyclopentanone was coated by means of a micro gravure coater on a triacetyl cellulose film having an acetylation degree of 2.9 which was rubbed on a surface thereof with a rayon cloth. After coating, the film was subjected to heat treatment in an oven set to 85 C for 5 minutes to thereby remove the solvent and align the liquid crystal phase. While maintaining the same temperature, the film was irradiated with a UV ray for 10 seconds by means of a high pressure mercury lamp (120 W/cm). After irradiation, the liquid crystal phase was polymerized, and an alignment film (FK4) exhibiting homogeneous alignment was obtained.

The results of evaluating the liquid crystal films in the Cellotape peeling test and the pencil hardness test are shown below.

| Film No. | Cellotape peeling | Pencil hardness |
| --- | --- | --- |
| F1 | 100/100 | 2H |
| F2 | 100/100 | 2H |
| F3 | 100/100 | 2H |
| F4 | 100/100 | 2H |
| F5 | 100/100 | 2H |
| F35 | 100/100 | 2H |
| FK4 | 0/100 | H |

(Comparative Example 1)

Cellotape Peeling Test

In the Cellotape peeling test of the aligning film (FK4) obtained by curing the difunctional acrylate in Comparative Example 1, all cross cuts were peeled off, and the remaining cross cuts were 0. The aligning films obtained by curing the compounds and the compositions of the present invention were not peeled off at all, and all cross cuts remained.

Pencil Hardness Test

All the aligning films (F1) to (F5) and (F35) obtained from the compositions (CL1) to (CL5) and the compound No. 35 showed a pencil hardness of 2H.

Heat Resistance Test

A change in the retardation of the aligning films (F1) to (F5) and (F35) by a temperature change (20 to 200° C.) was 3% or less, and they were films having a high heat resistance.

The compounds of the present invention or the compositions containing the same show an excellent polymerizing property in the air and readily provide polymers having a high polymerization degree by irradiating with light for short time. Further, the aligning films obtained by aligning and curing the compounds of the present invention or the compositions containing the same have an excellent adhesive property with TAC. Also, the aligning films which do not have a change in retardation at 20 to 200° C. and which are excellent in a heat resistance can be produced.

What is claimed is:

1. A compound represented by Formula (1):

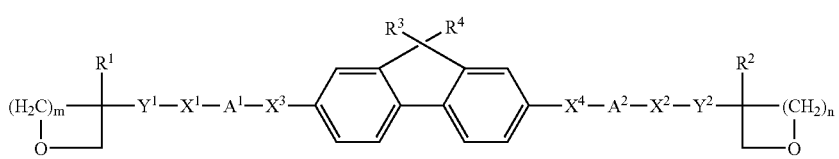

(1)

wherein $R^1$ and $R^2$ are independently hydrogen or alkyl having a carbon number of 1 to 5;

$R^3$ and $R^4$ are independently hydrogen, fluorine, chlorine or alkyl having a carbon number of 1 to 20; optional —$CH_2$— in the above alkyl may be substituted with —O—, —S—, —COO—, —OCO—, —CO—, —CH=CH— or —C≡C—, and optional hydrogen in the above alkyl may be substituted with halogen; $Y^1$ and $Y^2$ are independently alkylene having a carbon number of 1 to 15, and optional —$CH_2$— in the above alkylene may be substituted with —O—; $A^1$ and $A^2$ are independently 1,4-cyclohexylene, 1,4-cyclohexylene in which at least one hydrogen is substituted with fluorine, 1,4-cyclohexenylene, 1,4-phenylene, 1,4-phenylene in which at least one hydrogen is substituted with halogen, methyl or trifluoromethyl, pyridine-2,5-diyl, pyridazine-3,6-diyl, pyrimidine-2,5-diyl, naphthalene-2,6-diyl, tetrahydronaphthalene-2,6-diyl or 1,3-dioxane-2,5-diyl; $X^1$ and $X^2$ are independently a single bond, —O—, —S—, —COO— or —OCO—; $X^3$ and $X^4$ are independently —COO—, —OCO—, —$CH_2CH_2$— or —C≡C—; and m and n are independently 1 or 0.

2. The compound as described in claim 1, wherein $R^1$ and $R^2$ are independently hydrogen, methyl or ethyl; $R^3$ and $R^4$ are independently hydrogen, fluorine, chlorine or alkyl having a carbon number of 1 to 20; optional —$CH_2$— in the above alkyl may be substituted with —O—, —S—, —COO—, —OCO—, —CO—, —CH=CH— or —C≡C—, and hydrogen in the above alkyl may be substituted with halogen; $Y^1$ and $Y^2$ are independently alkylene having a carbon number of 1 to 12, and optional —$CH_2$—in the above alkylene may be substituted with —O—, —COO—, —OCO— or —CO—; $A^1$ and $A^2$ are independently 1,4-cyclohexylene, 1,4-cyclohexylene in which at least one hydrogen is substituted with fluorine, 1,4-cyclohexenylene, 1,4-phenylene, 1,4-phenylene in which one hydrogen is substituted with fluorine, chlorine, methyl or trifluoromethyl, 1,4-phenylene in which two hydrogens are substituted with fluorine or trifluoromethyl, pyridine-2,5-diyl, pyridazine-3,6-diyl, pyrimidine-2,5-diyl, naphthalene-2,6-diyl, tetrahydronaphthalene-2,6-diyl or 1,3-dioxane-2,5-diyl; $X^1$ and $X^2$ are independently a single bond and —O—; $X^3$ and $X^4$ are independently —COO—, —OCO— or —C≡C—; and m and n are independently 1 or 0.

3. The compound as described in claim 1, wherein $R^1$ and $R^2$ are independently hydrogen, methyl or ethyl; $R^3$ and $R^4$ are independently hydrogen, fluorine, chlorine or alkyl having a carbon number of 1 to 10; $Y^1$ and $Y^2$ are independently alkylene having a carbon number of 1 to 10, and optional —$CH_2$— in the above alkylene may be substituted with —O—, —COO— or —OCO—; $A^1$ and $A^2$ are independently 1,4-cyclohexylene, 1,4-phenylene, 1,4-phenylene in which one hydrogen is substituted with fluorine, chlorine, methyl or trifluoromethyl or 1,4-phenylene in which two hydrogens are substituted with fluorine or trifluoromethyl; $X^1$ and $X^2$ are independently a single bond and —O—; $X^3$ and $X^4$ are independently —COO—, —OCO— or —C≡C—; and m and n are independently 1 or 0.

4. The compound as described in claim 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— in the above alkylene may be substituted with —O—, —COO— or —OCO—; $A^1$ and $A^2$ are independently 1,4-cyclohexylene, 1,4-phenylene or 1,4-phenylene in which one hydrogen is substituted with fluorine or chlorine; $X^1$ and $X^2$ are independently a single bond and —O—; $X^3$ and $X^4$ are independently —COO— or —OCO—; and m and n are independently 1 or 0.

5. The compound as described in claim 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— other than a —$CH_2$— bonded to $X^1$ or $X^2$ in the above alkylene may be substituted with —O—; $A^1$ and $A^2$ are independently 1,4-cyclohexylene, 1,4-phenylene or 1,4-phenylene in which one hydrogen is substituted with fluorine or chlorine; $X^1$ and $X^2$ are independently a single bond and —O—; $X^3$ and $X^4$ are independently —COO— or —OCO—; and m and n are independently 1 or 0.

6. The compound as described in claim 1, wherein m=n=0.

7. The compound as described in claim 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— other than a —$CH_2$— bonded to $X^1$ or $X^2$ in the above alkylene may be substituted with —O—; $A^1$ and $A^2$ are independently 1,4-cyclohexylene, 1,4-phenylene or 1,4-phenylene in which one hydrogen is substituted with fluorine or chlorine; $X^1$ and $X^2$ are independently a single bond and —O—; $X^3$ and $X^4$ are independently —COO— or —OCO—; and m=n=0.

8. The compound as described in claim 1, wherein m=n=1.

9. The compound as described in claim 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— other than a —$CH_2$— bonded to $X^1$ or $X^2$ in the above alkylene may be substituted with —O—; $A^1$ and $A^2$ are independently 1,4-cyclohexylene, 1,4-phenylene or 1,4-phenylene in which one hydrogen is substituted with fluorine or chlorine; $X^1$ and $X^2$ are independently a single bond and —O—; $X^3$ and $X^4$ are independently —COO— or —OCO—; and m=n=1.

10. The compound as described in claim 1, wherein m=0, and n=1.

11. The compound as described in claim 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— other than a —$CH_2$— bonded to $X^1$ or $X^2$ in the above alkylene may be substituted with —O—; $A^1$ and $A^2$ are independently 1,4-cyclohexylene, 1,4-phenylene or 1,4-phenylene in which one hydrogen is substituted with fluorine or chlorine; $X^1$ and $X^2$ are independently a single bond and —O—; $X^3$ and $X^4$ are independently —COO— or —OCO—; and m=0, and n=1.

12. The compound as described in claim 1, wherein $X^1$ and $X^2$ are —O—; $X^3$ is —COO—, and $X^4$ is —OCO—; and m=n=0.

13. The compound as described in claim 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— other than a —$CH_2$— bonded to $X^1$ or $X^2$ in the above alkylene may be substituted with —O—; $A^1$ and $A^2$ are independently 1,4-cyclohexylene, 1,4-phenylene or 1,4-phenylene in which one hydrogen is substituted with fluorine or chlorine; $X^1$ and $X^2$ are —O—; $X^3$ is —COO—, and $X^4$ is —OCO—; and m=n=0.

14. The compound as described in claim 1, wherein $X^1$ and $X^2$ are independently —O—; $X^3$ is —COO—, and $X^4$ is —OCO—; and m=n=1.

15. The compound as described in claim 1, wherein $R^1$ and $R^2$ are independently hydrogen, methyl or ethyl; $R^3$ and $R^4$ are independently hydrogen, fluorine or alkyl having a carbon number of 1 to 5; $Y^1$ and $Y^2$ are independently alkylene having a carbon number of 1 to 10, and optional —$CH_2$— other than a —$CH_2$— bonded to $X^1$ or $X^2$ in the above alkylene may be substituted with —O—; $A^1$ and $A^2$ are independently 1,4-cyclohexylene, 1,4-phenylene or 1,4-phenylene in which one hydrogen is substituted with fluorine or chlorine; $X^1$ and $X^2$ are independently —O—; $X^3$ is —COO—, and $X^4$ is —OCO—;

andm=n=1.

16. The compound as described in claim 1, wherein $X^1$ and $X^2$ are independently —O—; $X^3$ is —COO—, and $X^4$ is —OCO—; and m is 1, and n is 0.

17. The compound as described in claim 1, wherein $X^1$ and $X^2$ are independently —O—; $X^3$ is —COO—, and $X^4$ is —OCO—; and m is 1, and n is 0.

18. A compound selected from the group consisted of the compounds represented by the following chemical formulas:

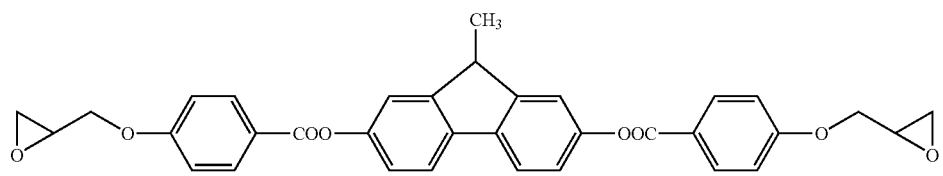

No. 21

-continued
No. 22
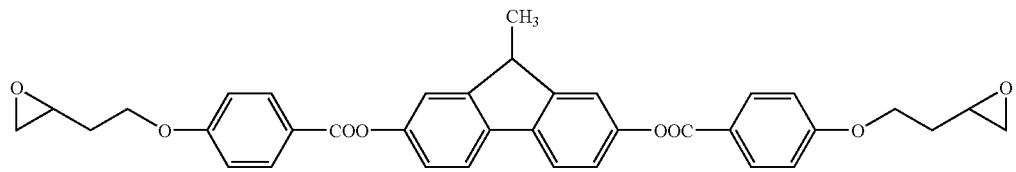
No. 23
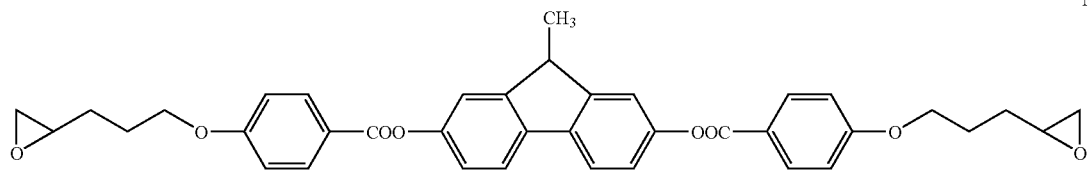
No. 24
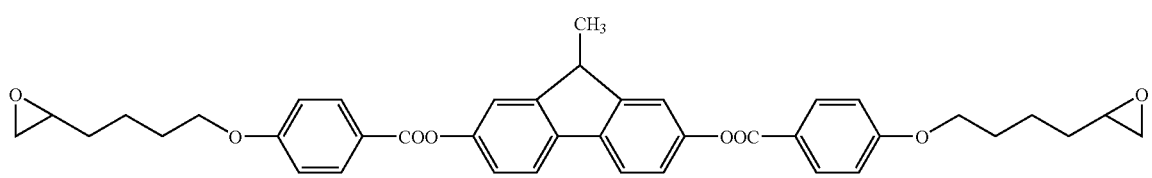
No. 26
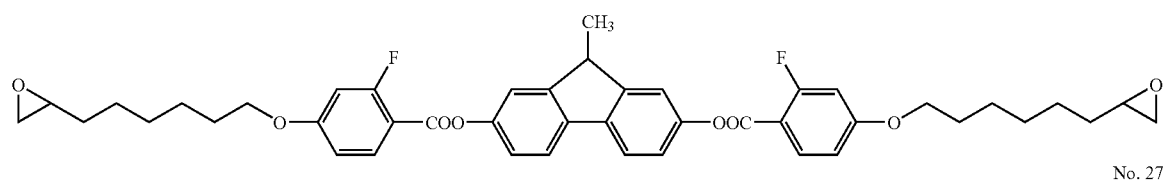
No. 27
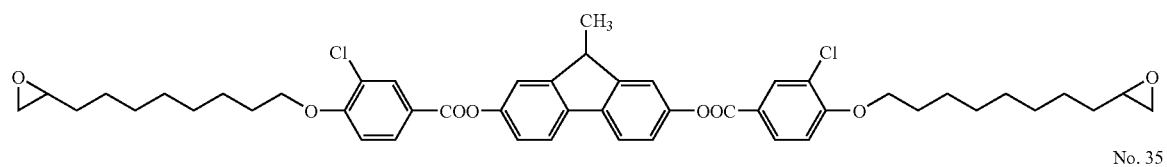
No. 35
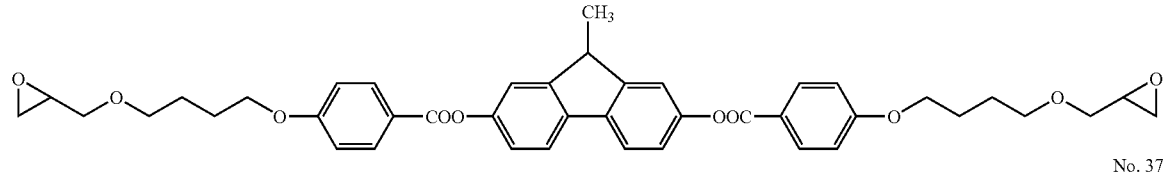
No. 37
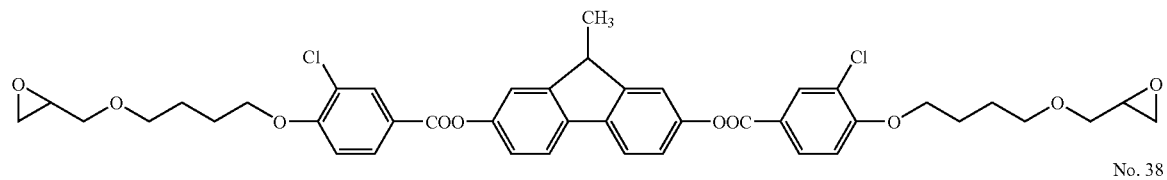
No. 38
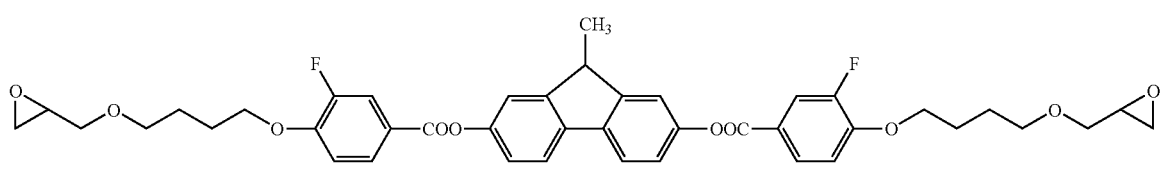
No. 53
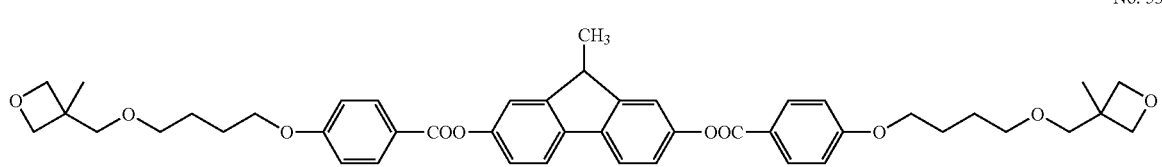

-continued
No. 57
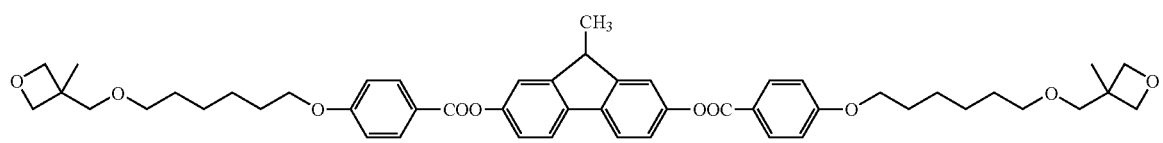
No. 63
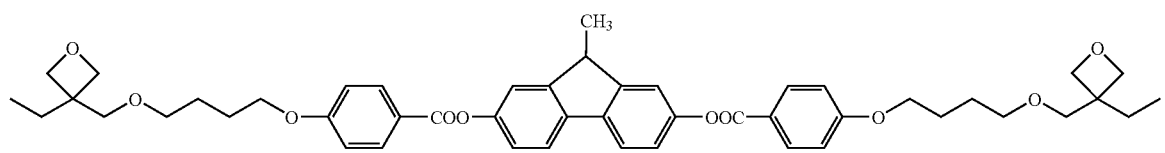
No. 64
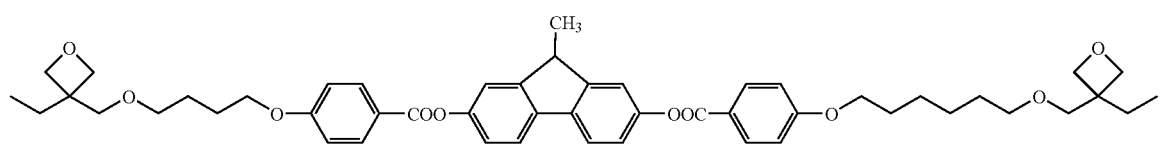
No. 65
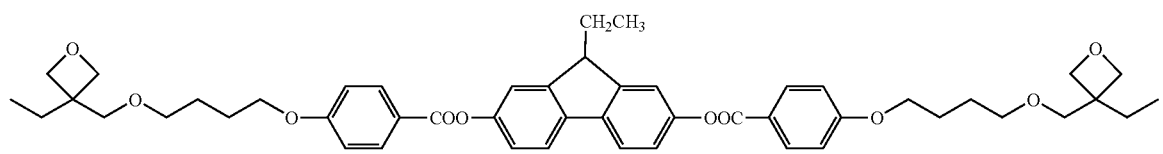
No. 66
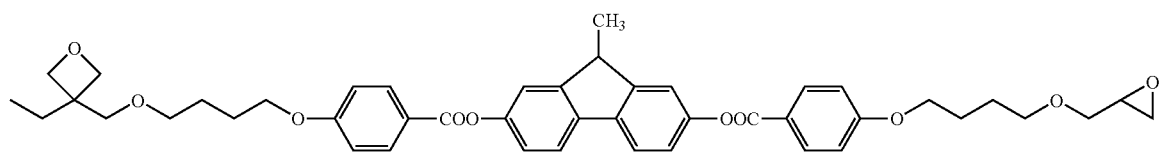
No. 67
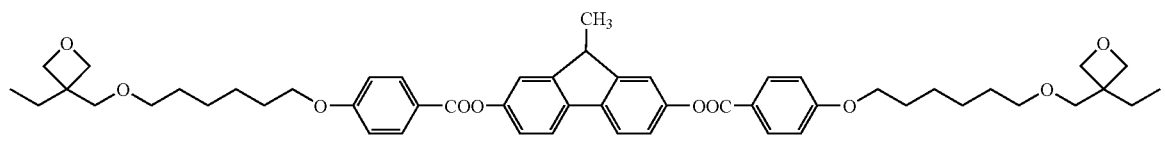
No. 68
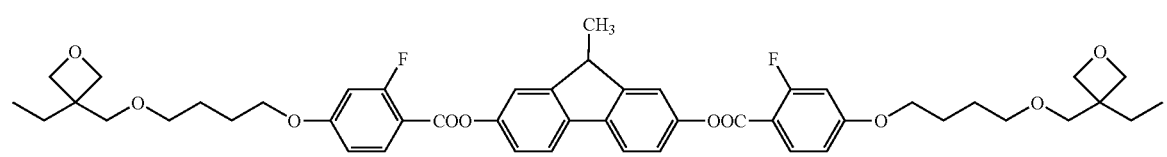
No. 86
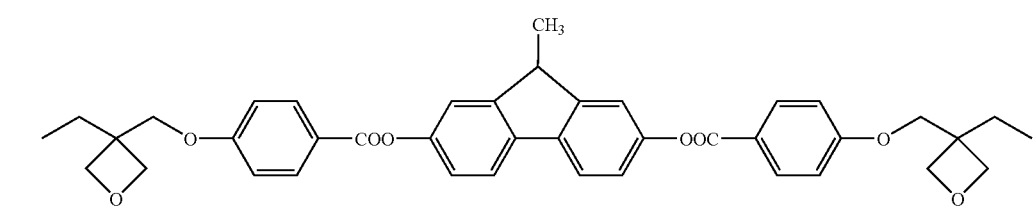

19. A liquid crystal composition comprising at least two compounds, wherein at least one compound out of them is the compound as described in claim 1.

20. A liquid crystal composition comprising at least two compounds, wherein at least one compound out of them is the compound as described in claim 12.

21. The liquid crystal composition as described in claim 19, wherein all the compounds are polymerizable compounds.

22. The liquid crystal composition as described in claim 20, wherein all the compounds are polymerizable compounds.

23. A liquid crystal composition comprising at least two compounds, wherein at least one compound is the compound as described in claim 1, and at least one other compound is a polymerizable compound which is different from the compound as described in claim 1.

24. A liquid crystal composition comprising at least two compounds, wherein at least one compound is the compound as described in claim 12, and at least one other compound is a polymerizable compound which is different from the compound as described in claim 12.

25. A liquid crystal composition comprising at least two compounds, wherein all the compounds are the compounds as described in claim 1.

26. A liquid crystal composition comprising at least two compounds, wherein all the compounds are the compounds as described in claim 12.

27. A liquid crystal composition which comprises at least one of the compounds as described in claim 1 and at least one polymerizable compound selected from compounds represented by Formulas (M1) to (M8):

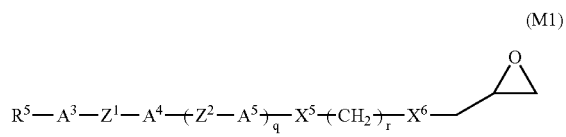
(M1)

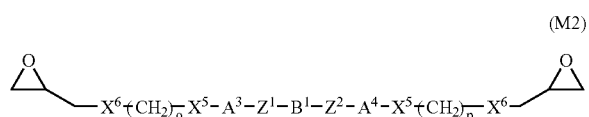
(M2)

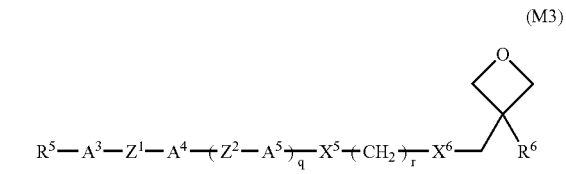
(M3)

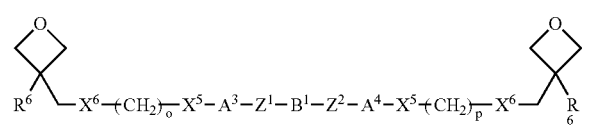
(M4)

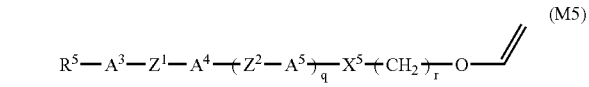
(M5)

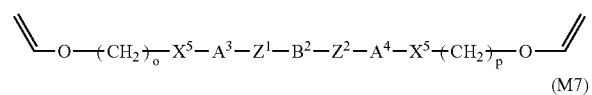
(M6)

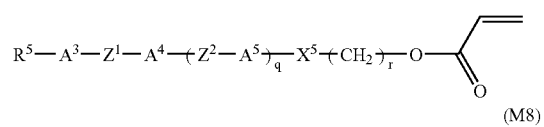
(M7)

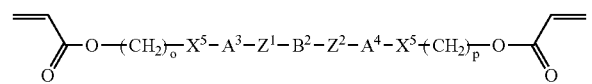
(M8)

in Formulas (M1) to (M8), $R^5$ is independently hydrogen, fluorine, chlorine, —CN or alkyl having a carbon number of 1 to 20; in the above alkyl, optional —CH$_2$— may be substituted with —O—, —S—, —COO—, —OCO— or —CO—, and optional hydrogen may be substituted with halogen; $R^6$ is hydrogen or alkyl having a carbon number of 1 to 5; $A^3$, $A^4$ and $A^5$ are independently 1,4-cyclohexylene, 1,4-phenylene, 1,4-phenylene in which at least one hydrogen is substituted with halogen, pyridine-2,5-diyl, pyrimidine-2,5-diyl, naphthalene-2,6-diyl or fluorene-2,7-diyl; $B^1$ is independently a single bond, 1,4-phenylene, 1,4-phenylene in which at least one hydrogen is substituted with halogen, methyl or trifluoromethyl, naphthalene-2,6-diyl or biphenyl-4,4'-diyl; $B^2$ is independently a single bond, 1,4-phenylene, 1,4-phenylene in which at least one hydrogen is substituted with halogen, methyl or trifluoromethyl, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl or 9,9-difluorofluorene-2,7-diyl;

$Z^1$ and $Z^2$ are independently a single bond, —COO—, —OCO—, —CH$_2$CH$_2$— or —C≡C—; $X^5$ and $X^6$ are independently a single bond or —O—; q is independently 1 or 0, and o, p and r are independently an integer of 0 to 20.

28. A liquid crystal composition comprising at least two compounds, which comprises at least one of the compounds as described in claim 18 and at least one polymerizable compound selected from compounds represented by Formulas (M1) to (M8):

(M1)

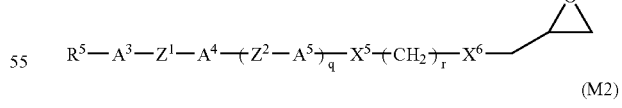
(M2)

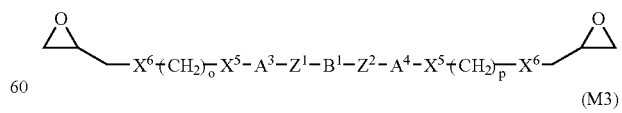
(M3)

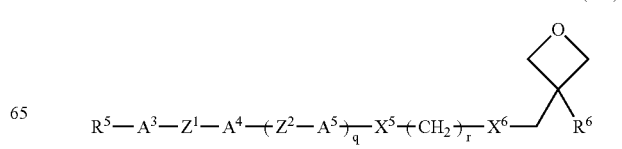

-continued

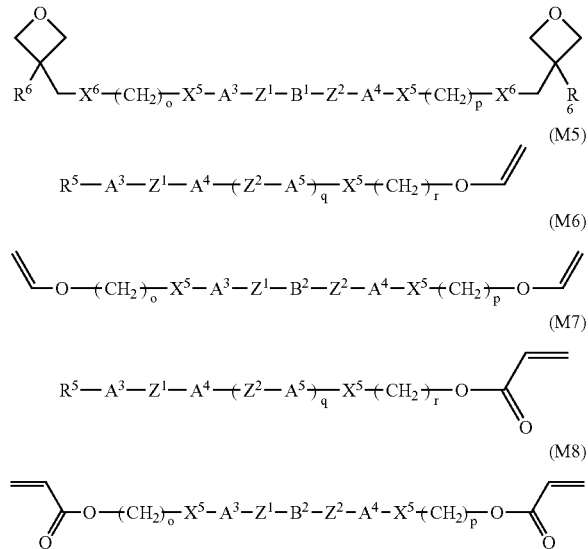

in Formulas (M1) to (M8), $R^5$ is independently hydrogen, fluorine, chlorine, —CN or alkyl having a carbon number of 1 to 20; in the above alkyl, optional —CH$_2$— may be substituted with —O—, —S—, —COO—, —OCO— or —CO—, and optional hydrogen may be substituted with halogen; $R^6$ is hydrogen or alkyl having a carbon number of 1 to 5; $A^3$, $A^4$ and $A^5$ are independently 1,4-cyclohexylene, 1,4-phenylene, 1,4-phenylene in which at least one hydrogen is substituted with halogen, pyridine-2,5-diyl, pyrimidine-2,5-diyl, naphthalene-2,6-diyl or fluorene-2,7-diyl; $B^1$ is independently a single bond, 1,4-phenylene, 1,4-phenylene in which at least one hydrogen is substituted with halogen, methyl or trifluoromethyl, naphthalene-2,6-diyl or biphenyl-4,4'-diyl; $B^2$ is independently a single bond, 1,4-phenylene, 1,4-phenylene in which at least one hydrogen is substituted with halogen, methyl or trifluoromethyl, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl or 9,9-difluorofluorene-2,7-diyl;

$Z^1$ and $Z^2$ are independently a single bond, —COO—, —OCO—, —CH$_2$CH$_2$— or —C≡C—; $X^5$ and $X^6$ are independently a single bond or —O—; q is independently 1 or 0, and o, p and r are independently an integer of 0 to 20.

29. The liquid crystal composition as described in claim 27, in which $R^5$ independently represents alkyl having a carbon number of 1 to 10, alkoxy having a carbon number of 1 to 10 or —CN; $A^3$, $A^4$ and $A^5$ each independently represent 1,4-cyclohexylene, 1,4-phenylene, 1,4-phenylene in which one or two of hydrogens are substituted with fluorine; $B^1$ independently represents a single bond, 1,4-phenylene or 1,4-phenylene in which one or two of hydrogens are substituted with fluorine, methyl or trifluoromethyl: $B^2$ independently represents a single bond, 1,4-phenylene, 1,4-phenylene in which one or two of hydrogens are substituted with fluorine, methyl or trifluoromethyl or 9-methylfluorene-2,7-diyl; $Z^1$ and $Z^2$ each independently represent a single bond, —COO— or —OCO—; o, p and r each independently represent an integer of 0 to 10.

30. The liquid crystal composition as described in claim 28, in which $R^5$ independently represents alkyl having a carbon number of 1 to 10, alkoxy having a carbon number of 1 to 10 or —CN; $A^3$, $A^4$ and $A^5$ each independently represent 1,4-cyclohexylene, 1,4-phenylene, 1,4-phenylene in which one or two of hydrogens are substituted with fluorine; $B^1$ independently represents a single bond, 1,4-phenylene or 1,4-phenylene in which one or two of hydrogens are substituted with fluorine, methyl or trifluoromethyl: $B^2$ independently represents a single bond, 1,4-phenylene, 1,4-phenylene in which one or two of hydrogens are substituted with fluorine, methyl or trifluoromethyl or 9-methylfluorene-2,7-diyl; $Z^1$ and $Z^2$ each independently represent a single bond, —COO— or —OCO—; o, p and r each independently represent an integer of 0 to 10.

31. The liquid crystal composition as described in claim 27, which comprises at least one polymerizable compound selected from the compounds represented by Formula (M1) and Formula (M2).

32. The liquid crystal composition as described in claim 28, which comprises at least one polymerizable compound selected from the compounds represented by Formula (M1) and Formula (M2), in which $R^5$ independently represents alkyl having a carbon number of 1 to 10, alkoxy having a carbon number of 1 to 10 or —CN; $A^3$, $A^4$ and $A^5$ each independently represent 1,4-cyclohexylene, 1,4-phenylene, 1,4-phenylene in which one or two of hydrogens are substituted with fluorine; $B^1$ independently represents a single bond, 1,4-phenylene or 1,4-phenylene in which one or two of hydrogens are substituted with fluorine, methyl or trifluoromethyl: $Z^1$ and $Z^2$ each independently represent a single bond, —COO— or —OCO—; o, p and r each independently represent an integer of 0 to 10.

33. The liquid crystal composition as described in claim 27, which comprises at least one polymerizable compound selected from the compounds represented by Formulas (M3) and (M4).

34. The liquid crystal composition as described in claim 28, which comprises at least one polymerizable compound selected from the compounds represented by Formula (M3) and Formula (M4), in which $R^5$ independently represents alkyl having a carbon number of 1 to 10, alkoxy having a carbon number of 1 to 10 or —CN; $A^3$, $A^4$ and $A^5$ each independently represent 1,4-cyclohexylene, 1,4-phenylene, 1,4-phenylene in which one or two of hydrogens are substituted with fluorine; $B^1$ independently represents a single bond, 1,4-phenylene or 1,4-phenylene in which one or two of hydrogens are substituted with fluorine, methyl or trifluoromethyl: $Z^1$ and $Z^2$ each independently represent a single bond, —COO— or —OCO—; o, p and r each independently represent an integer of 0 to 10.

35. The liquid crystal composition as described in claim 27, which comprises at least one polymerizable compound selected from the compounds represented by Formulas (M2), (M5) and (M6).

36. The liquid crystal composition as described in claim 28, which comprises at least one polymerizable compound selected from the compounds represented by Formulas (M2), (M5) and (M6), in which $R^5$ independently represents alkyl having a carbon number of 1 to 10, alkoxy having a carbon number of 1 to 10 or —CN; $A^3$, $A^4$ and $A^5$ each independently represent 1,4-cyclohexylene, 1,4-phenylene, 1,4-phenylene in which one or two of hydrogens are substituted with fluorine; $B^1$ independently represents a single bond, 1,4-phenylene or 1,4-phenylene in which one or two of hydrogens are substituted with fluorine, methyl or trifluoromethyl: $B^2$ is independently a single bond, 1,4-phenylene, 1,4-phenylene in which at least one hydrogen is substituted with halogen, methyl or trifluoromethyl, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl or 9,9-difluorofluorene-2,7-diyl; $Z^1$ and $Z^2$ each independently represent a single bond, —COO— or —OCO—; o, p and r each independently represent an integer of 0 to 10.

37. The liquid crystal composition as described in claim 27, which comprises at least one polymerizable compound selected from the compounds represented by Formulas (M2), (M7) and (M8).

38. The liquid crystal composition as described in claim 28, which comprises at least one polymerizable compound selected from the compounds represented by Formulas (M2), (M7) and (M8), in which $R^5$ independently represents alkyl having a carbon number of 1 to 10, alkoxy having a carbon number of 1 to 10 or —CN; $A^3$, $A^4$ and $A^5$ each independently represent 1,4-cyclohexylene, 1,4-phenylene, 1,4-phenylene iri which one or two of hydrogens are substituted with fluorine; $B^1$ independently represents a single bond, 1,4-phenylene or 1,4-phenylene in which one or two of hydrogens are substituted with fluorine, methyl or trifluoromethyl: $B^2$ is independently a single bond, 1,4-phenylene, 1,4-phenylene in which at least one hydrogen is substituted with halogen, methyl or trifluoromethyl, naphthalene-2,6-diyl, biphenyl-4,4'-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl or 9,9-difluorofluorene-2,7-diyl; $Z^1$ and $Z^2$ each independently represent a single bond, —COO— or —OCO—; o, p and r each independently represent an integer of 0 to 10.

39. The liquid crystal composition as described in claim 19, which comprises at least one compound having an epoxy group as a polymerizable group and at least one compound having an oxetane group as a polymerizable group.

40. The liquid crystal composition as described in claim 38, which comprises at least one compound having an epoxy group as a polymerizable group and at least one compound having an oxetane group as a polymerizable group.

41. A polymer obtained by polymerizing the composition described in claim 19.

42. A polymer obtained by polymerizing the composition described in claim 40.

43. A polymer obtained by polymerizing the composition as described in claim 25 to polymerize at least one compound in the composition.

44. A polymer obtained by polymerizing the composition as described in claim 26 to polymerize at least one compound in the composition.

45. A molded article having an optical anisotropy, which comprises the polymer as described in claim 42.

46. A molded article having an optical anisotropy, which comprises the polymer as described in claim 44.

47. A molded article having an optical anisotropy, which comprises the polymer as described in claim 42, wherein a liquid crystal skeleton in a thin layer of the molded article having an optical anisotropy exhibits a hybrid alignment.

48. A molded article having an optical anisotropy, which comprises the polymer as described in claim 44, wherein a liquid crystal skeleton in a thin layer of the molded article having an optical anisotropy exhibits a hybrid alignment.

49. A molded article having an optical anisotropy, which comprises the polymer as described in claim 42, wherein a liquid crystal skeleton in a thin layer of the molded article having an optical anisotropy exhibits a homogeneous alignment.

50. A molded article having an optical anisotropy, which comprises the polymer as described in claim 44, wherein a liquid crystal skeleton in a thin layer of the molded article having an optical anisotropy exhibits a homogeneous alignment.

51. A molded article having an optical anisotropy, which comprises the polymer as described in claim 42, wherein a liquid crystal skeleton in a thin layer of the molded article having an optical anisotropy exhibits a tilt alignment.

52. A molded article having an optical anisotropy, which comprises the polymer as described in claim 44, wherein a liquid crystal skeleton in a thin layer of the molded article having an optical anisotropy exhibits a tilt alignment.

53. A molded article having an optical anisotropy, which comprises the polymer as described in claim 42, wherein a liquid crystal skeleton in a thin layer of the molded article having an optical anisotropy exhibits a homeotropic alignment.

54. A molded article having an optical anisotropy, which comprises the polymer as described in claim 44, wherein a liquid crystal skeleton in a thin layer of the molded article having an optical anisotropy exhibits a homeotropic alignment.

55. A molded article having an optical anisotropy, which comprises the polymer obtained from the liquid crystal composition having a chiral nematic phase or a cholesteric phase as described in claim 27, wherein a liquid crystal skeleton in a thin layer thereof exhibits a helical structure.

56. A molded article having an optical anisotropy, which comprises the polymer obtained from the liquid crystal composition having a chiral nematic phase or a cholesteric phase as described in claim 40, wherein a liquid crystal skeleton in a thin layer thereof exhibits a helical structure.

57. The molded article having an optical anisotropy as described in claim 55, which selectively reflects all or a portion of light in a wavelength of 350 to 750 rim.

58. The molded article having an optical anisotropy as described in claim 56, which selectively reflects all or a portion of light in a wavelength of 350 to 750 nm.

59. The molded article having an optical anisotropy as described in claim 55, which reflects light in an area of a wavelength of 100 to 350 nm.

60. The molded article having an optical anisotropy as described in claim 56, which reflects light in an area of a wavelength of 100 to 350 nm.

61. The molded article having an optical anisotropy as described in claim 56, wherein a helical structure induced in a chiral nematic phase or a cholesteric phase has a pitch changing continuously in a thickness direction of the molded article having an optical anisotropy.

62. The molded article having an optical anisotropy as described in claim 58, wherein a helical structure induced in a chiral nematic phase or a cholesteric phase has a pitch changing continuously in a thickness direction of the molded article having an optical anisotropy.

63. The molded article having an optical anisotropy as described in claim 60, wherein a helical structure induced in a chiral nematic phase or a cholesteric phase has a pitch changing continuously in a thickness direction of the molded article having an optical anisotropy.

64. An optical compensation element constituted from the molded article having an optical anisotropy as described in claim 45.

65. An optical compensation element constituted from the molded article having an optical anisotropy as described in claim 63.

66. A quarter-wave plate using the molded article having an optical anisotropy as described in claim 55.

67. A quarter-wave plate using the molded article having an optical anisotropy as described in claim 56.

68. A half-wave plate using the molded article having an optical anisotropy as described in claim 55.

69. A half-wave plate using the molded article having an optical anisotropy as described in claim 56.

70. An optical element constituted from a combination of the molded article having an optical anisotropy as described in claim 45 and a polarizing plate.

71. An optical element constituted from a combination of the molded article having an optical anisotropy as described in claim 63 and a polarizing plate.

72. A liquid crystal display element comprising the molded article having an optical anisotropy as described in claim 45.

73. A liquid crystal display element comprising the molded article having an optical anisotropy as described in claim 63.

* * * * *